United States Patent
Bumberger et al.

(10) Patent No.: US 12,444,407 B1
(45) Date of Patent: Oct. 14, 2025

(54) PRIVACY MODE FOR MULTI-DEVICE PROCESSING

(71) Applicant: Amazon Technologies, Inc., Seattle, WA (US)

(72) Inventors: Fabian Andreas Bumberger, North York (CA); Eli Joshua Fidler, Toronto (CA); Maciej Grabon, Legnica (PL); Ashutosh Thakur, Toronto (CA); Ieliena Cannata, Wilmington, MA (US); Muhammad Zain Mustafa, Kingston (CA)

(73) Assignee: Amazon Technologies, Inc., Seattle, WA (US)

( * ) Notice: Subject to any disclaimer, the term of this patent is extended or adjusted under 35 U.S.C. 154(b) by 469 days.

(21) Appl. No.: 17/952,892

(22) Filed: Sep. 26, 2022

(51) Int. Cl.
    *G10L 15/08*     (2006.01)
    *G10L 15/22*     (2006.01)
    *G10L 15/30*     (2013.01)

(52) U.S. Cl.
    CPC .............. *G10L 15/08* (2013.01); *G10L 15/22* (2013.01); *G10L 15/30* (2013.01)

(58) Field of Classification Search
    CPC .......... G10L 15/08; G10L 15/22; G10L 15/30
    USPC ....................................................... 704/254
    See application file for complete search history.

(56) References Cited

U.S. PATENT DOCUMENTS

| | | | |
|---|---|---|---|
| 8,204,185 B1* | 6/2012 | Koltenuk | H04M 3/53333 379/88.23 |
| 8,554,559 B1* | 10/2013 | Aleksic | G10L 21/00 704/235 |
| 8,922,480 B1* | 12/2014 | Freed | G06F 3/0304 382/103 |
| 10,115,141 B1* | 10/2018 | Warman | H04L 63/0281 |
| 11,373,645 B1* | 6/2022 | Mathew | G10L 15/1815 |
| 12,250,193 B2* | 3/2025 | Ly | H04W 4/14 |
| 2008/0059197 A1* | 3/2008 | Jones | G10L 15/30 704/270.1 |
| 2011/0195739 A1* | 8/2011 | Deleus | H04W 76/45 704/235 |
| 2013/0238326 A1* | 9/2013 | Kim | G10L 15/08 704/E15.001 |
| 2014/0056417 A1* | 2/2014 | Wildman | G16H 40/20 379/67.1 |
| 2016/0155443 A1* | 6/2016 | Khan | G06F 3/167 704/275 |
| 2018/0182397 A1* | 6/2018 | Carbune | G10L 15/22 |
| 2018/0366112 A1* | 12/2018 | Aleksic | G10L 15/22 |
| 2020/0034114 A1* | 1/2020 | Angel | G06F 3/1454 |
| 2020/0175271 A1* | 6/2020 | Bolla | G06F 3/167 |
| 2020/0387155 A1* | 12/2020 | Liu | G05D 1/0027 |
| 2021/0105436 A1* | 4/2021 | Lee | H04N 7/147 |

(Continued)

*Primary Examiner* — Thuykhanh Le
(74) *Attorney, Agent, or Firm* — Pierce Atwood LLP

(57) ABSTRACT

A speech processing system that enables voice-privacy mode operations for resource limited computing devices. A device that has limited speech processing capabilities/is otherwise resource limited, connects to a local host. The user may then enable a voice-privacy mode for the limited device. When the mode is active, if the limited device detects an utterance, it sends the audio data of the utterance to the local host, which performs limited speech processing and sends the resulting data back to the limited device, which then sends it to a more powerful device to complete the speech processing.

20 Claims, 24 Drawing Sheets

(56) References Cited

U.S. PATENT DOCUMENTS

| | | | |
|---|---|---|---|
| 2021/0158805 A1* | 5/2021 | Sivasubramanian | G06F 40/279 |
| 2021/0183358 A1* | 6/2021 | Mao | G10L 17/04 |
| 2021/0249009 A1* | 8/2021 | Manjunath | G06F 3/167 |
| 2021/0295824 A1* | 9/2021 | Kracun | G10L 15/22 |
| 2021/0304757 A1* | 9/2021 | Walters | G06T 19/006 |
| 2021/0358511 A1* | 11/2021 | Tsubouchi | G10L 15/06 |
| 2021/0398537 A1* | 12/2021 | Spry | H04M 1/72478 |
| 2022/0020368 A1* | 1/2022 | Tsubouchi | G10L 25/63 |
| 2022/0051673 A1* | 2/2022 | Ohmura | G06F 40/186 |
| 2022/0200716 A1* | 6/2022 | Bonde | H04H 20/89 |
| 2022/0238101 A1* | 7/2022 | Sainath | G06N 3/045 |
| 2022/0301561 A1* | 9/2022 | Robert Jose | G10L 15/26 |
| 2022/0301562 A1* | 9/2022 | Robert Jose | G10L 15/28 |
| 2022/0392460 A1* | 12/2022 | Kumar | G10L 19/24 |
| 2022/0393898 A1* | 12/2022 | Maury | H04L 12/1822 |
| 2022/0414349 A1* | 12/2022 | Rathnam | G06F 40/58 |
| 2023/0045078 A1* | 2/2023 | Berisha | A61B 5/486 |
| 2023/0051306 A1* | 2/2023 | Karri | G10L 25/51 |
| 2023/0116052 A1* | 4/2023 | Eskimez | G10L 21/0208 704/223 |
| 2023/0120735 A1* | 4/2023 | Agrawal | G06V 40/161 348/14.07 |
| 2023/0319121 A1* | 10/2023 | Smith | H04M 3/568 |
| 2023/0352026 A1* | 11/2023 | Springer | G10L 15/193 |
| 2023/0368785 A1* | 11/2023 | Singh | G06F 3/167 |
| 2023/0377749 A1* | 11/2023 | Berisha | G10L 25/66 |
| 2024/0029743 A1* | 1/2024 | Pasko | G10L 17/26 |
| 2024/0049981 A1* | 2/2024 | Berisha | G16H 50/20 |
| 2024/0075944 A1* | 3/2024 | Sahoo | G10L 15/22 |
| 2024/0113905 A1* | 4/2024 | Maury | H04N 7/15 |
| 2024/0146776 A1* | 5/2024 | Hansen | H04L 67/52 |
| 2024/0296838 A1* | 9/2024 | Ramakrishna | G06N 3/0455 |
| 2025/0118306 A1* | 4/2025 | Machida | G10L 15/28 |

* cited by examiner

FIG. 1
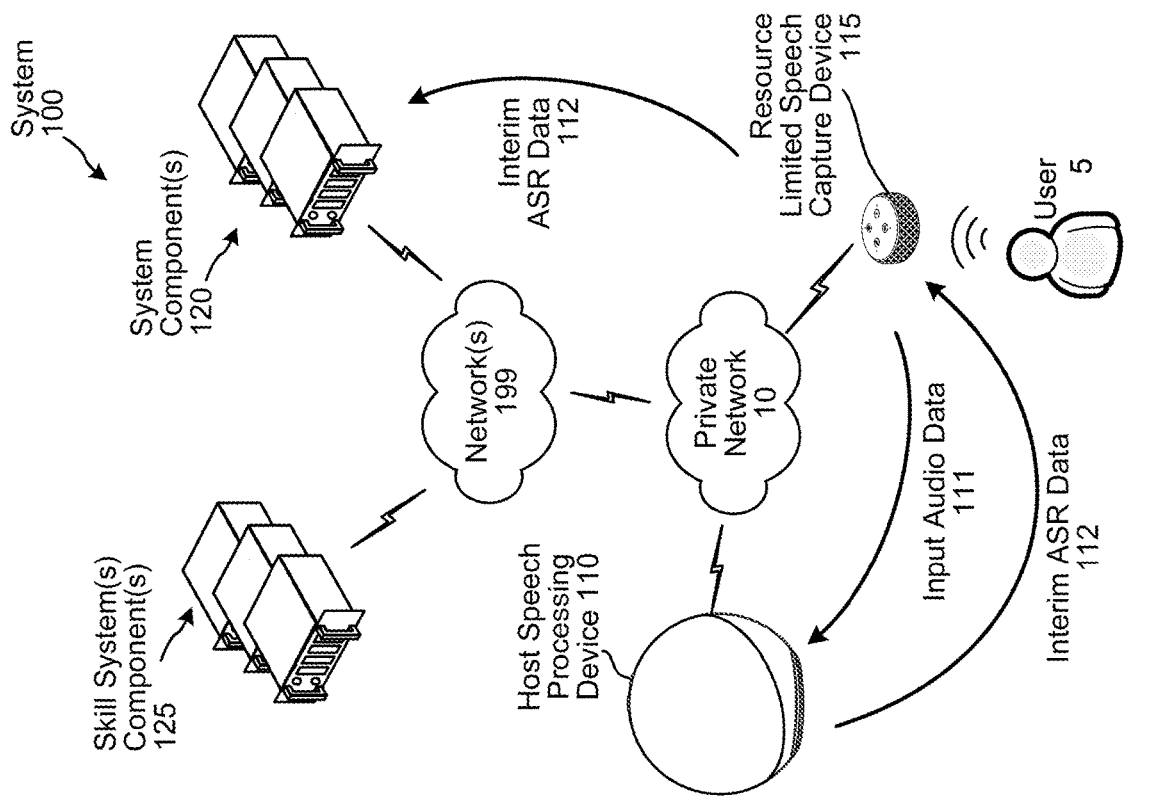
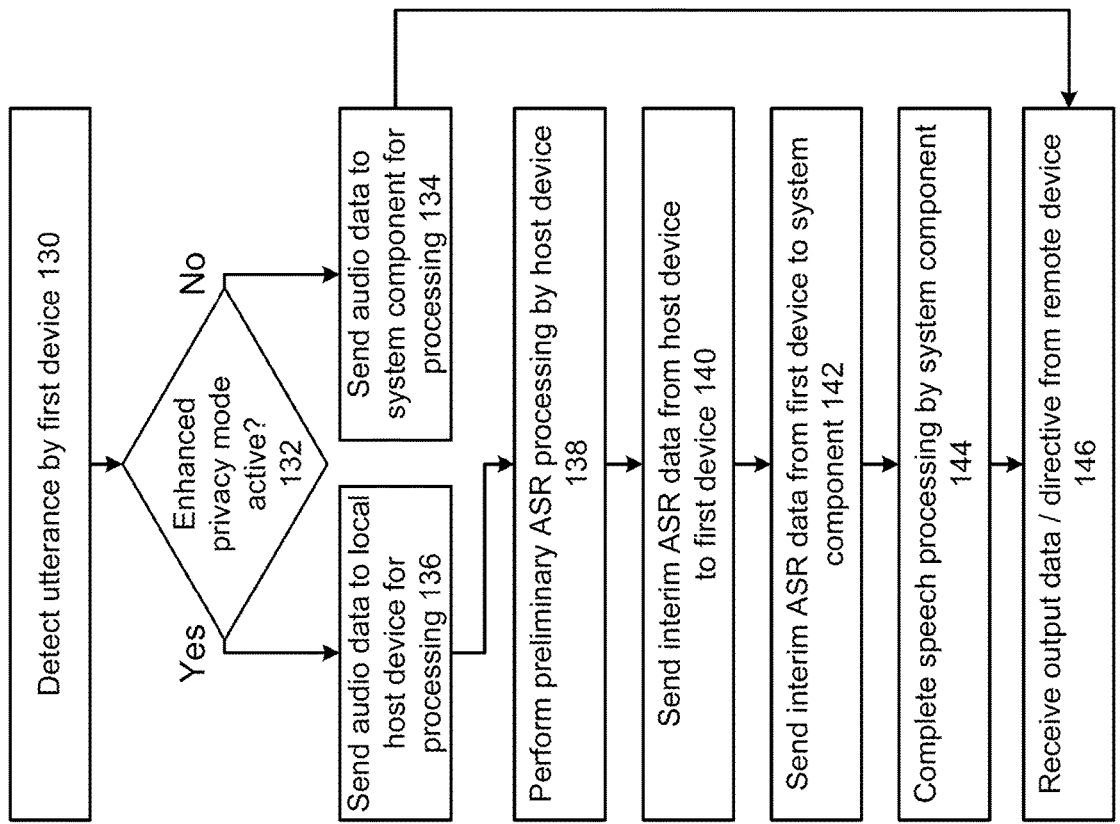

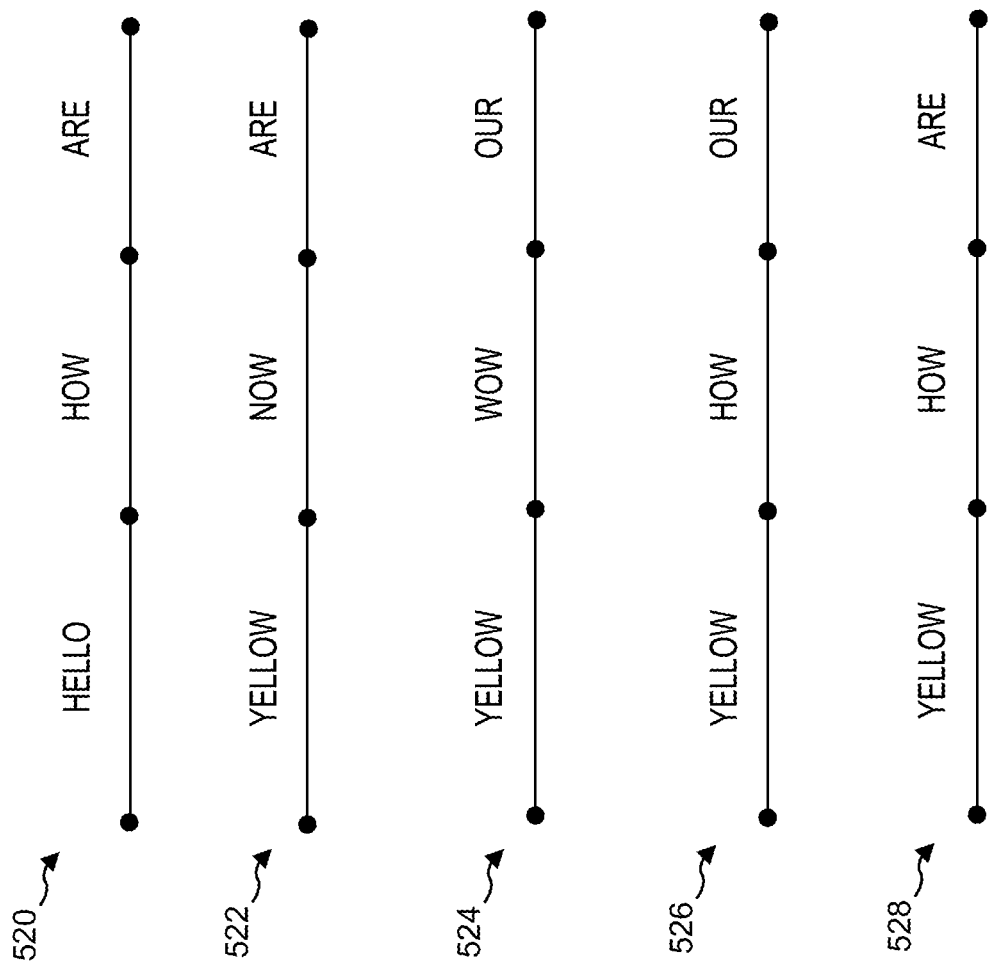

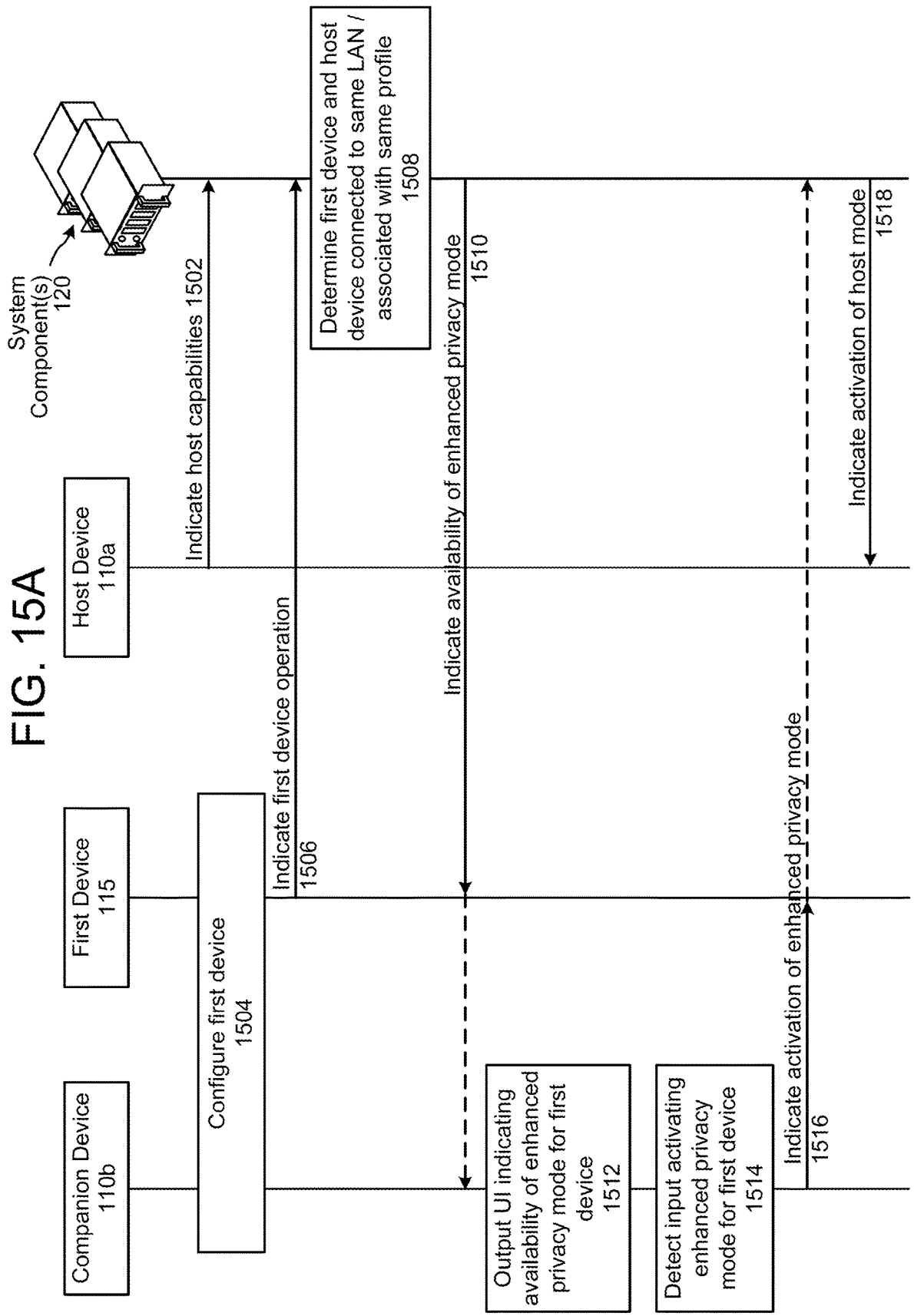

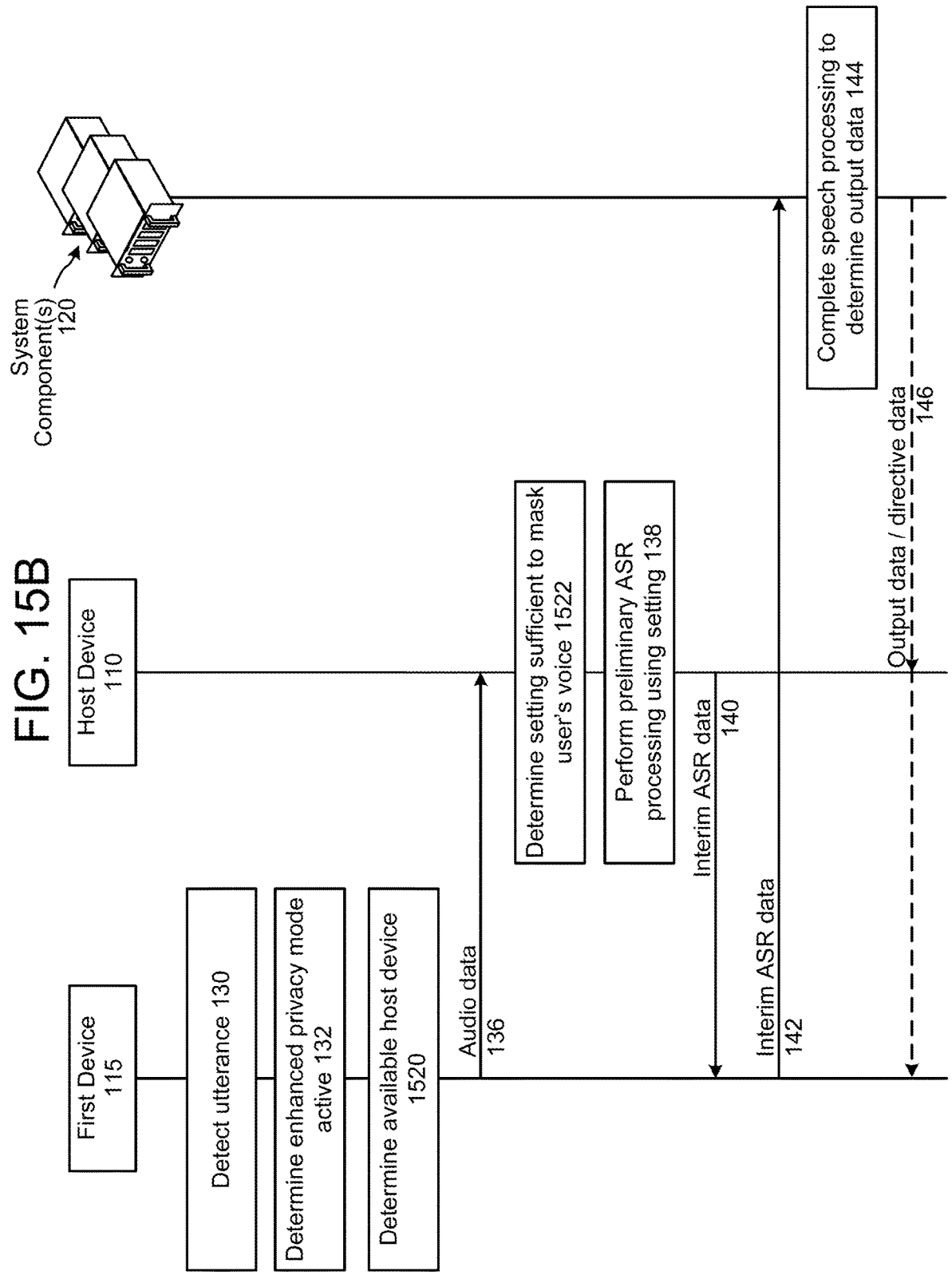

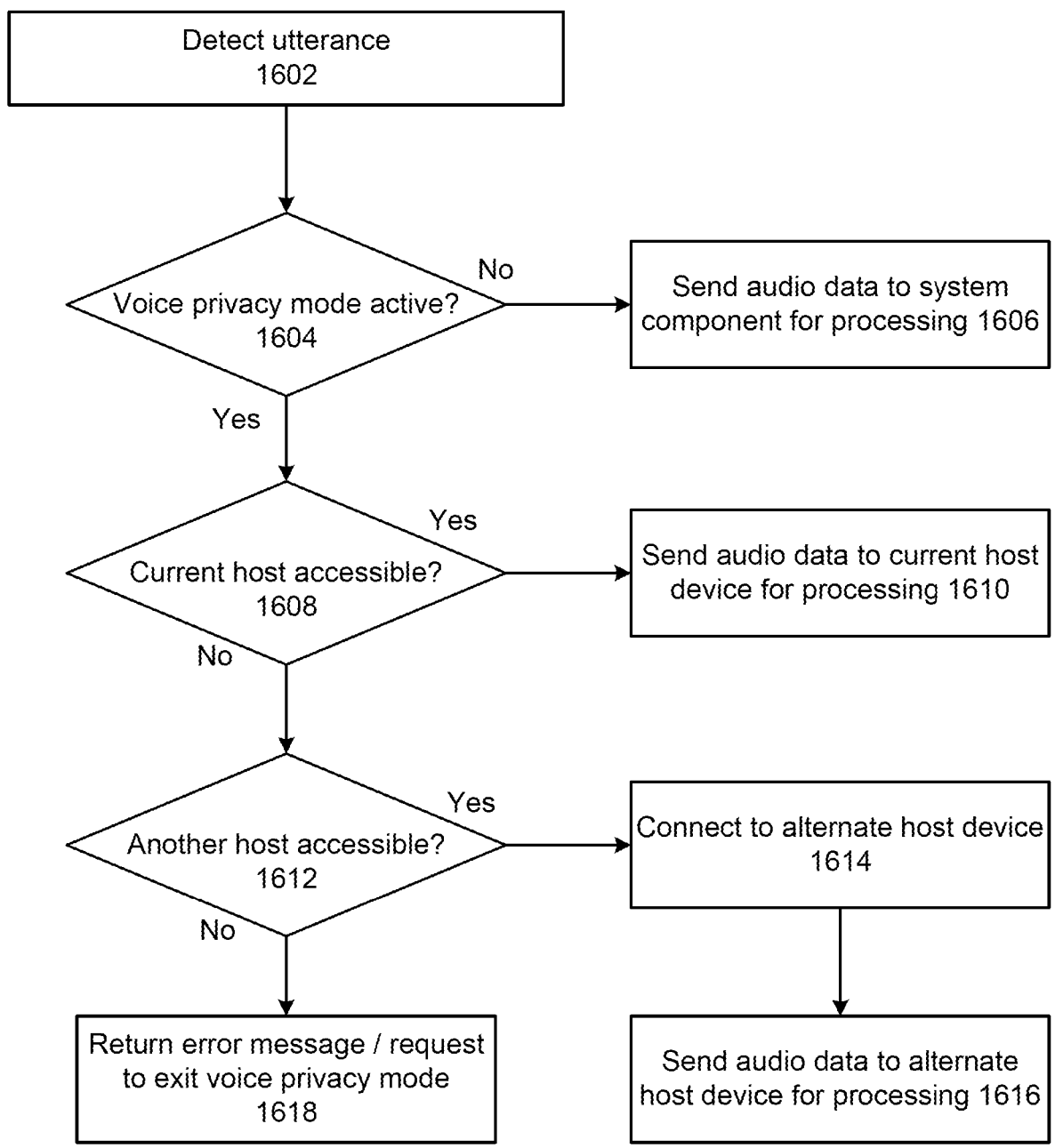

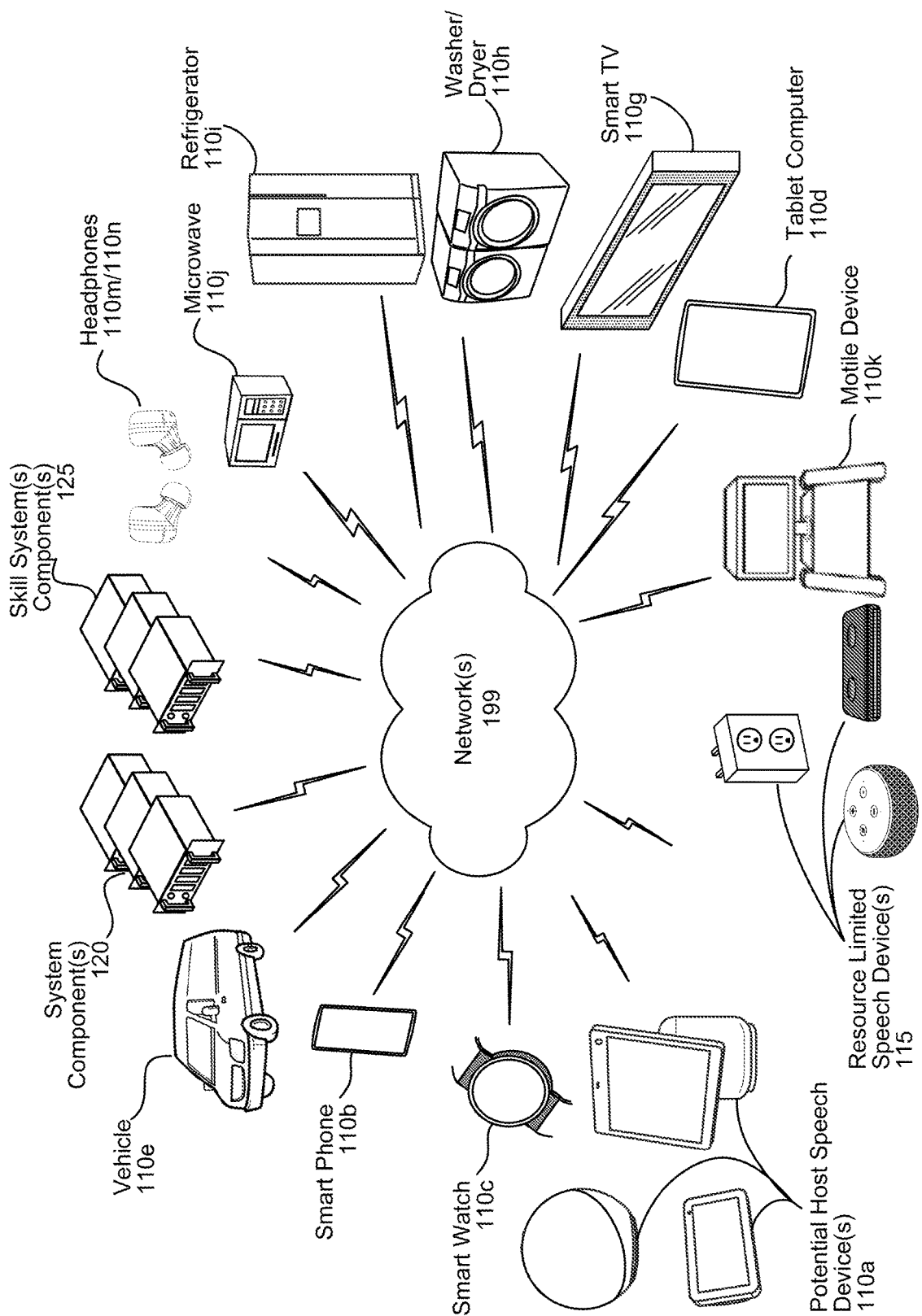

U.S. 12,444,407 B1

PRIVACY MODE FOR MULTI-DEVICE PROCESSING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a conceptual diagram of a system configured to perform speech processing using a voice privacy mode according to embodiments of the present disclosure.

FIG. 5D illustrates an N-best list of hypotheses associated with the lattice of FIG. 5B according to embodiments of the present disclosure.

FIGS. 15A-15B illustrates operations of a system configured to activate and perform speech processing using a voice privacy mode according to embodiments of the present disclosure.

FIG. 16 illustrates operations of a system to determine host connections for performing speech processing using a voice privacy mode according to embodiments of the present disclosure.

FIG. 19 illustrates an example of a computer network for use with the overall system, according to embodiments of the present disclosure.

DETAILED DESCRIPTION

Figure 2:
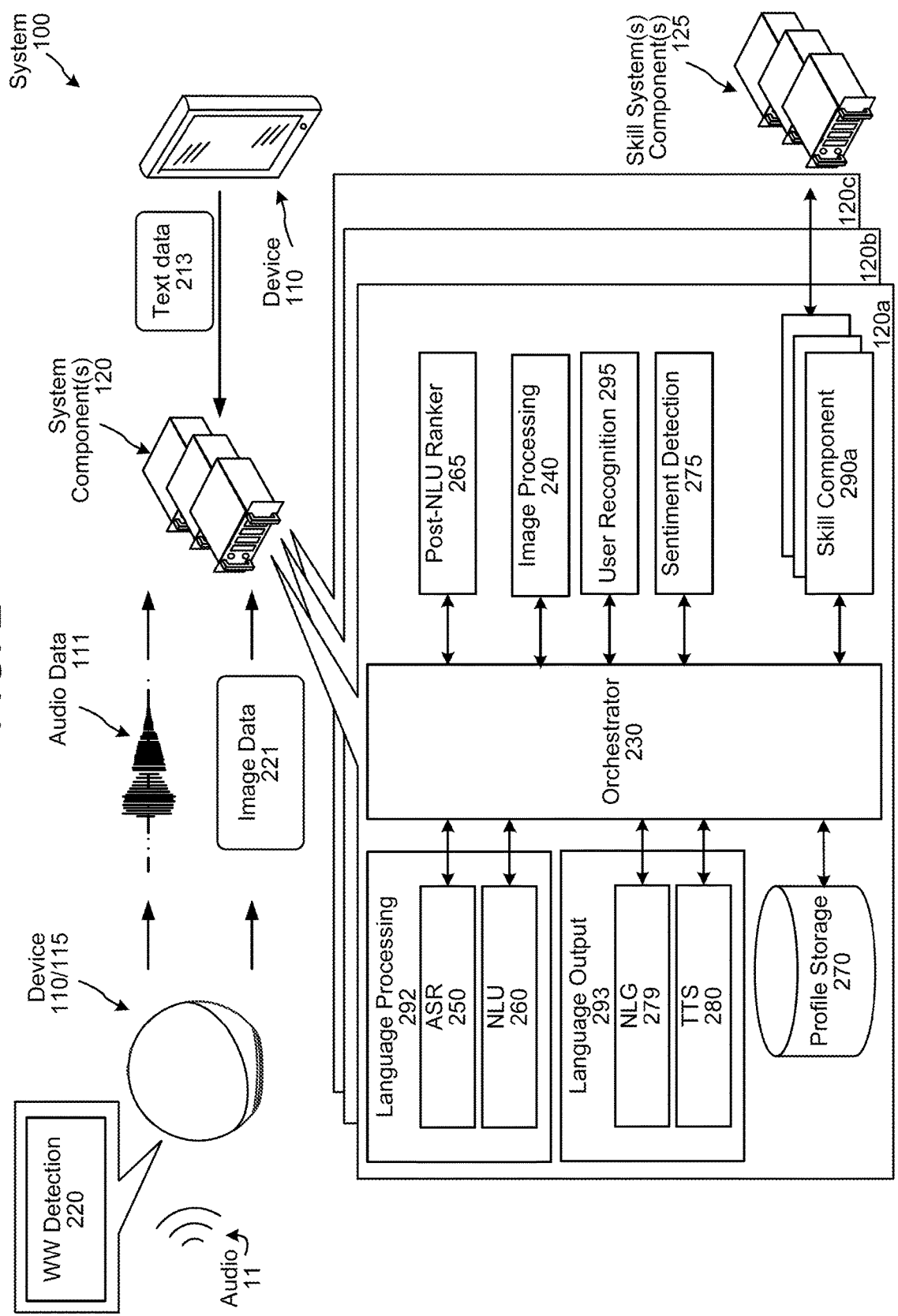
FIG. 2 is a conceptual diagram of components of the system, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing/virtual assistant system.

The system may be configured to incorporate user permissions and may only perform activities disclosed herein if approved by a user. As such, the systems, devices, components, and techniques described herein may be implemented to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

A system may cause a skill to perform actions in response to natural language inputs (e.g., spoken inputs and/or typed inputs in a language spoken by humans). For example, for the natural language input "play classical music," a music skill may be invoked to output music of a category corresponding to "classical." For further example, for the natural language input "turn on the lights," a smart home skill may be invoked to turn on "smart" lights associated with a user's profile. In another example, for the natural language input "what is the weather," a weather skill may be invoked to output weather information for a geographic location corresponding to the device that captured the natural language input. In the foregoing examples, actions correspond to the outputting of music, turning on "smart" lights, and outputting of weather information in a synthetic voice using TTS. As used herein, an "action" may refer to some result of a skill's processing. In a natural language processing (NLP) system such as Amazon's Alexa or Lex, some language processing is performed using a remote system having expandable language processing capability (e.g., capable of processing a large number of requests simultaneously), while other language processing may be performed by individual device(s) having limited processing capability (e.g., resource constrained devices capable of processing a small number of requests simultaneously).

As speech processing can use a significant amount of computing resources, certain speech processing systems may utilize a distributed computing environment where one device captures a spoken utterance, determines audio data representing the utterance, and sends the audio data to another device that actually performs the speech processing. In such instances, the device that captures the audio is in a same physical environment as a user, for example in the same room so that the user's voice can be heard, while the processing device may be in a different location, for example in a location that is miles away from the user's location in a data center, such as those offered by Amazon Web Services (AWS). In certain embodiments the processing device may be one (or more) "cloud" devices which comprise system component(s) that are networked to communicate with the user device but are located elsewhere, such as a distributed computing facility or the like. In certain circumstances, a nearby user or other device may have sufficient computing capabilities to perform more involved speech processing operations such as all or some of ASR, NLU, NLG, TTS, and/or aspects of speech processing/command execution. When a user device has such capabilities it may handle speech processing on its own, and/or may coordinate with certain remote system component(s) depending on individual operating conditions/processing requirements.

In certain conditions one or more users may wish to prevent data representing the user's voice or other audio from leaving an environment, such as the devices in a user's home, office, or hotel room. This may be referred to as operating in a voice privacy mode, or the like. Such an environment may include a private network, personal device(s) or other arrangement, depending on user preferences/system configuration. In such conditions, utterance processing may happen entirely on a speech-capture device (if it has sufficient computing capabilities to do so) or it may happen between one user device and one or more system component(s) that are within the user's specified environment, such as a home server or the like, for example connected to the speech-capture device via a private network or the like. In circumstances where not all of the speech processing may be performed within the home environment (for example, when expanding ASR/NLU or other capabilities of a remote system are needed), the speech-capture device may determine certain data representing the utterance that is sufficient for a different device (e.g., cloud component or the like) to perform speech processing, but also sufficiently masks the original audio so that a specific user's voice may not be reconstructed from the certain data.

With the proliferation of speech-processing systems, a variety of devices may be employed that may be considered "thin" devices, that is devices that may capture data representing an environment but are limited in some way with regard to their computing power/ability to perform certain operations such as speech processing, image processing, or the like. Such devices may include lightbulbs, plugs, thermostats, appliances, wearables (e.g., earbuds/headphones, watches, rings, etc.), doorbell, security camera, etc. that have certain speech-related, image-related, and/or computing capabilities, but not others. For example, such a capture device may include a microphone, wakeword detector (and/or button), communication components, and limited processing components (for example, components that can convert captured audio to audio data) but may not have sufficient computing power to perform more resource-intensive tasks like ASR, NLU, or even processing audio data sufficiently to mask a user's voice. Another example of a capture device may include a camera, communication components, and limited processing components (for example, components that can convert captured images to image data). Such capture devices may be capable of capturing data (such as audio data, image data or the like) and sending audio to another device for speech processing, or sending image data to another device for image processing, but may not be capable of executing other more complex operations, such as masking a user's voice, obfuscating certain portions of an image, or the like.

Offered is a system and method that can coordinate operations between devices to enable operation of a speech processing system in an enhanced privacy mode, thus allowing protection of a user's privacy while also being able to process commands/perform operations that are based on data captured by devices that rely on other devices for certain operations (e.g., devices with limited computing power). Such a system/method may be used to enhance the perceived privacy/protections of information (such as a user's voice) when captured by a resource limited/capture device, while still availing the capture device of the expanded computing resources/capabilities of a distributed computing environment, when the device(s) of such an environment may be needed to complete processing related to input data, such as an input utterance.

Such an enhanced privacy mode may include a situation where a user indicates that she does not want recordings of her voice leaving a home environment, but still wishes to make use of speech processing services. In such a situation the system may perform processing on audio data (for example by a host device as described herein) representing an utterance to create data (such as interim data discussed herein) that still includes sufficient information to perform speech processing but also sufficiently removes (or obfuscates) data representing a voice. Such created data may include a representation of text of an utterance, or may change audio characteristics such that the user's voice is not determinable from the created data. Further, in such a situation the system may disable any sending of raw audio at a later time, even for training or other purposes.

Such an enhanced privacy mode may also include a situation where a user indicates that she does not want raw images of her home or property leaving a home environment, but still wishes to make use of image processing services. For example, a user may own a doorbell camera and may desire for the system to notify the user when someone comes to the door but may not wish raw images of her property or individual faces to leave her home. In such a situation the system may perform processing on image data (for example by a host device as described herein) captured by the doorbell camera to create data (such as interim data discussed herein, or feature data for the image)

that still provides sufficient information to determine when someone is approaching the door but also sufficiently removes (or obfuscates) data representing a face or representing the user's property. Such created data may include a representation of features used for motion detection, or may change image characteristics such that the property/face(s) are not determinable from the created data.

Although for illustration purposes, the discussion herein focuses on host/capture device operations for voice privacy mode, the teachings herein are also applicable to other enhanced privacy mode(s) that may involve permissions, settings, rules, restrictions, or the like regarding the distribution of certain types of data. Thus, a voice privacy mode may involve restricting distribution of data representing a user's voice. A face privacy mode may involve restricting distribution of data representing a user's face. A home privacy mode may involve restricting distribution of data representing an interior and/or exterior of a user's home. May other modes may be configured that restrict or otherwise govern distribution of various types of data.

Further, while the discussion herein focuses on an enhanced privacy mode (such as voice privacy mode) being active with respect to a particular device, an enhanced privacy mode may be activated on a device-by-device basis, on a household basis (e.g., all devices within a household can turn on/off the enhanced privacy mode together), on a network basis (e.g., all devices connected to the same person/local area network can turn on/off the enhanced privacy mode together), on an account/profile bases (e.g., all devices associated with the same user account or same user profile can turn on/off the enhanced privacy mode together), or the like.

FIG. 1 is a conceptual diagram illustrating a virtual assistant system 100 for natural language processing, according to embodiments of the present disclosure. As shown in FIG. 1, the system 100 may include one or more devices 110/115 in a same physical environment as a user 5 and connected to a private network 10 (e.g., local area network (LAN) or the like, although the disclosure is not limited thereto), and the device(s) 110/115 may optionally communicate with various system component(s) 120 (sometimes referred to as "system 120") and/or skill support component(s) 125 via one or more network(s) 199.

The devices 110 and 115 may be in a same physical environment (e.g., house, office, etc.) and may be connected in a number of ways. They may be connected in a local area network (LAN). They may be connected in a peer-to-peer (P2P) network. They may be connected through another wireless arrangement such as through a connection using at least one of the following standards IEEE 802.15.4 (ZigBee), IEEE 802.15.1 (Bluetooth), IEEE 802.11 (WiFi), or any other personal area network (PAN) message protocol. They may be directly connected (either physically or wirelessly) or may be connected through another device such as an access point, router, etc. In certain situations, devices 110 and 115 may be geographically separated from each other but may be connected through a virtual private network (VPN) or the like. In such a situation a capture device 115 may send raw data to a host device 110 (as discussed below) over the VPN (or other enhanced connection) so the host device 110 may operate on the raw data before sending interim/intermediate data to the system component(s) 120 as discussed herein.

Although the figures and discussion of the present disclosure illustrate certain steps in a particular order, the steps described may be performed in a different order (as well as certain steps removed or added) without departing from the present disclosure.

A device 110/115 may receive audio corresponding to a spoken natural language input originating from the user 5. The device 110/115 may process audio following detection of a wakeword or other wake command such as a button press, gesture detection, etc. The device 110/115 may generate audio data corresponding to the audio, and may send the audio data 111 for further speech processing. For example, the device 110/115 may send the audio data to the system 120 via an application that is installed on the device 110/115 and associated with the system 120. An example of such an application is the Amazon Alexa application that may be installed on a smart phone, tablet, or the like. In some implementations, the device 110/115 may receive text data 213 corresponding to a natural language input originating from the user 5, and send the text data to the system 120. The device 110/115 may also receive output data from the system 120, and generate a synthesized speech output. The device 110/115 may include a camera for capturing image and/or video data for processing by the system 120. Examples of various devices 110/115 are further illustrated in FIG. 19. The system 120 may be a remote system such as a group of computing components located geographically remote from device 110/115 but accessible via network 199 (for example, servers accessible via the internet). The system 120 may also include a remote system that is physically separate from device 110/115 but located geographically close to device 110/115 and accessible via network 199 (for example a home server located in a same residence as device 110). System 120 may also include some combination thereof, for example where certain components/operations are performed via a home server(s) and others are performed via a geographically remote server(s).

As illustrated in FIG. 1, the system 100 may include user multiple devices 110/115 in a same environment as a user 5. In the example illustrated in FIG. 1, device 115 is a resource limited speech capture device and device 110 is a host speech processing device 110. A resource limited speech capture device 115 may comprise a device with fewer computing resources than a host speech processing device 110. The resource limited speech capture device 115 may comprise a smaller device such as a lightbulb, plug, thermostat, appliance, wearable, etc. that ha certain speech-related and computing capabilities, but not others. For example, the resource limited speech capture device 115 may have a microphone, wakeword detector, communication components, and certain computing components that allow the resource limited speech capture device 115 to effectively capture and send audio data (and to execute other device-specific functions such as turning on a light, enabling and disabling electrical power to a plug, or the like). However the resource limited speech capture device 115 may not have the capability to perform detailed speech processing such as ASR, NLU, etc. Further, the resource limited speech capture device 115 may not have the capability to perform voice masking or other operations that enable the resource limited speech capture device 115, on its own, to operate in a voice privacy mode.

The host speech processing device 110 may include more computing resources than the resource limited speech capture device 115. For example, the host speech processing device 110 may comprise speech processing components such as those discussed below in reference to FIG. 3. The host speech processing device 110 may also include more processing power, memory capabilities, etc. than the resource limited speech capture device 115. Further, the host speech processing device 110 may be configured to operate in a host mode, that is the host speech processing device 110 may be capable of performing certain speech processing operations for utterances captured by other devices, such as other devices connected to the private network 10 (e.g., the resource limited speech capture device 115). Thus, if host mode is enabled for device 110, it may receive audio data from another device over the private network 10, and perform speech processing on that audio data. The speech processing performed may be inclusive speech processing (e.g., ASR, and NLU, and skill activate, and determining output data responsive to an utterance, etc.) or may include some portion of speech processing (e.g., all ASR and some NLU, some limited ASR, or some other combination of processing to respond to an utterance). While the illustrations herein discuss host devices 110 having more computing resources than devices 115, under certain system configurations the host device may act on behalf of other devices with similar computing resources. This may be due to various system configurations. Thus, the teachings herein may apply to a variety of host device and other device arrangements, such as when the host is configured to perform some computing functionality (such as operations to remove/obfuscate data according to an enhanced privacy mode) that the other device (e.g., a capture device) may not be configured to perform.

A voice privacy mode enables speech processing to be performed without voice data of the user being accessible to system component(s) that are outside of a specified home (or office, or other specified physical) environment. Such an environment may comprise the private network 10 (e.g., a local area network configured to allow communication among devices in a user's home, office, or the like). The private network 10 may include a combination of devices connected through wired connections and/or wireless connections. The private network 10 may allow devices to communicate with each other using the protections of the private network 10. The private network 10 may also allow devices to communicate (through an access point device or the like) with a wide area network (e.g., the internet) such as network(s) 199. The wide area network allows communication between devices within the private network 10 and outside the private network 10 (which may be located at a variety of physical locations) such as system component(s) 120 or the like.

If a user determines to operate device 110 in voice privacy mode the device 110 may adjust its operations to avoid sending data representing the user's voice outside the private network 10. This may include causing the device 110 to perform more speech processing on its own (for example using speech processing components such as those discussed below in reference to FIG. 3). This also may include causing the device 110 to perform operations to mask the voice data, for example by converting first audio data representing an utterance as spoken (e.g., audio data output by microphone(s) of device 110) to second data representing the contents of the utterance but no longer representing the voice of the speaking user and then sending the second data to another device (e.g., system component(s) 120) for further processing. This may include determining feature data that sufficiently represents the content of the utterance to allow for speech processing but does not include voice-recognizable features. This feature data may then be sent outside of the home environment to protect the privacy of the user's voice.

If a user determines to operate device 115 in voice privacy mode, however, other operations are needed. This is because capture device 115 may be resource limited and thus may not be capable of performing voice-masking operations that may be available to device 110. Thus, without the assistance of another device, voice privacy mode may not be possible when using device 115 for speech processing.

To enable voice privacy mode operation for device 115, the system 100 may, as described herein, use host speech processing device 110 to perform certain operations using audio data determined by resource limited speech capture device 115. Although FIG. 1 illustrates host speech processing device 110 as an enhanced speech-capture device that includes its own microphone(s), loudspeaker(s), etc., the physical host speech processing device 110 may be a different kind of device, such as a home server or the like, that is capable of performing the processing of audio data determined by resource limited speech capture device 115 as described herein. Unless explicitly stated otherwise, the host speech processing device 110 need not necessarily be capable of capturing an utterance on its own.

Voice privacy mode may also be turned on and/or off, depending on system constraints and user preferences. When voice privacy mode is active for a device, the system 100 will take steps to complete speech processing without sending voice-identifiable data outside of a home environment (e.g., private network 10). When voice privacy mode is inactive for a device, the system 100 will take steps to most efficiently respond to an utterance, which may include local and/or remote speech processing.

As illustrated in FIG. 1, a first speech enabled device, e.g., resource limited speech capture device 115, may capture audio of a first voice command generated by a user 5. For example, the first device 115 may receive first audio corresponding to a spoken natural language input (e.g., an utterance) originating from a user 5 and may generate first audio data 111 corresponding to the first audio. The first device 115 may detect (130) an utterance and detect that the utterance was system directed. For example, the first device 115 may determine that a physical button was pressed, that the utterance included a wakeword, that the audio was captured as part of a multi-turn exchange, and/or otherwise determine some indication that the utterance is system directed and the system should perform speech processing.

A second device, e.g., host speech processing device 110, and/or the remote system component(s) 120 may be configured to perform speech processing, enabling the system 100 to interpret the voice command using the second device 110, the remote system component(s) 120, or a combination thereof. As can be appreciated, the remote system component(s) 120 may have expandable language processing capability (e.g., capable of processing a large number of requests simultaneously through an expandable cloud computing configuration), while the host device 110 may have limited processing capability (e.g., a resource constrained device capable of doing a certain, but relatively limited, amount of processing).

As illustrated in FIG. 1, the devices 110 and 115 may be connected to a private network 10 associated with an environment of the devices 110/115 (e.g., home, business, etc.). Thus, the devices 110 may communicate with each other using the private network 10, even if the private network 10 is not connected to remote networks (e.g., the internet) via network(s) 199.

To determine how to process to process the particular utterance, the system 100 may determine (132) whether an enhanced privacy mode (such as a voice privacy mode, image privacy mode, etc.) is active for the first device 115. For example, the first device 115 may check its settings to determine if voice privacy mode is active. If enhanced privacy mode is not active (132: No), the first device 115 may send (134) the audio data 111 to host device 110 and/or remote system component(s) 120 for processing and may ultimately receive (146) output data/directive data causing execution of an action responsive to the utterance, as generally described herein. If enhanced privacy mode is active (132: Yes), the first device 115 will send (136) its audio data 111 using the private network 10 to the second device 110, the host device, for processing. The host device 110 may then perform (138) preliminary ASR processing using the audio data 111. Such processing may be sufficient to remove voice-identifiable information and may result in interim ASR data 112, such as lattice data, acoustic modeling output data, language model output data, score data, or the like, such as that discussed below in reference to, for example, FIGS. 5A-6, 13, etc. The interim ASR data 112 may include some representation of the utterance, but may require further processing to determine a transcript or similar data representing the final estimate of the text of the utterance. The host device 110 may then send (140) the interim ASR data 112 to the first device 115 (for example, over the private network 10). The first device 115 may then send (142) (for example, over the wide area network 199) the interim ASR data 112 to the system component(s) 120 for further speech processing including completion of the ASR, NLU processing, skill selection/activation, etc. The interim ASR data 112 may also be sent with other metadata such as a device ID corresponding to the first device 115, an utterance ID (which may be determined by the first device 115 and may also be sent with the audio data 111 from the first device 115 to the host device 110), time data, etc. The system component(s) 120 may receive the interim ASR data and complete (144) the speech processing to determine output data responsive to the utterance. For example, if the utterance resulted in an action that will require operation by the first device 115 and/or the host device 110, the output data may include a directive instructing the proper operation by the appropriate device 110/115. The output data may also include data representing synthesized speech responsive to the utterance. The device 110/115 may thus receive (146) the output data/directive data from the system component(s) 120 and may take further action accordingly. In this manner the system 100 may perform speech processing of an utterance captured by a capture device 115 without sending data representing the speaking voice outside of a specified home environment (e.g., private network 10). Further details of these operations are described below.

The system 100 may operate using various components as described in FIG. 2. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/115/system 100. In at least some embodiments, such determination that speech is directed at the device 110/115/system 100 may be made using a wakeword detection component 220. The wakeword detection component 220 may be configured to detect various wakewords. In at least some examples, each wakeword may correspond to a name of a different digital assistant. An example wakeword/digital assistant name is "Alexa." In another example, input to the system may be in form of text data 213, for example as a result of a user typing an input into a user interface of device 110/115. Other input forms may include indication that the user has pressed a physical or virtual button on device 110/115, the user has made a gesture, etc. Such a button press, physical gesture, etc. may function as a wake command to cause the device 110/115/system 100 to perform further data capture/processing. The device 110/115 may also capture images using camera(s) 1718 of the device 110/115 and may send image data 221 representing those image(s) to the system component(s) 120. The image data 221 may include raw image data or image data processed by the device 110/115 before sending to the system component(s) 120. The image data 221 may be used in various manners by different components of the system to perform operations such as determining whether a user is directing an utterance to the system, interpreting a user command, responding to a user command, performing image processing using image processing components 240/340 (as discussed below), etc.

The wakeword detector 220 of the device/115 may process the audio data, representing the audio 11, to determine whether speech is represented therein. The device/115 may use various techniques to determine whether the audio data includes speech. In some examples, the device/115 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device/115 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 220 and/or input is detected by an input detector, the device 110 may "wake" and begin transmitting audio data 111, representing the audio 11, to the system component(s) 120 or other component for speech processing. The audio data 111 may include data corresponding to the wakeword; in other embodiments, the portion of the audio corresponding to the wakeword is removed by the device 110 prior to sending the audio data 111 to the system component(s) 120. In the case of touch input detection or gesture based input detection, the audio data may not include a wakeword, but may use some other technique to determine the user's input should be processed by the system 100.

In some implementations, the system 100 may include more than one set of system component(s) 120. The system component(s) 120 may respond to different wakewords and/or perform different categories of tasks. Each set of system component(s) 120 may be associated with its own wakeword such that speaking a certain wakeword results in audio data be sent to and processed by a particular system. For example, detection of the wakeword "Alexa" by the wakeword detector 220 may result in sending audio data to system component(s) 120a for processing while detection of the wakeword "Computer" by the wakeword detector may result in sending audio data to system component(s) 120b for processing. The system component(s) may have a separate wakeword and system for different skills/systems (e.g., "Dungeon Master" for a game play skill/system 120c) and/or such skills/systems may be coordinated by one or more skill(s) 290 of one or more system component(s) 120.

Upon receipt by the system component(s) 120, the audio data 111 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 may send the audio data 111 to a language processing component 292. The language processing component 292 (sometimes also referred to as a spoken language understanding (SLU) component) includes an automatic speech recognition (ASR) component 250 and a natural language understanding (NLU) component 260. The ASR component 250 may transcribe the audio data 111 into text data. The text data output by the ASR component 250 represents one or more than one (e.g., in the form of an N-best list) ASR hypotheses representing speech represented in the audio data 111. The ASR component 250 interprets the speech in the audio data 111 based on a similarity between the audio data 111 and pre-established language models. For example, the ASR component 250 may compare the audio data 111 with models for sounds (e.g., acoustic units such as phonemes, senons, phones, etc.) and sequences of sounds to identify words that match the sequence of sounds of the speech represented in the audio data 111. The ASR component 250 sends the text data generated thereby to an NLU component 260, via, in some embodiments, the orchestrator component 230. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein. The ASR component 250 is described in greater detail below with regard to FIG. 4.

The speech processing system 292 may further include a NLU component 260. The NLU component 260 may receive the text data from the ASR component. The NLU component 260 may attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the device 110, the system component(s) 120, a skill component 290, a skill system component(s) 125, etc.) to execute the intent. For example, if the text data corresponds to "play the $5^{th}$ Symphony by Beethoven," the NLU component 260 may determine an intent that the system output music and may identify "Beethoven" as an artist/composer and "5th Symphony" as the piece of music to be played. For further example, if the text data corresponds to "what is the weather," the NLU component 260 may determine an intent that the system output weather information associated with a geographic location of the device 110. In another example, if the text data corresponds to "turn off the lights," the NLU component 260 may determine an intent that the system turn off lights associated with the device 110 or the user 5. However, if the NLU component 260 is unable to resolve the entity—for example, because the entity is referred to by anaphora such as "this song" or "my next appointment"—the speech processing system 292 can send a decode request to another speech processing system 292 for information regarding the entity mention and/or other context related to the utterance. The speech processing system 292 may augment, correct, or base results data upon the audio data 111 as well as any data received from the other speech processing system 292.

The NLU component 260 may return NLU results data 885/825 (which may include tagged text data, indicators of intent, etc.) back to the orchestrator 230. The orchestrator 230 may forward the NLU results data to a skill component(s) 290. If the NLU results data includes a single NLU hypothesis, the NLU component 260 and the orchestrator component 230 may direct the NLU results data to the skill component(s) 290 associated with the NLU hypothesis. If the NLU results data 885/825 includes an N-best list of NLU hypotheses, the NLU component 260 and the orchestrator component 230 may direct the top scoring NLU hypothesis to a skill component(s) 290 associated with the top scoring NLU hypothesis. The system may also include a post-NLU ranker 265 which may incorporate other information to rank potential interpretations determined by the NLU component 260. The host device 110 may also include its own post-NLU ranker 365, which may operate similarly to the post-NLU ranker 265. The NLU component 260, post-NLU ranker 265 and other components are described in greater detail below with regard to FIGS. 7 and 8.

A skill component may be software running on the system component(s) 120 that is akin to a software application. That is, a skill component 290 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 290. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 290 may operate in conjunction between the system component(s) 120 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

A skill support system(s) component(s) 125 may communicate with a skill component(s) 290 within the system component(s) 120 and/or directly with the orchestrator component 230 or with other components. A skill support system(s) component(s) 125 may be configured to perform one or more actions. An ability to perform such action(s) may sometimes be referred to as a "skill." That is, a skill may enable a skill support system(s) component(s) 125 to execute specific functionality in order to provide data or perform some other action requested by a user. For example, a weather service skill may enable a skill support system(s) component(s) 125 to provide weather information to the system component(s) 120, a car service skill may enable a skill support system(s) component(s) 125 to book a trip with respect to a taxi or ride sharing service, an order pizza skill may enable a skill support system(s) component(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 290 dedicated to interacting with the skill support system(s) component(s) 125. Unless expressly stated otherwise, reference to a skill, skill device, or skill component may include a skill component 290 operated by the system component(s) 120 and/or skill operated by the skill support system(s) 125. Moreover, the functionality described herein as a skill or skill may be referred to using many different terms, such as an action, bot, app, or the like. The skill 290 and or skill support system(s) 125 may return output data to the orchestrator 230.

The system component(s) 120 may include a language output component 293. The language output component 293 includes a natural language generation (NLG) component 279 and a text-to-speech (TTS) component 280. The NLG component 279 can generate text for purposes of TTS output to a user. For example the NLG component 279 may generate text corresponding to instructions corresponding to a particular action for the user to perform. The NLG component 279 may generate appropriate text for various outputs as described herein. The NLG component 279 may include one or more trained models configured to output text appropriate for a particular input. The text output by the NLG component 279 may become input for the TTS component 280. Alternatively or in addition, the TTS component 280 may receive text data from a skill 290 or other system component for output.

The NLG component 279 may include a trained model. The NLG component 279 generates text data such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 280.

The TTS component 280 may generate audio data (e.g., synthesized speech) from text data using one or more different methods. Text data input to the TTS component 280 may come from a skill component 290, the orchestrator component 230, or another component of the system. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The device 110/115 may include still image and/or video capture components such as a camera or cameras to capture one or more images. The device 110/115 may include circuitry for digitizing the images and/or video for transmission to the system component(s) 120 as image data. The device 110/115 may further include circuitry for voice command-based control of the camera, allowing a user 5 to request capture of image or video data. The device 110 may process the commands locally or send audio data 111 representing the commands to the system component(s) 120 for processing, after which the system component(s) 120 may return output data that can cause the device 110/115 to engage its camera.

Upon receipt by the system component(s) 120, the image data 221 may be sent to an orchestrator component 230. The orchestrator component 230 may send the image data 221 to an image processing component 240. The image processing component 240 can perform computer vision functions such as object recognition, modeling, reconstruction, etc. For example, the image processing component 240 may detect a person, face, etc. (which may then be identified using user recognition component 295). The image processing component 240 is described in greater detail below with regard to FIG. 9. The device 110 may also include an image processing component 340 which operates similarly to image processing component 240.

In some implementations, the image processing component 240 can detect the presence of text in an image. In such implementations, the image processing component 240 can recognize the presence of text, convert the image data to text data, and send the resulting text data via the orchestrator component 230 to the language processing component 292 for processing by the NLU component 260.

The system component(s) 120 may include a user recognition component 295 that recognizes one or more users using a variety of data. However, the disclosure is not limited thereto, and the device 110 may include a user recognition component 395 instead of and/or in addition to user recognition component 295 of the system component(s) 120 without departing from the disclosure. User recognition component 395 operates similarly to user recognition component 295.

The user-recognition component 295 may take as input the audio data 111 and/or text data output by the ASR component 250. The user-recognition component 295 may perform user recognition by comparing audio characteristics in the audio data 111 to stored audio characteristics of users. The user-recognition component 295 may also perform user recognition by comparing biometric data (e.g., fingerprint data, iris data, etc.), received by the system in correlation with the present user input, to stored biometric data of users assuming user permission and previous authorization. The user-recognition component 295 may further perform user recognition by comparing image data (e.g., including a representation of at least a feature of a user), received by the system in correlation with the present user input, with stored image data including representations of features of different users. The user-recognition component 295 may perform additional user recognition processes, including those known in the art.

The user-recognition component 295 determines scores indicating whether user input originated from a particular user. For example, a first score may indicate a likelihood that the user input originated from a first user, a second score may indicate a likelihood that the user input originated from a second user, etc. The user-recognition component 295 also determines an overall confidence regarding the accuracy of user recognition operations.

Output of the user-recognition component 295 may include a single user identifier corresponding to the most likely user that originated the user input. Alternatively, output of the user-recognition component 295 may include an N-best list of user identifiers with respective scores indicating likelihoods of respective users originating the user input. The output of the user-recognition component 295 may be used to inform NLU processing as well as processing performed by other components of the system.

The system 100 (either on device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 270 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system component(s) 120 may also include a sentiment detection component 275 that may be configured to detect a sentiment of a user from audio data representing speech/utterances from the user, image data representing an image of the user, and/or the like as described in greater detail below with regard to FIG. 12. The sentiment detection component 275 may be included in system component(s) 120, as illustrated in FIG. 2, although the disclosure is not limited thereto and the sentiment detection component 275 may be included in other components without departing from the disclosure. For example the sentiment detection component 375 may be included in the device 110, as a separate component, etc. Sentiment detection component 375 may operate similarly to sentiment detection component 275. The system component(s) 120 may use the sentiment detection component 275 to, for example, customize a response for a user based on an indication that the user is happy or frustrated.

Figure 3:
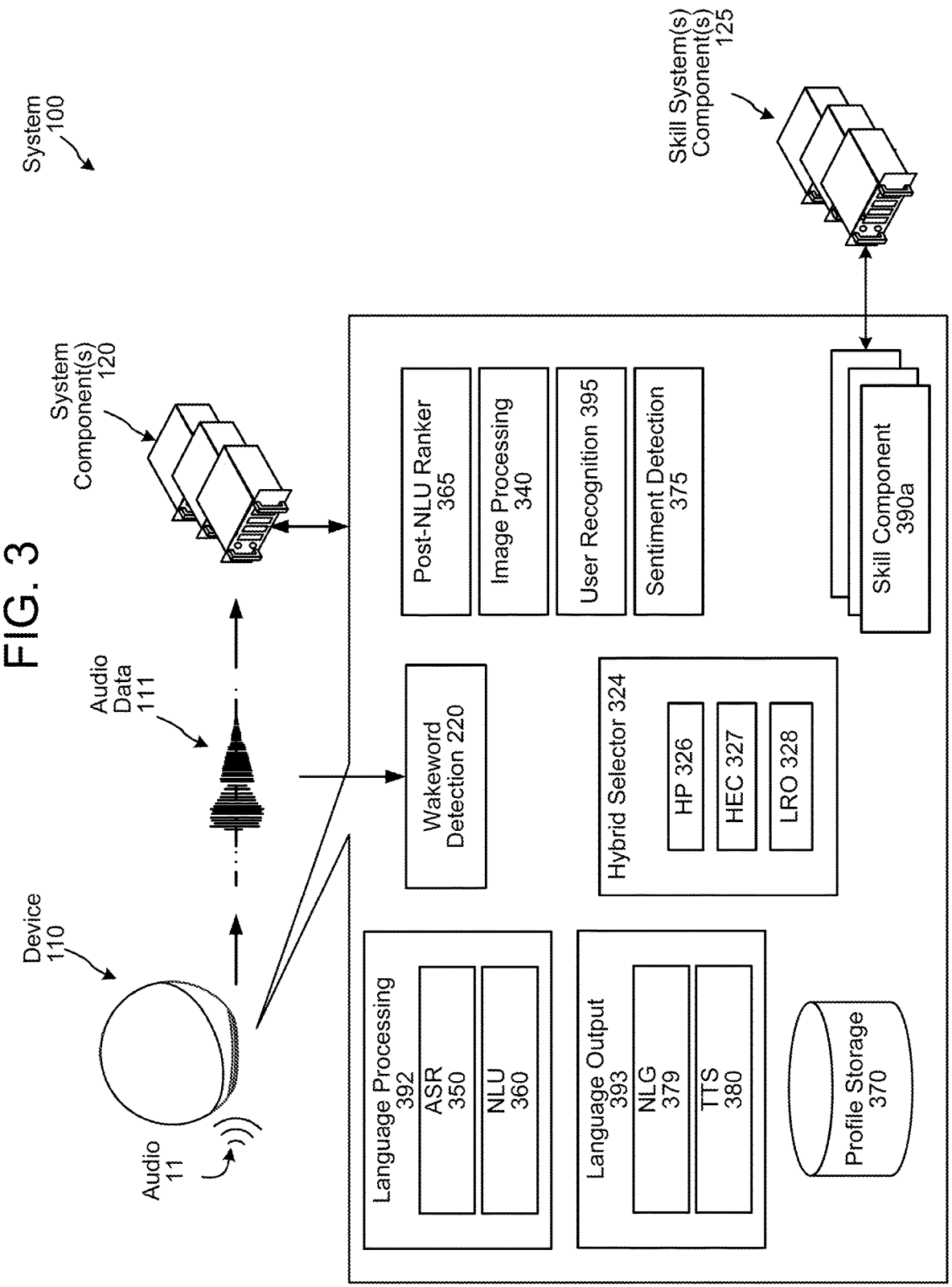
FIG. 3 is a conceptual diagram illustrating components that may be included in a device, according to embodiments of the present disclosure.

Although the components of FIG. 2 may be illustrated as part of system component(s) 120, device 110, or otherwise, the components may be arranged in other device(s) (such as in device 110 if illustrated in system component(s) 120 or vice-versa, or in other device(s) altogether) without departing from the disclosure. FIG. 3 illustrates such a configured device 110.

In at least some embodiments, the system component(s) 120 may receive the audio data 111 from the device 110/115, to recognize speech corresponding to a spoken input in the received audio data 111, and to perform functions in response to the recognized speech. In at least some embodiments, these functions involve sending directives (e.g., commands), from the system component(s) 120 to the device 110 (and/or other devices 110/115) to cause the device 110/115 to perform an action, such as output an audible response to the spoken input via a loudspeaker(s), and/or control secondary devices in the environment by sending a control command to the secondary devices.

Thus, when the device 110 is able to communicate with the system component(s) 120 over the network(s) 199, some or all of the functions capable of being performed by the system component(s) 120 may be performed by sending one or more directives over the network(s) 199 to the device 110, which, in turn, may process the directive(s) and perform one or more corresponding actions. For example, the system component(s) 120, using a remote directive that is included in response data (e.g., a remote response), may instruct the device 110 to output an audible response (e.g., using TTS processing performed by an on-device TTS component 380) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on. The device 110 and system component(s) 120 may thus coordinate to process data for an utterance and respond accordingly thereto. This may involve speech processing being performed by the device 110 and/or the system component(s) 120 to respond to an utterance in a hybrid manner.

As noted with respect to FIG. 2, the device 110 may include a wakeword detection component 220 configured to compare the audio data 111 to stored models used to detect a wakeword (e.g., "Alexa") that indicates to the device 110 that the audio data 111 is to be processed for determining NLU output data (e.g., slot data that corresponds to a named entity, label data, and/or intent data, etc.). In at least some embodiments, a hybrid selector 324, of the device 110, may send the audio data 111 to the wakeword detection component 220. If the wakeword detection component 220 detects a wakeword in the audio data 111, the wakeword detection component 220 may send an indication of such detection to the hybrid selector 324. In response to receiving the indication, the hybrid selector 324 may send the audio data 111 to the system component(s) 120 and/or the ASR component 350. The wakeword detection component 220 may also send an indication, to the hybrid selector 324, representing a wakeword was not detected. In response to receiving such an indication, the hybrid selector 324 may refrain from sending the audio data 111 to the system component(s) 120, and may prevent the ASR component 350 from further processing the audio data 111. In this situation, the audio data 111 can be discarded.

The device 110 may conduct its own speech processing using on-device language processing components, such as an SLU/language processing component 392 (which may include an ASR component 350 and an NLU 360), similar to the manner discussed herein with respect to the SLU component 292 (or ASR component 250 and the NLU component 260) of the system component(s) 120. Language processing component 392 may operate similarly to language processing component 292, ASR component 350 may operate similarly to ASR component 250 and NLU component 360 may operate similarly to NLU component 260. The device 110 may also internally include, or otherwise have access to, other components such as one or more skill components 390 capable of executing commands based on NLU output data or other results determined by the device 110/system component(s) 120 (which may operate similarly to skill components 290), a user recognition component 395 (configured to process in a similar manner to that discussed herein with respect to the user recognition component 295 of the system component(s) 120), profile storage 370 (configured to store similar profile data to that discussed herein with respect to the profile storage 270 of the system component(s) 120), or other components. In at least some embodiments, the profile storage 370 may only store profile data for a user or group of users specifically associated with the device 110. Similar to as described above with respect to skill component 290, a skill component 390 may communicate with a skill system(s) component(s) 125. The device 110 may also have its own language output component 393 which may include NLG component 379 and TTS component 380. Language output component 393 may operate similarly to language processing component 293, NLG component 379 may operate similarly to NLG component 279 and TTS component 380 may operate similarly to TTS component 280.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system component(s) 120.

The hybrid selector 324, of the device 110, may include a hybrid proxy (HP) 326 configured to proxy traffic to/from the system component(s) 120. For example, the HP 326 may be configured to send messages to/from a hybrid execution controller (HEC) 327 of the hybrid selector 324. For example, command/directive data received from the system component(s) 120 can be sent to the HEC 327 using the HP 326. The HP 326 may also be configured to allow the audio data 111 to pass to the system component(s) 120 while also receiving (e.g., intercepting) this audio data 111 and sending the audio data 111 to the HEC 327.

In at least some embodiments, the hybrid selector 324 may further include a local (e.g., on-device) request orchestrator (LRO) 328 configured to notify the ASR component 350 about the availability of new audio data 111 that represents user speech, and to otherwise initiate the operations of local language processing when new audio data 111 becomes available. In general, the hybrid selector 324 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system component(s) 120 and chooses to use that remotely-determined directive data.

Thus, when the audio data 111 is received, the HP 326 may allow the audio data 111 to pass through to the system component(s) 120 and the HP 326 may also input the audio data 111 to the on-device ASR component 350 by routing the audio data 111 through the HEC 327 of the hybrid selector 324, whereby the LRO 328 notifies the ASR component 350 of the audio data 111. At this point, the hybrid selector 324 may wait for response data from either or both of the system component(s) 120 or the local language processing components. However, the disclosure is not limited thereto, and in some examples the hybrid selector 324 may send the audio data 111 only to the local ASR component 350 without departing from the disclosure. For example, the device 110 may process the audio data 111 locally without sending the audio data 111 to the system component(s) 120.

The local ASR component 350 is configured to receive the audio data 111 from the hybrid selector 324, and to recognize speech in the audio data 111, and the local NLU component 360 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 360) may be selected as usable to respond to a natural language user input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language user input, to use directive data received from the system component(s) 120, assuming a remote response is even received (e.g., when the device 110 is able to access the system component(s) 120 over the network(s) 199), or to determine output audio requesting additional information from the user 5.

The device 110 and/or the system component(s) 120 may associate a unique identifier with each natural language user input. The device 110 may include the unique identifier when sending the audio data 111 to the system component(s) 120, and the response data from the system component(s) 120 may include the unique identifier to identify which natural language user input the response data corresponds.

In at least some embodiments, the device 110 may include, or be configured to use, one or more skill components 390 that may work similarly to the skill component(s) 290 implemented by the system component(s) 120. The skill component(s) 390 may correspond to one or more domains that are used in order to determine how to act on a spoken input in a particular way, such as by outputting a directive that corresponds to the determined intent, and which can be processed to implement the desired operation. The skill component(s) 390 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems component(s) 125. For example, a skill system component(s) 125 may be located in a remote environment (e.g., separate location) such that the device 110 may only communicate with the skill system component(s) 125 via the network(s) 199. However, the disclosure is not limited thereto. For example, in at least some embodiments, a skill system component(s) 125 may be configured in a user's physical environment (e.g., home server and/or the like) such that the device 110 may communicate with the skill system component(s) 125 via a private network 10, such as a local area network (LAN).

As used herein, a "skill" may refer to a skill component 390, a skill system 125, or a combination of a skill component 390 and corresponding skill system component(s) 125.

Similar to the manner discussed with regard to FIG. 2, the user device 110 may be configured to recognize multiple different wakewords and/or perform different categories of tasks depending on the wakeword. Such different wakewords may invoke different processing components of user device 110 (not illustrated in FIG. 3). For example, detection of the wakeword "Alexa" by the wakeword detector 220 may result in sending audio data to certain language processing components 392/skills 390 for processing while detection of the wakeword "Computer" by the wakeword detector may result in sending audio data different language processing components 392/skills 390 for processing.

As noted above, a device 110 may be considered a host device that is capable of performing speech processing not only for utterances captured by that device but also capable of performing speech processing for utterances captured by other devices that are connected to the host device, such as devices connected to the host device over a private network 10. Such a host device may use speech processing components such as 392, 393, or the like, to perform speech processing on behalf of other device connectable over the private network 10 as discussed herein.

Figure 4:
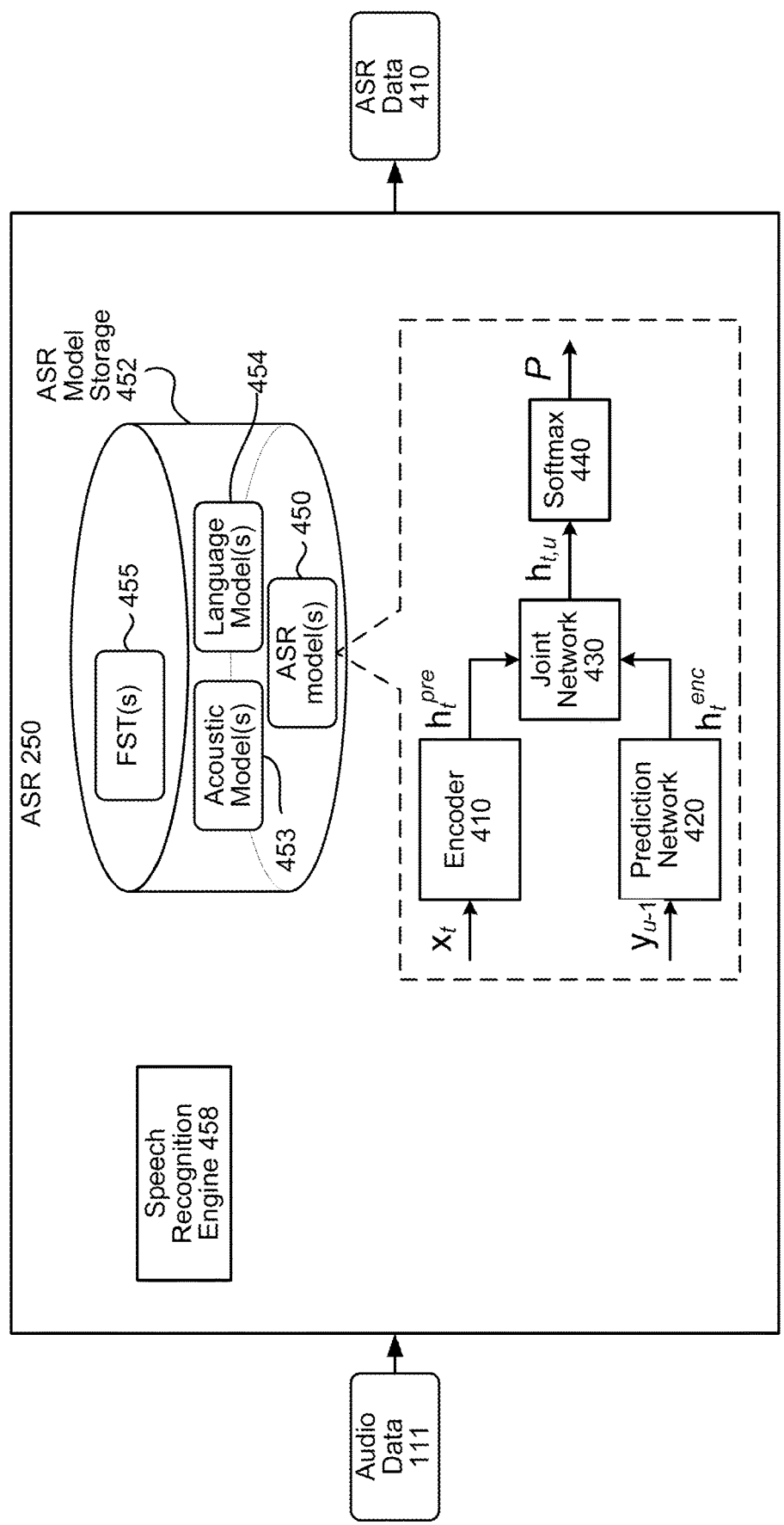
FIG. 4 is a conceptual diagram of an ASR component, according to embodiments of the present disclosure.

FIG. 4 is a conceptual diagram of an ASR component 250, according to embodiments of the present disclosure. The ASR component 250 may interpret a spoken natural language input based on the similarity between the spoken natural language input and pre-established language models 454 stored in an ASR model storage 452. For example, the ASR component 250 may compare the audio data with models for sounds (e.g., subword units or phonemes) and sequences of sounds to identify words that match the sequence of sounds spoken in the natural language input. Alternatively, the ASR component 250 may use a finite state transducer (FST) 455 to implement the language model functions.

When the ASR component 250 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 453 stored in the ASR model storage 452), and the likelihood that a particular word, which matches the sounds, would be included in the sentence at the specific location (e.g., using a language or grammar model 454). Based on the considered factors and the assigned confidence score, the ASR component 250 may output an ASR hypothesis that most likely matches the spoken natural language input, or may output multiple ASR hypotheses in the form of a lattice or an N-best list, with each ASR hypothesis corresponding to a respective score.

The ASR component 250 may include a speech recognition engine 458. The ASR component 250 receives audio data 111 (for example, received from a user device 110 having processed audio detected by a microphone by an acoustic front end (AFE) or other component). The speech recognition engine 458 compares the audio data 111 with acoustic models 453, language models 454, FST(s) 455, and/or other data models and information for recognizing the speech conveyed in the audio data. The audio data 111 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data may arrive at the supporting device(s) 120 encoded, in which case they may be decoded by the speech recognition engine 458 and/or prior to processing by the speech recognition engine 458.

The speech recognition engine 458 may process the audio data 111 with reference to information stored in the ASR model storage 452. Feature vectors of the audio data 111 may arrive at the system component(s) 120 encoded, in which case they may be decoded prior to processing by the speech recognition engine 458.

The speech recognition engine 458 attempts to match received feature vectors to language acoustic units (e.g., phonemes) and words as known in the stored acoustic models 453, language models 2B54, and FST(s) 455. For example, audio data 111 may be processed by one or more acoustic model(s) 453 to determine acoustic unit data. The acoustic unit data may include indicators of acoustic units detected in the audio data 111 by the ASR component 250. For example, acoustic units can consist of one or more of phonemes, diaphonemes, tonemes, phones, diphones, triphones, or the like. The acoustic unit data (such as 1315 discussed below) can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 454 (and/or using FST 455) to determine ASR data 410. The ASR data 410 can include one or more hypotheses. One or more of the hypotheses represented in the ASR data 410 may then be sent to further components (such as the NLU component 260) for further processing as discussed herein. The ASR data 410 may include representations of text of an utterance, such as words, subword units, or the like.

The speech recognition engine 458 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 250 will output ASR hypotheses that make sense grammatically. The specific models used may be general models or may be models corresponding to a particular domain, such as music, banking, etc.

The speech recognition engine 458 may use the acoustic model(s) 453 to attempt to match received audio feature vectors to words or subword acoustic units. An acoustic unit may be a senone, phoneme, phoneme in context, syllable, part of a syllable, syllable in context, or any other such portion of a word. The speech recognition engine 458 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 250 outputs ASR hypotheses that make sense grammatically.

The speech recognition engine 458 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 458, the state may change or stay the same, based on the processing of the new feature vectors. A Viterbi algorithm may be used to find the most likely sequence of states based on the processed feature vectors. Further techniques, such as using FSTs, may also be used.

In one example, the ASR engine 458 may receive a series of feature vectors for sound corresponding to a user saying "Hello how are you." The ASR engine 458 may attempt to match each feature vector with a phoneme. As new feature vectors are processed, the ASR engine 458 may determine state transitions (for example, using HMMs) to determine whether a probability of whether a state should either remain the same, or change to a new state, i.e., whether an incoming feature vector results in a state transition from one phone to another. As the processing continues, the ASR engine 458 continues calculating such state transition probabilities. After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the ASR engine 458 may also calculate potential states for other phonemes. In this manner multiple states and state transition probabilities may be calculated.

The probable states and probable state transitions calculated by the ASR engine 458 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 458 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 5A:
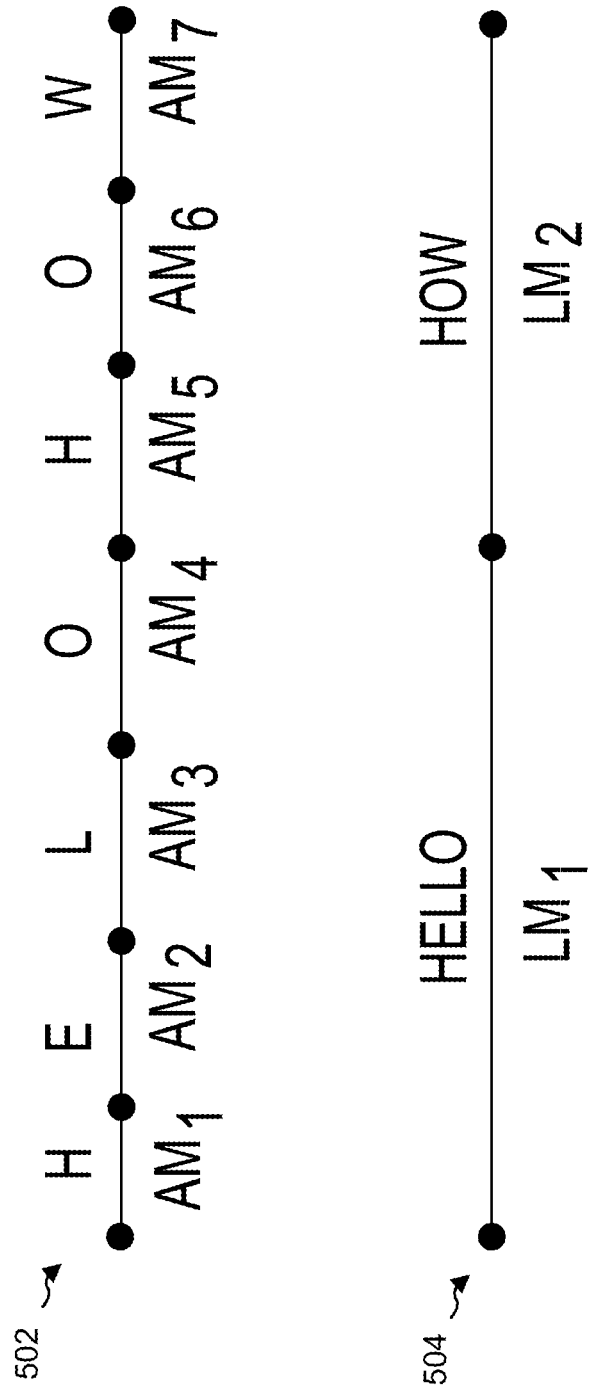
FIG. 5A illustrates phoneme processing and word processing according to one aspect of the present disclosure.

FIG. 5A illustrates the relationship between acoustic modeling and language modeling. As illustrated, each processed phoneme included in the path 502 is associated with an acoustic model score AM1 through AM7. The language model is then applied to associate each word in the path 504 with a language model score LM1 or LM2.

As part of the language modeling (or in other phases of the ASR processing) the speech recognition engine 458 may, to save computational resources, prune and discard low recognition score states or paths that have little likelihood of corresponding to the spoken utterance, either due to low recognition score pursuant to the language model, or for other reasons. Such pruned paths/hypotheses are considered inactive. Active hypotheses are hypotheses that are still under consideration by the speech recognition engine 458. Thus, active hypotheses may have a confidence score that is above a certain threshold as they have thus far avoided pruning. As ASR processing continues, at different points in the ASR processing different hypotheses may be considered "active" as other hypotheses are added and/or removed from active consideration based on incoming audio data and acoustic model processing. Further, during the ASR processing the speech recognition engine 458 may iteratively perform additional processing passes on previously processed utterance portions. Later passes may incorporate results of earlier passes to refine and improve results. Paths which are being currently processed and considered as a potential output of the system are thus considered active hypotheses.

Figure 5B:
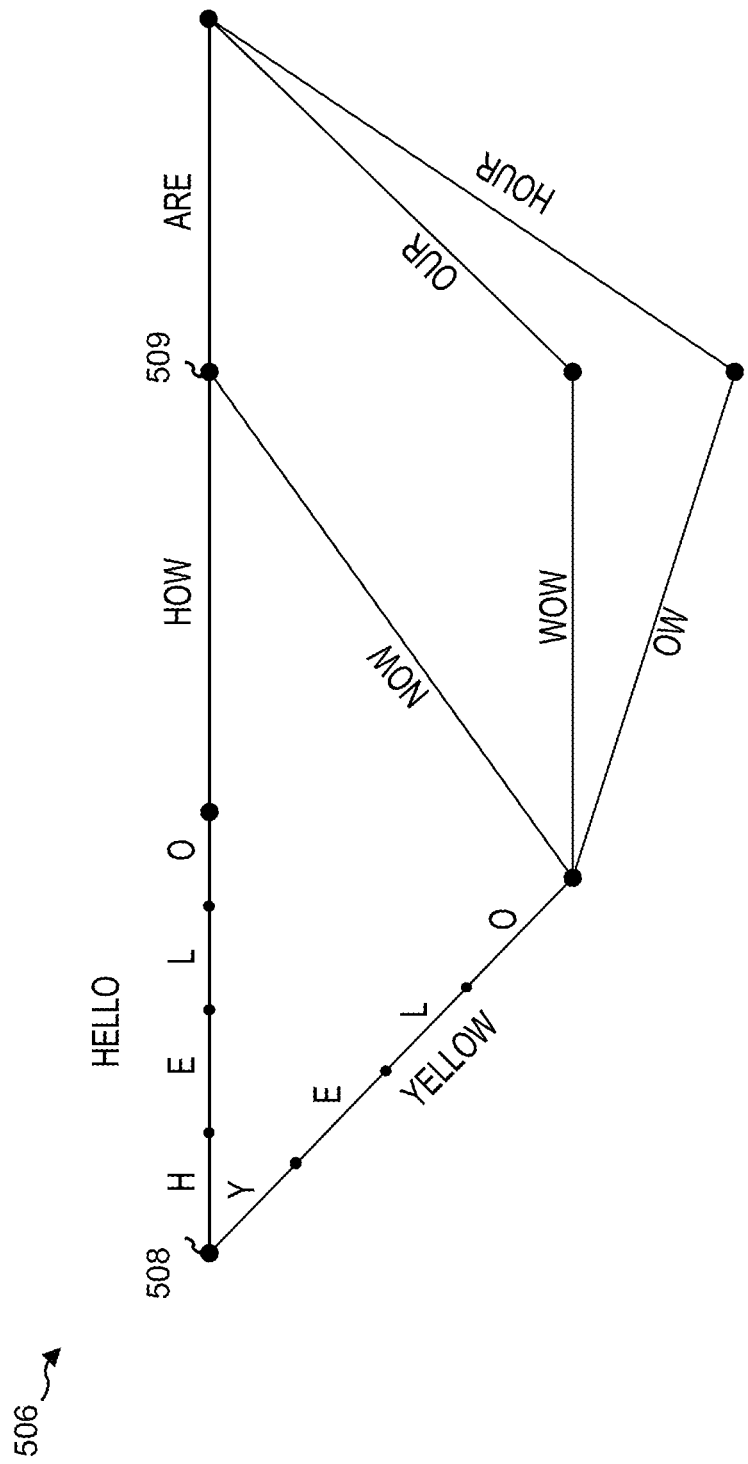
FIG. 5B illustrates a word lattice according to embodiments of the present disclosure.

FIG. 5B illustrates a speech recognition lattice 506 according to one aspect of the present disclosure. The speech recognition engine 458 may combine potential paths into a lattice representing speech recognition results. A sample lattice is shown in FIG. 5B. The lattice 506 shows multiple potential paths of speech recognition results. Paths between large nodes represent potential words (for example "hello", "yellow", etc.) and paths between smaller nodes represent potential phonemes (for example "H", "E", "L", "O" and "Y", "E", "L", "O"). For purposes of illustration, individual phonemes are only shown for the first two words of the lattice. The two paths between node 508 and node 509 represent two potential word choices, "hello how" or "yellow now". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the speech recognition engine 458 as the ASR result for the associated feature vectors.

Figure 5C:
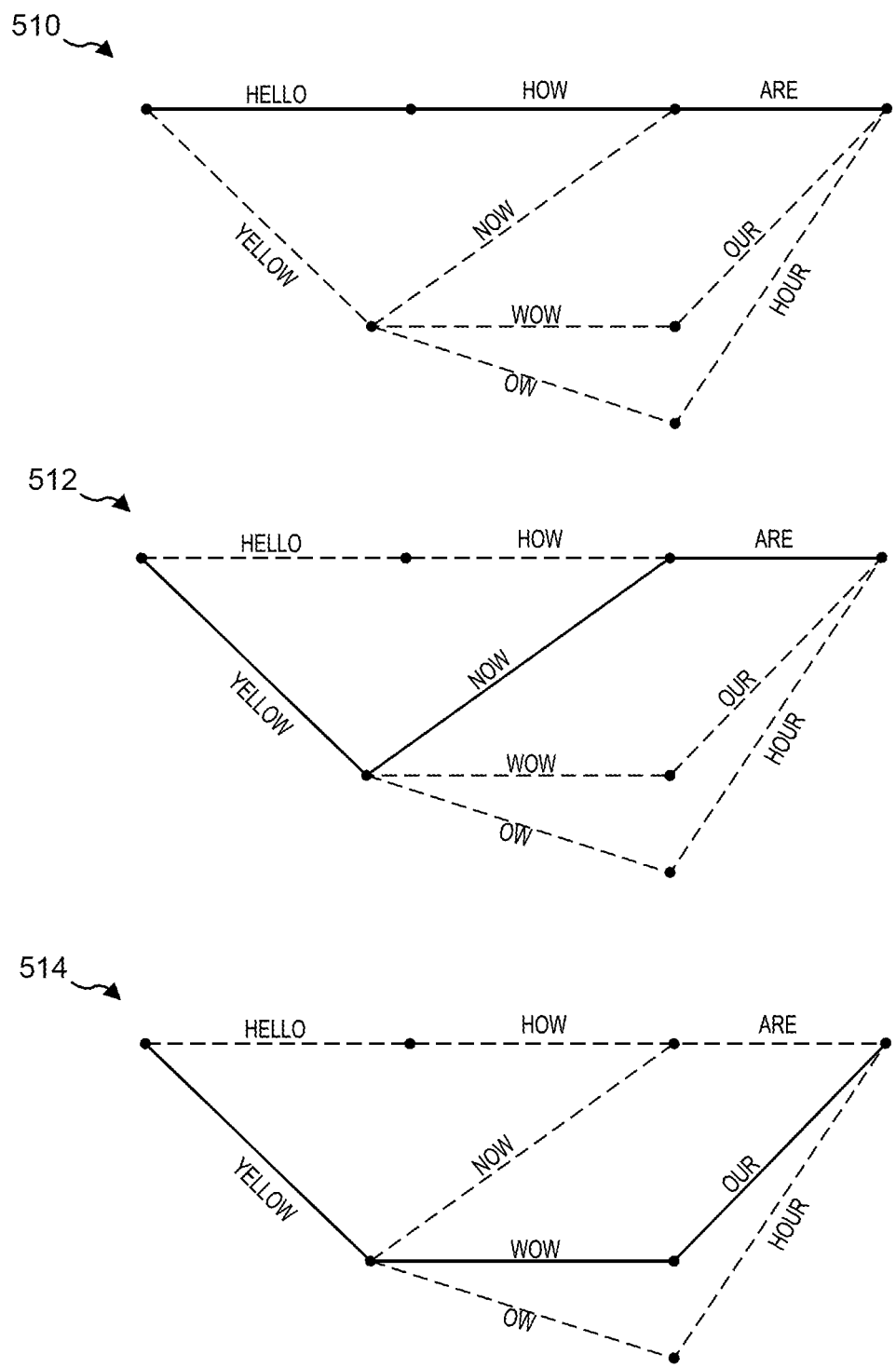
FIG. 5C illustrates different ways of traversing the lattice of FIG. 5B according to embodiments of the present disclosure.

FIG. 5C illustrates speech recognition lattices according to one aspect of the present disclosure, and FIG. 5D illustrates a number of hypotheses associated with the lattice of FIG. 5B. Illustrated in FIG. 5C are different potential paths 510, 512 and 514 along the lattice 506. As shown in FIG. 5C, path 510 results in "hello how are," path 512 results in "yellow now are" and path 514 results in "yellow wow our." As can be seen, many such paths are possible even in the small example lattice 506. An example of such paths 520-528 are shown in FIG. 5D. It is not uncommon for a speech recognition process to consider many thousands of different paths, i.e., hypotheses, when performing speech processing. Each hypotheses may be associated with a score, ranking it relative to other hypotheses. The score may be based on the input audio data, the processing from the acoustic model, the training of the language model, etc.

As the speech recognition engine 458 determines potential words from the input audio data, the lattice may become very large as many potential sounds and words are considered as potential matches for the input audio data. The potential matches may be illustrated as a word result network representing possible sequences of words that may be recognized and the likelihood of each sequence.

Figure 6:
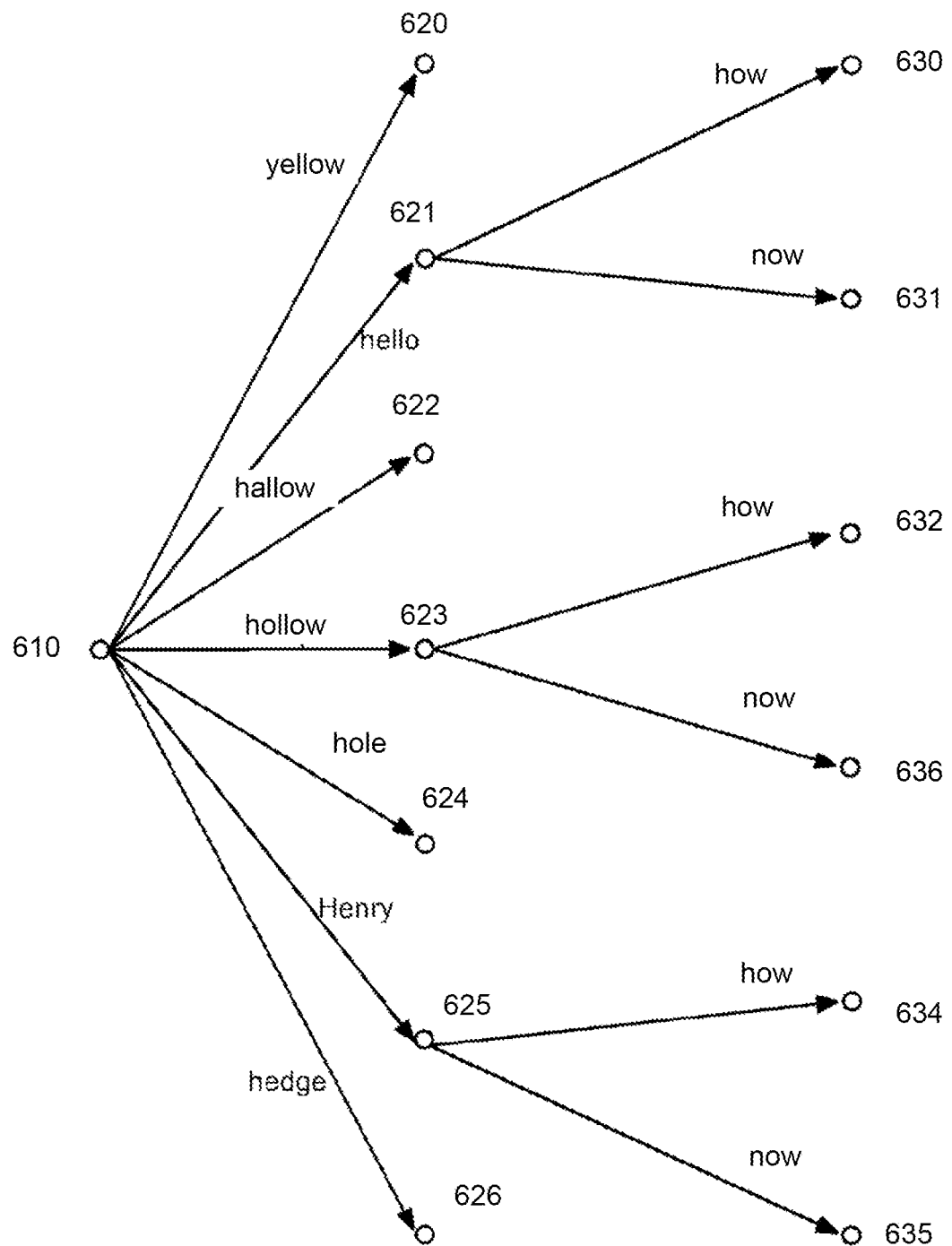
FIG. 6 illustrates a word result network, according to embodiments of the present disclosure.

As illustrated in FIG. 6, a word result network may start at initial node 610. At node 610, no words may have been recognized yet as the speech recognition engine 458 commences its processing. From node 610, the speech recognition engine 458 may create arcs and additional nodes where each arc may be associated with a potential word that may be recognized. In some applications, words may be represented by nodes instead of arcs. In FIG. 6, arcs from node 610 to nodes 620 to 626 are labeled with example words that may be recognized by the speech recognition engine 458.

From initial node 610, the speech recognition engine 458 may apply acoustic models 453 and language models 4 to determine which of the arcs leaving node 610 are most likely to occur. For an acoustic model 453 employing HMMs, the speech recognition engine 458 may create a separate HMM for each arc leaving node 610. Applying the acoustic model 453 and language model 454, the speech recognition engine 458 may decide to pursue some subset of the arcs leaving node 610. For example, in FIG. 6, the speech recognition engine 458 may decide to follow the paths starting with "yello", "hello", and "hallow" and may decide to stop pursuing the paths starting with "hollow", "hole", "Henry," and "hedge" based on the respective scores of those arcs, with the speech recognition engine 458 pursuing only the higher scoring arcs in an effort to concentrate computing resources on the arcs most likely to result in a correct result.

The speech recognition engine 458 may return an N-best list of paths along with their respective recognition scores, corresponding to the top N paths as determined by the speech recognition engine 458. Each path may correspond to a different ASR hypothesis.

In one aspect of the disclosure, the ASR engine 458 may use a finite state transducer (FST) to perform speech recognition. An FST is a graph that may include all possible words that may be recognized by the ASR engine 458. While the word result network of FIG. 6 may be created dynamically to recognize words, an FST may be static in that it is created in advance and the same FST may be used for the recognition of all utterances.

Although an FST is a graphical construct, when stored as data in the system, an FST may be represented as data in two or more tables. The two tables include a table of states (also referred to as nodes) and a table of arcs. The FST may optionally include a table of input labels and a table of output labels for particular arcs, though those label tables may be stored separately (and thus not be considered part of) the FST. Though this is configurable. As an example, the state/node table may contain a record for each state/node, with each state record consisting of the following four fields:

(1) Final score of the state,
(2) Offset in the arc array pointing to the beginning of the list of arcs outgoing from the state,
(3) Number of outgoing arcs with epsilon (E) input label, and
(4) Number of outgoing arcs with epsilon (E) output label.

Each of these fields may be represented by a particular N-bit integer (e.g., 16, 32, etc.). The integer size for a particular field may be different from that of a different field.

Thus, to represent a state with many outgoing arcs (for example, an initial state 0) the table entry for state 0 would include a final score of state 0, a pointer to the arc table corresponding to an arc table entry for a first arc outgoing from state 0, a number of outgoing arcs from state 0 with a null epsilon input label and a number of outgoing arcs from state 0 with a null epsilon input label. Although the entry for state 0 may only include a pointer to a first outgoing arc from state 0, the arc table and state table may be organized so that the entry in the state table for the next state, e.g., state 1, includes a pointer to the arc table for the first outgoing state from state 1.

The arcs table may contain the following information for each arc:

(1) Arc score,
(2) Next state ID (the end point of the arc)
(3) Input label (which may be a pointer to a label in a table of input labels)
(4) Output label (which may be a pointer to a label in a table of output labels)

Each of these fields may be represented by a particular N-bit integer. The integer size for a particular field may be different from that of a different field. Thus, to represent a particular arc, the entry in the arc table may include an arc score (e.g., 0.13863), the next state ID for the arc (e.g., state 6), the input label (e.g., a pointer in a table of input labels to input label 18, which may correspond to a particular acoustic unit), and the output label (which is epsilon and thus may be blank, or set to a particular value that represents epsilon, or may point to an entry in the table of output labels that represents epsilon).

During runtime ASR processing, the ASR engine 458 may take incoming audio feature vectors corresponding to audio frames and may process them with an acoustic model 453. For each processed feature vector, the acoustic model processing will then result in acoustic model output including a list of potential acoustic units corresponding to the feature vector along with a corresponding list of acoustic scores for the respective potential acoustic units. The ASR engine 458 will then identify those acoustic units in the input labels of particular states currently under consideration at the FST and will rescore the arcs associated with those acoustic units using both the acoustic scores and the scores of the arcs built into the FST. The highest scoring ASR hypothesis/hypotheses (along with their respective scores) may be output as ASR data 410.

The ASR component 250 may also include one or more end-to-end models, that is a model that is not exclusively an acoustic model or exclusively a language mode. For example, in some implementations, the ASR component 250 may process the audio data 111 using the ASR model 450. The ASR model 450 may be, for example, a recurrent neural network such as an RNN-T. An example RNN-T architecture is illustrated in FIG. 4. The ASR model 450 may predict a probability (y|x) of labels $y=(y_1, \ldots, y_u)$ given acoustic features $x=(x_1, \ldots, x_t)$. During inference, the ASR model 450 can generate an N-best list of ASR results using, for example, a beam search decoding algorithm. The ASR model 450 may include an encoder 410, a prediction network 420, a joint network 430, and a softmax 440. The encoder 410 may be similar or analogous to an acoustic model (e.g., similar to the acoustic model 453 described below), and may process a sequence of acoustic input features to generate encoded hidden representations. The prediction network 420 may be similar or analogous to a language model (e.g., similar to the language model 454 described below), and may process the previous output label predictions, and map them to corresponding hidden representations. The joint network 430 may be, for example, a feed forward neural network (NN) that may process hidden representations from both the encoder 410 and prediction network 420, and predict output label probabilities. The softmax 440 may be a function implemented (e.g., as a layer of the joint network 430) to normalize the predicted output probabilities.

The orchestrator component 230 may send text data (e.g., one or more ASR hypotheses 410 output by the ASR component 250 to an NLU component 260 for NLU processing.

The NLU component 260 may perform natural language processing (as described below) with respect to the ASR data 410. Operation of the NLU component 260 is described further below with reference to FIGS. 7 and 8.

Figure 7:
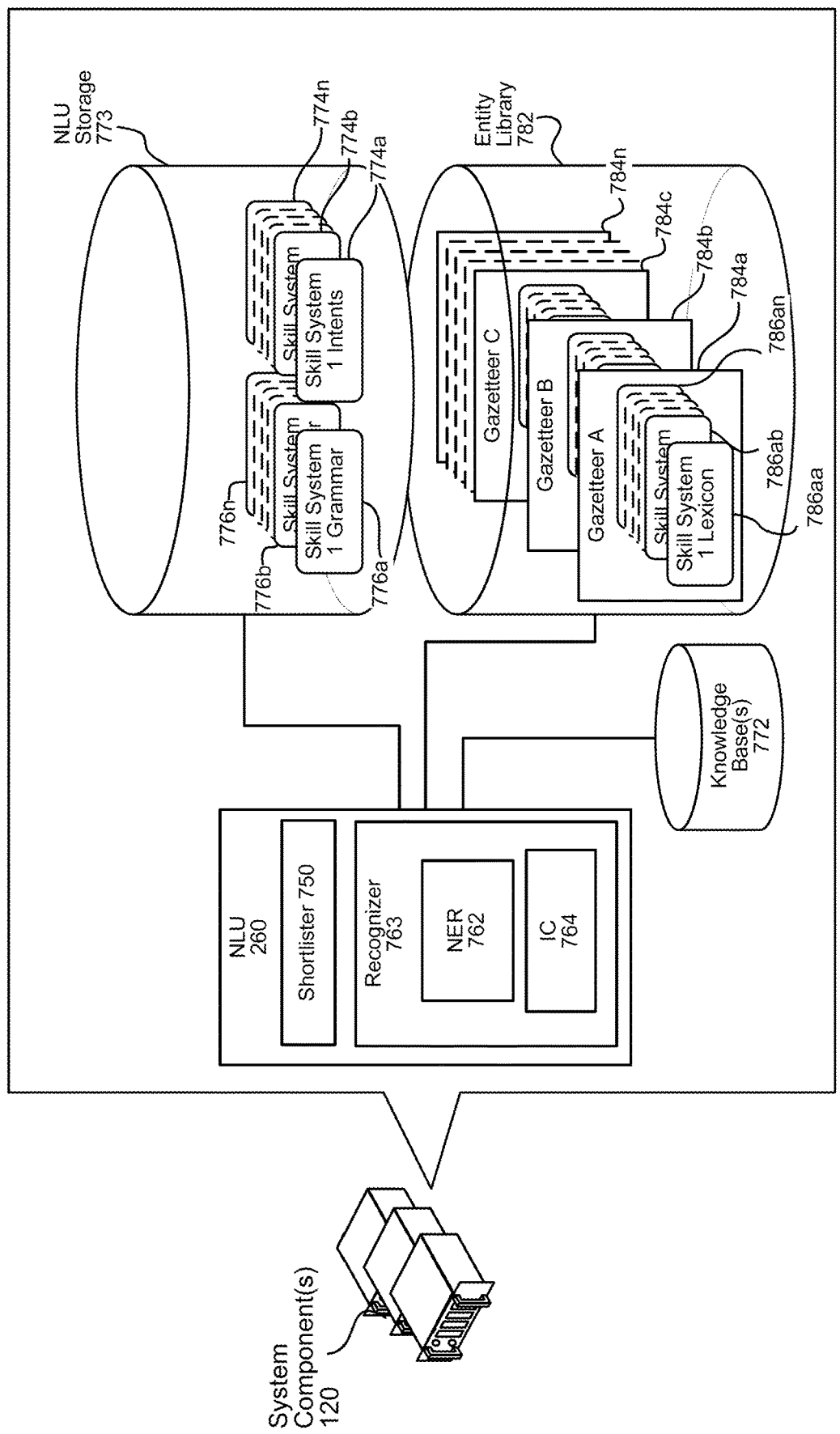
FIG. 7 is a conceptual diagram of how natural language processing is performed, according to embodiments of the present disclosure.
Figure 8:
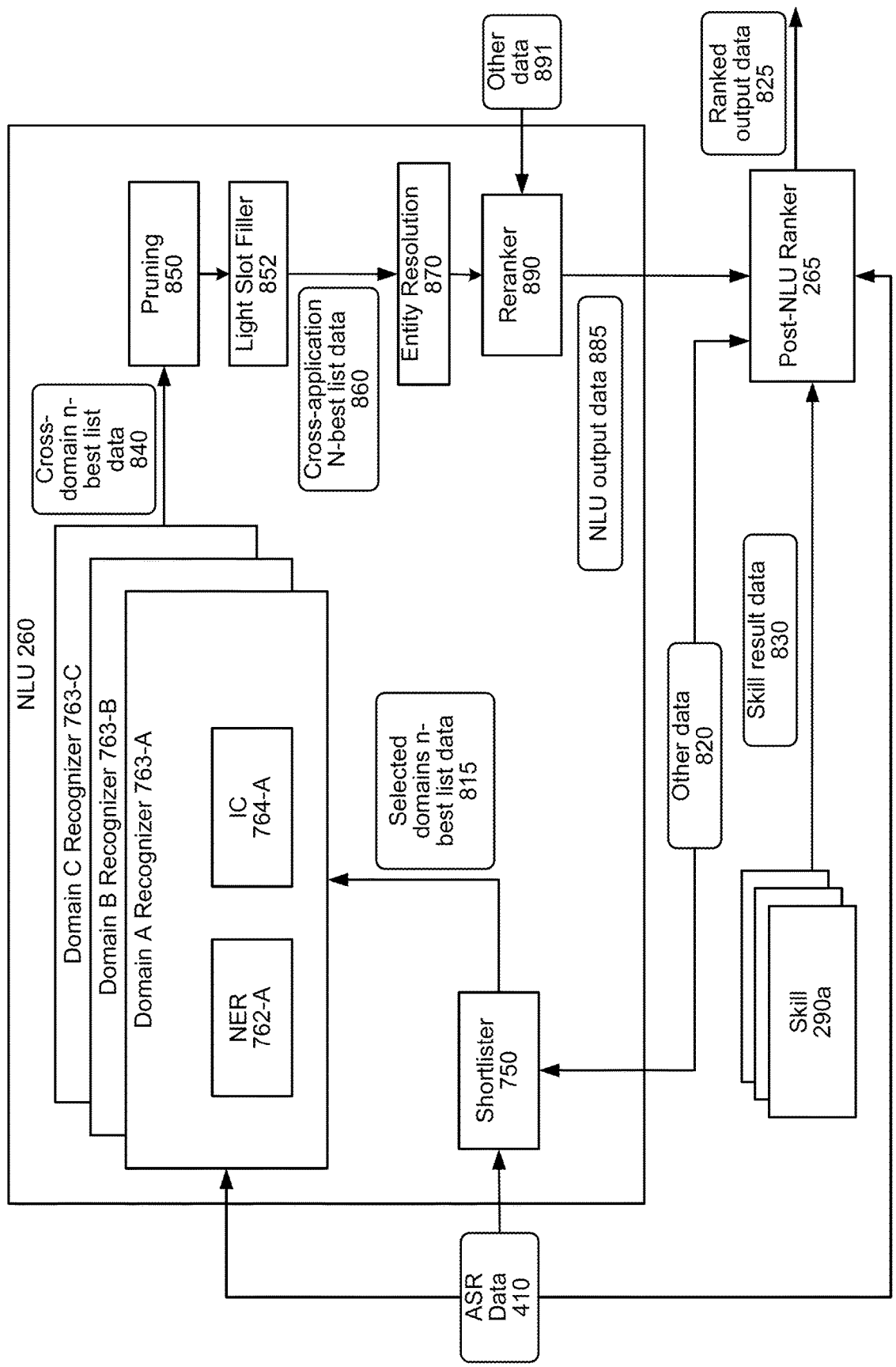
FIG. 8 is a conceptual diagram of how natural language processing is performed, according to embodiments of the present disclosure.

FIGS. 7 and 8 illustrates how the NLU component 260 may perform NLU processing. FIG. 7 is a conceptual diagram of how natural language processing is performed, according to embodiments of the present disclosure. And FIG. 8 is a conceptual diagram of how natural language processing is performed, according to embodiments of the present disclosure.

FIG. 7 illustrates how NLU processing is performed on text data. The NLU component 260 may process text data including several ASR hypotheses of a single user input. For example, if the ASR component 250 outputs text data including an n-best list of ASR hypotheses, the NLU component 260 may process the text data with respect to all (or a portion of) the ASR hypotheses represented therein.

The NLU component 260 may annotate text data by parsing and/or tagging the text data. For example, for the text data "tell me the weather for Seattle," the NLU component 260 may tag "tell me the weather for Seattle" as an <OutputWeather> intent as well as separately tag "Seattle" as a location for the weather information.

The NLU component 260 may include a shortlister component 750. The shortlister component 750 selects skills that may execute with respect to ASR output data 410 input to the NLU component 260 (e.g., applications that may execute with respect to the user input). The ASR output data 410 (which may also be referred to as ASR data 410) may include representations of text of an utterance, such as words, subword units, or the like. The shortlister component 750 thus limits downstream, more resource intensive NLU processes to being performed with respect to skills that may execute with respect to the user input.

Without a shortlister component 750, the NLU component 260 may process ASR output data 410 input thereto with respect to every skill of the system, either in parallel, in series, or using some combination thereof. By implementing a shortlister component 750, the NLU component 260 may process ASR output data 410 with respect to only the skills that may execute with respect to the user input. This reduces total compute power and latency attributed to NLU processing.

The shortlister component 750 may include one or more trained models. The model(s) may be trained to recognize various forms of user inputs that may be received by the system component(s) 120. For example, during a training period skill system(s) 125 associated with a skill may provide the system component(s) 120 with training text data representing sample user inputs that may be provided by a user to invoke the skill. For example, for a ride sharing skill, a skill system(s) 125 associated with the ride sharing skill may provide the system component(s) 120 with training text data including text corresponding to "get me a cab to [location]," "get me a ride to [location]," "book me a cab to [location]," "book me a ride to [location]," etc. The one or more trained models that will be used by the shortlister component 750 may be trained, using the training text data representing sample user inputs, to determine other potentially related user input structures that users may try to use to invoke the particular skill. During training, the system component(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system component(s) 120 with training text data indicating grammar and annotations. The system component(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 750 may be trained with respect to a different skill. Alternatively, the shortlister component 750 may use one trained model per domain, such as one trained model for skills associated with a weather domain, one trained model for skills associated with a ride sharing domain, etc.

The system component(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 750. For example, some sample user inputs may be positive examples (e.g., user inputs that may be used to invoke the skill). Other sample user inputs may be negative examples (e.g., user inputs that may not be used to invoke the skill).

As described above, the shortlister component 750 may include a different trained model for each skill of the system, a different trained model for each domain, or some other combination of trained model(s). For example, the shortlister component 750 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 750 to output indications of only a portion of the skills that the ASR output data 410 may relate to. For example, a user input may correspond to "tell me about Tom Collins." If the model is clustered based on domain, the shortlister component 750 may determine the user input corresponds to a recipe skill (e.g., a drink recipe) even though the user input may also correspond to an information skill (e.g., including information about a person named Tom Collins).

The NLU component 260 may include one or more recognizers 763. In at least some embodiments, a recognizer 763 may be associated with a skill system 125 (e.g., the recognizer may be configured to interpret text data to correspond to the skill system 125). In at least some other examples, a recognizer 763 may be associated with a domain such as smart home, video, music, weather, custom, etc. (e.g., the recognizer may be configured to interpret text data to correspond to the domain).

If the shortlister component 750 determines ASR output data 410 is potentially associated with multiple domains, the recognizers 763 associated with the domains may process the ASR output data 410, while recognizers 763 not indicated in the shortlister component 750's output may not process the ASR output data 410. The "shortlisted" recognizers 763 may process the ASR output data 410 in parallel, in series, partially in parallel, etc. For example, if ASR output data 410 potentially relates to both a communications domain and a music domain, a recognizer associated with the communications domain may process the ASR output data 410 in parallel, or partially in parallel, with a recognizer associated with the music domain processing the ASR output data 410.

Each recognizer 763 may include a named entity recognition (NER) component 762. The NER component 762 attempts to identify grammars and lexical information that may be used to construe meaning with respect to text data input therein. The NER component 762 identifies portions of text data that correspond to a named entity associated with a domain, associated with the recognizer 763 implementing the NER component 762. The NER component 762 (or other component of the NLU component 260) may also determine whether a word refers to an entity whose identity is not explicitly mentioned in the text data, for example "him," "her," "it" or other anaphora, exophora, or the like.

Each recognizer 763, and more specifically each NER component 762, may be associated with a particular grammar database 776, a particular set of intents/actions 774, and a particular personalized lexicon 786. The grammar databases 776, and intents/actions 774 may be stored in an NLU storage 773. Each gazetteer 784 may include domain/skill-indexed lexical information associated with a particular user and/or device 110. For example, a Gazetteer A (784a) includes skill-indexed lexical information 786aa to 786an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 762 applies grammar information 776 and lexical information 786 associated with a domain (associated with the recognizer 763 implementing the NER component 762) to determine a mention of one or more entities in text data. In this manner, the NER component 762 identifies "slots" (each corresponding to one or more particular words in text data) that may be useful for later processing. The NER component 762 may also label each slot with a type (e.g., noun, place, city, artist name, song name, etc.).

Each grammar database 776 includes the names of entities (i.e., nouns) commonly found in speech about the particular domain to which the grammar database 776 relates, whereas the lexical information 786 is personalized to the user and/or the device 110 from which the user input originated. For example, a grammar database 776 associated with a shopping domain may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (784a-784n) stored in an entity library storage 782. The gazetteer information 784 may be used to match text data (representing a portion of the user input) with text data representing known entities, such as song titles, contact names, etc. Gazetteers 784 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 763 may also include an intent classification (IC) component 764. An IC component 764 parses text data to determine an intent(s) (associated with the domain associated with the recognizer 763 implementing the IC component 764) that potentially represents the user input. An intent represents to an action a user desires be performed. An IC component 764 may communicate with a database 774 of words linked to intents. For example, a music intent database may link words and phrases such as "quiet," "volume off," and "mute" to a <Mute> intent. An IC component 764 identifies potential intents by comparing words and phrases in text data (representing at least a portion of the user input) to the words and phrases in an intents database 774 (associated with the domain that is associated with the recognizer 763 implementing the IC component 764).

The intents identifiable by a specific IC component 764 are linked to domain-specific (i.e., the domain associated with the recognizer 763 implementing the IC component 764) grammar frameworks 776 with "slots" to be filled. Each slot of a grammar framework 776 corresponds to a portion of text data that the system believes corresponds to an entity. For example, a grammar framework 776 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 776 may not be structured as sentences, but rather based on associating slots with grammatical tags.

For example, an NER component 762 may parse text data to identify words as subject, object, verb, preposition, etc. based on grammar rules and/or models prior to recognizing named entities in the text data. An IC component 764 (implemented by the same recognizer 763 as the NER component 762) may use the identified verb to identify an intent. The NER component 762 may then determine a grammar model 776 associated with the identified intent. For example, a grammar model 776 for an intent corresponding to <PlayMusic> may specify a list of slots applicable to play the identified "object" and any object modifier (e.g., a prepositional phrase), such as {Artist Name}, {Album Name}, {Song name}, etc. The NER component 762 may then search corresponding fields in a lexicon 786 (associated with the domain associated with the recognizer 763 implementing the NER component 762), attempting to match words and phrases in text data the NER component 762 previously tagged as a grammatical object or object modifier with those identified in the lexicon 786.

An NER component 762 may perform semantic tagging, which is the labeling of a word or combination of words according to their type/semantic meaning. An NER component 762 may parse text data using heuristic grammar rules, or a model may be constructed using techniques such as Hidden Markov Models, maximum entropy models, log linear models, conditional random fields (CRF), and the like. For example, an NER component 762 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 762 identifies "Play" as a verb based on a word database associated with the music domain, which an IC component 764 (also implemented by the music domain recognizer) may determine corresponds to a <PlayMusic> intent. At this stage, no determination has been made as to the meaning of "mother's little helper" or "the rolling stones," but based on grammar rules and models, the NER component 762 has determined the text of these phrases relates to the grammatical object (i.e., entity) of the user input represented in the text data.

An NER component 762 may tag text data to attribute meaning thereto. For example, an NER component 762 may tag "play mother's little helper by the rolling stones" as: {domain} Music, {intent}<PlayMusic>, {artist name} rolling stones, {media type} SONG, and {song title} mother's little helper. For further example, the NER component 762 may tag "play songs by the rolling stones" as: {domain} Music, {intent}<PlayMusic>, {artist name} rolling stones, and {media type} SONG.

The shortlister component 750 may receive ASR output data 410 output from the ASR component 250 or output from the device 110b (as illustrated in FIG. 8). The ASR component 250 may embed the ASR output data 410 into a form processable by a trained model(s) using sentence embedding techniques as known in the art. Sentence embedding results in the ASR output data 410 including text in a structure that enables the trained models of the shortlister component 750 to operate on the ASR output data 410. For example, an embedding of the ASR output data 410 may be a vector representation of the ASR output data 410.

The shortlister component 750 may make binary determinations (e.g., yes or no) regarding which domains relate to the ASR output data 410. The shortlister component 750 may make such determinations using the one or more trained models described herein above. If the shortlister component 750 implements a single trained model for each domain, the shortlister component 750 may simply run the models that are associated with enabled domains as indicated in a user profile associated with the device 110 and/or user that originated the user input.

The shortlister component 750 may generate n-best list data 815 representing domains that may execute with respect to the user input represented in the ASR output data 410. The size of the n-best list represented in the n-best list data 815 is configurable. In an example, the n-best list data 815 may indicate every domain of the system as well as contain an indication, for each domain, regarding whether the domain is likely capable to execute the user input represented in the ASR output data 410. In another example, instead of indicating every domain of the system, the n-best list data 815 may only indicate the domains that are likely to be able to execute the user input represented in the ASR output data 410. In yet another example, the shortlister component 750 may implement thresholding such that the n-best list data 815 may indicate no more than a maximum number of domains that may execute the user input represented in the ASR output data 410. In an example, the threshold number of domains that may be represented in the n-best list data 815 is ten. In another example, the domains included in the n-best list data 815 may be limited by a threshold a score, where only domains indicating a likelihood to handle the user input is above a certain score (as determined by processing the ASR output data 410 by the shortlister component 750 relative to such domains) are included in the n-best list data 815.

The ASR output data 410 may correspond to more than one ASR hypothesis. When this occurs, the shortlister component 750 may output a different n-best list (represented in the n-best list data 815) for each ASR hypothesis. Alternatively, the shortlister component 750 may output a single n-best list representing the domains that are related to the multiple ASR hypotheses represented in the ASR output data 410.

As indicated above, the shortlister component 750 may implement thresholding such that an n-best list output therefrom may include no more than a threshold number of entries. If the ASR output data 410 includes more than one ASR hypothesis, the n-best list output by the shortlister component 750 may include no more than a threshold number of entries irrespective of the number of ASR hypotheses output by the ASR component 250. Alternatively or in addition, the n-best list output by the shortlister component 750 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 410, the shortlister component 750 may generate confidence scores representing likelihoods that domains relate to the ASR output data 410. If the shortlister component 750 implements a different trained model for each domain, the shortlister component 750 may generate a different confidence score for each individual domain trained model that is run. If the shortlister component 750 runs the models of every domain when ASR output data 410 is received, the shortlister component 750 may generate a different confidence score for each domain of the system. If the shortlister component 750 runs the models of only the domains that are associated with skills indicated as enabled in a user profile associated with the device 110 and/or user that originated the user input, the shortlister component 750 may only generate a different confidence score for each domain associated with at least one enabled skill. If the shortlister component 750 implements a single trained model with domain specifically trained portions, the shortlister component 750 may generate a different confidence score for each domain who's specifically trained portion is run. The shortlister component 750 may perform matrix vector modification to obtain confidence scores for all domains of the system in a single instance of processing of the ASR output data 410.

N-best list data 815 including confidence scores that may be output by the shortlister component 750 may be represented as, for example:
  Search domain, 0.67
  Recipe domain, 0.62
  Information domain, 0.57
  Shopping domain, 0.42

As indicated, the confidence scores output by the shortlister component 750 may be numeric values. The confidence scores output by the shortlister component 750 may alternatively be binned values (e.g., high, medium, low).

The n-best list may only include entries for domains having a confidence score satisfying (e.g., equaling or exceeding) a minimum threshold confidence score. Alternatively, the shortlister component 750 may include entries for all domains associated with user enabled skills, even if one or more of the domains are associated with confidence scores that do not satisfy the minimum threshold confidence score.

The shortlister component 750 may consider other data 820 when determining which domains may relate to the user input represented in the ASR output data 410 as well as respective confidence scores. The other data 820 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 820 may include an indicator of the user associated with the ASR output data 410, for example as determined by the user recognition component 295.

The other data 820 may be character embedded prior to being input to the shortlister component 750. The other data 820 may alternatively be embedded using other techniques known in the art prior to being input to the shortlister component 750.

The other data 820 may also include data indicating the domains associated with skills that are enabled with respect to the device 110 and/or user that originated the user input. The shortlister component 750 may use such data to determine which domain-specific trained models to run. That is, the shortlister component 750 may determine to only run the trained models associated with domains that are associated with user-enabled skills. The shortlister component 750 may alternatively use such data to alter confidence scores of domains.

As an example, considering two domains, a first domain associated with at least one enabled skill and a second domain not associated with any user-enabled skills of the user that originated the user input, the shortlister component 750 may run a first model specific to the first domain as well as a second model specific to the second domain. Alternatively, the shortlister component 750 may run a model configured to determine a score for each of the first and second domains. The shortlister component 750 may determine a same confidence score for each of the first and second domains in the first instance. The shortlister component 750 may then alter those confidence scores based on which domains is associated with at least one skill enabled by the present user. For example, the shortlister component 750 may increase the confidence score associated with the domain associated with at least one enabled skill while leaving the confidence score associated with the other domain the same. Alternatively, the shortlister component 750 may leave the confidence score associated with the domain associated with at least one enabled skill the same while decreasing the confidence score associated with the other domain. Moreover, the shortlister component 750 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 270. When the shortlister component 750 receives the ASR output data 410, the shortlister component 750 may determine whether profile data associated with the user and/or device 110 that originated the command includes an indication of enabled skills.

The other data 820 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 750 may use such data to determine which domain-specific trained models to run. For example, if the device 110 corresponds to a displayless type device, the shortlister component 750 may determine not to run trained models specific to domains that output video data. The shortlister component 750 may alternatively use such data to alter confidence scores of domains.

As an example, considering two domains, one that outputs audio data and another that outputs video data, the shortlister component 750 may run a first model specific to the domain that generates audio data as well as a second model specific to the domain that generates video data. Alternatively the shortlister component 750 may run a model configured to determine a score for each domain. The shortlister component 750 may determine a same confidence score for each of the domains in the first instance. The shortlister component 750 may then alter the original confidence scores based on the type of the device 110 that originated the user input corresponding to the ASR output data 410. For example, if the device 110 is a displayless device, the shortlister component 750 may increase the confidence score associated with the domain that generates audio data while leaving the confidence score associated with the domain that generates video data the same. Alternatively, if the device 110 is a displayless device, the shortlister component 750 may leave the confidence score associated with the domain that generates audio data the same while decreasing the confidence score associated with the domain that generates video data. Moreover, if the device 110 is a displayless device, the shortlister component 750 may increase the confidence score associated with the domain that generates audio data as well as decrease the confidence score associated with the domain that generates video data.

The type of device information represented in the other data 820 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 820 may represent the smart TV of other display device, and not the displayless device that captured the spoken user input.

The other data 820 may also include data indicating the user input originating device's speed, location, or other mobility information. For example, the device may correspond to a vehicle including a display. If the vehicle is moving, the shortlister component 750 may decrease the confidence score associated with a domain that generates video data as it may be undesirable to output video content to a user while the user is driving. The device may output data to the system component(s) 120 indicating when the device is moving.

The other data 820 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 750 may use such data to alter confidence scores of domains. For example, the shortlister component 750 may run a first model specific to a first domain as well as a second model specific to a second domain. Alternatively, the shortlister component 750 may run a model configured to determine a score for each domain. The shortlister component 750 may also determine a same confidence score for each of the domains in the first instance. The shortlister component 750 may then alter the original confidence scores based on the first domain being invoked to cause the system to output content while the current user input was received. Based on the first domain being invoked, the shortlister component 750 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 815 generated by the shortlister component 750 as well as the different types of other data 820 considered by the shortlister component 750 are configurable. For example, the shortlister component 750 may update confidence scores as more other data 820 is considered. For further example, the n-best list data 815 may exclude relevant domains if thresholding is implemented. Thus, for example, the shortlister component 750 may include an indication of a domain in the n-best list 815 unless the shortlister component 750 is one hundred percent confident that the domain may not execute the user input represented in the ASR output data 410 (e.g., the shortlister component 750 determines a confidence score of zero for the domain).

The shortlister component 750 may send the ASR output data 410 to recognizers 763 associated with domains represented in the n-best list data 815. Alternatively, the shortlister component 750 may send the n-best list data 815 or some other indicator of the selected subset of domains to another component (such as the orchestrator component 230) which may in turn send the ASR output data 410 to the recognizers 763 corresponding to the domains included in the n-best list data 815 or otherwise indicated in the indicator. If the shortlister component 750 generates an n-best list representing domains without any associated confidence scores, the shortlister component 750/orchestrator component 230 may send the ASR output data 410 to recognizers 763 associated with domains that the shortlister component 750 determines may execute the user input. If the shortlister component 750 generates an n-best list representing domains with associated confidence scores, the shortlister component 750/orchestrator component 230 may send the ASR output data 410 to recognizers 763 associated with domains associated with confidence scores satisfying (e.g., meeting or exceeding) a threshold minimum confidence score.

A recognizer 763 may output tagged text data generated by an NER component 762 and an IC component 764, as described herein above. The NLU component 260 may compile the output tagged text data of the recognizers 763 into a single cross-domain n-best list 840 and may send the cross-domain n-best list 840 to a pruning component 850. Each entry of tagged text (e.g., each NLU hypothesis) represented in the cross-domain n-best list data 840 may be associated with a respective score indicating a likelihood that the NLU hypothesis corresponds to the domain associated with the recognizer 763 from which the NLU hypothesis was output. For example, the cross-domain n-best list data 840 may be represented as (with each line corresponding to a different NLU hypothesis):

[0.95] Intent: <PlayMusic> ArtistName: Beethoven SongName: Waldstein Sonata

[0.70] Intent: <Play Video> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 850 may sort the NLU hypotheses represented in the cross-domain n-best list data 840 according to their respective scores. The pruning component 850 may perform score thresholding with respect to the cross-domain NLU hypotheses. For example, the pruning component 850 may select NLU hypotheses associated with scores satisfying (e.g., meeting and/or exceeding) a threshold score. The pruning component 850 may also or alternatively perform number of NLU hypothesis thresholding. For example, the pruning component 850 may select the top scoring NLU hypothesis(es). The pruning component 850 may output a portion of the NLU hypotheses input thereto. The purpose of the pruning component 850 is to create a reduced list of NLU hypotheses so that downstream, more resource intensive, processes may only operate on the NLU hypotheses that most likely represent the user's intent.

The NLU component 260 may include a light slot filler component 852. The light slot filler component 852 can take text from slots represented in the NLU hypotheses output by the pruning component 850 and alter them to make the text more easily processed by downstream components. The light slot filler component 852 may perform low latency operations that do not involve heavy operations such as reference to a knowledge base (e.g., 772. The purpose of the light slot filler component 852 is to replace words with other words or values that may be more easily understood by downstream components. For example, if a NLU hypothesis includes the word "tomorrow," the light slot filler component 852 may replace the word "tomorrow" with an actual date for purposes of downstream processing. Similarly, the light slot filler component 852 may replace the word "CD" with "album" or the words "compact disc." The replaced words are then included in the cross-domain n-best list data 860.

The cross-domain n-best list data 860 may be input to an entity resolution component 870. The entity resolution component 870 can apply rules or other instructions to standardize labels or tokens from previous stages into an intent/slot representation. The precise transformation may depend on the domain. For example, for a travel domain, the entity resolution component 870 may transform text corresponding to "Boston airport" to the standard BOS three-letter code referring to the airport. The entity resolution component 870 can refer to a knowledge base (e.g., 772) that is used to specifically identify the precise entity referred to in each slot of each NLU hypothesis represented in the cross-domain n-best list data 860. Specific intent/slot combinations may also be tied to a particular source, which may then be used to resolve the text. In the example "play songs by the stones," the entity resolution component 870 may reference a personal music catalog, Amazon Music account, a user profile, or the like. The entity resolution component 870 may output an altered n-best list that is based on the cross-domain n-best list 860 but that includes more detailed information (e.g., entity IDs) about the specific entities mentioned in the slots and/or more detailed slot data that can eventually be used by a skill. The NLU component 260 may include multiple entity resolution components 870 and each entity resolution component 870 may be specific to one or more domains.

The NLU component 260 may include a reranker 890. The reranker 890 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 870.

The reranker 890 may apply re-scoring, biasing, or other techniques. The reranker 890 may consider not only the data output by the entity resolution component 870, but may also consider other data 891. The other data 891 may include a variety of information. For example, the other data 891 may include skill rating or popularity data. For example, if one skill has a high rating, the reranker 890 may increase the score of a NLU hypothesis that may be processed by the skill. The other data 891 may also include information about skills that have been enabled by the user that originated the user input. For example, the reranker 890 may assign higher scores to NLU hypothesis that may be processed by enabled skills than NLU hypothesis that may be processed by non-enabled skills. The other data 891 may also include data indicating user usage history, such as if the user that originated the user input regularly uses a particular skill or does so at particular times of day. The other data 891 may additionally include data indicating date, time, location, weather, type of device 110, user identifier, context, as well as other information. For example, the reranker 890 may consider when any particular skill is currently active (e.g., music being played, a game being played, etc.).

As illustrated and described, the entity resolution component 870 is implemented prior to the reranker 890. The entity resolution component 870 may alternatively be implemented after the reranker 890. Implementing the entity resolution component 870 after the reranker 890 limits the NLU hypotheses processed by the entity resolution component 870 to only those hypotheses that successfully pass through the reranker 890.

The reranker 890 may be a global reranker (e.g., one that is not specific to any particular domain). Alternatively, the NLU component 260 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 260 may perform NLU processing described above with respect to domains associated with skills wholly implemented as part of the system component(s) 120 (e.g., designated 290 in FIG. 2). The NLU component 260 may separately perform NLU processing described above with respect to domains associated with skills that are at least partially implemented as part of the skill system(s) 125. In an example, the shortlister component 750 may only process with respect to these latter domains. Results of these two NLU processing paths may be merged into NLU output data 885, which may be sent to a post-NLU ranker 265, which may be implemented by the system component(s) 120.

The post-NLU ranker 265 may include a statistical component that produces a ranked list of intent/skill pairs with associated confidence scores. Each confidence score may indicate an adequacy of the skill's execution of the intent with respect to NLU results data associated with the skill. The post-NLU ranker 265 may operate one or more trained models configured to process the NLU results data 885, skill result data 830, and the other data 820 in order to output ranked output data 825. The ranked output data 825 may include an n-best list where the NLU hypotheses in the NLU results data 885 are reordered such that the n-best list in the ranked output data 825 represents a prioritized list of skills to respond to a user input as determined by the post-NLU ranker 265. The ranked output data 825 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 265 enables the system to better determine the best skill to execute the user input. For example, first and second NLU hypotheses in the NLU results data 885 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 265 (or other scheduling component such as orchestrator component 230) may solicit the first skill and the second skill to provide potential result data 830 based on the first NLU hypothesis and the second NLU hypothesis, respectively. For example, the post-NLU ranker 265 may send the first NLU hypothesis to the first skill 290a along with a request for the first skill 290a to at least partially execute with respect to the first NLU hypothesis. The post-NLU ranker 265 may also send the second NLU hypothesis to the second skill 290b along with a request for the second skill 290b to at least partially execute with respect to the second NLU hypothesis. The post-NLU ranker 265 receives, from the first skill 290a, first result data 830a generated from the first skill 290a's execution with respect to the first NLU hypothesis. The post-NLU ranker 265 also receives, from the second skill 290b, second results data 830b generated from the second skill 290b's execution with respect to the second NLU hypothesis.

The result data 830 may include various portions. For example, the result data 830 may include content (e.g., audio data, text data, and/or video data) to be output to a user. The result data 830 may also include a unique identifier used by the system component(s) 120 and/or the skill system(s) 125 to locate the data to be output to a user. The result data 830 may also include an instruction. For example, if the user input corresponds to "turn on the light," the result data 830 may include an instruction causing the system to turn on a light associated with a profile of the device (110a/110b) and/or user.

The post-NLU ranker 265 may consider the first result data 830a and the second result data 830b to alter the first confidence score and the second confidence score of the first NLU hypothesis and the second NLU hypothesis, respectively. That is, the post-NLU ranker 265 may generate a third confidence score based on the first result data 830a and the first confidence score. The third confidence score may correspond to how likely the post-NLU ranker 265 determines the first skill will correctly respond to the user input. The post-NLU ranker 265 may also generate a fourth confidence score based on the second result data 830b and the second confidence score. One skilled in the art will appreciate that a first difference between the third confidence score and the fourth confidence score may be greater than a second difference between the first confidence score and the second confidence score. The post-NLU ranker 265 may also consider the other data 820 to generate the third confidence score and the fourth confidence score. While it has been described that the post-NLU ranker 265 may alter the confidence scores associated with first and second NLU hypotheses, one skilled in the art will appreciate that the post-NLU ranker 265 may alter the confidence scores of more than two NLU hypotheses. The post-NLU ranker 265 may select the result data 830 associated with the skill 290 with the highest altered confidence score to be the data output in response to the current user input. The post-NLU ranker 265 may also consider the ASR output data 410 to alter the NLU hypotheses confidence scores.

The orchestrator component 230 may, prior to sending the NLU results data 885 to the post-NLU ranker 265, associate intents in the NLU hypotheses with skills 290. For example, if a NLU hypothesis includes a <PlayMusic> intent, the orchestrator component 230 may associate the NLU hypothesis with one or more skills 290 that can execute the <PlayMusic> intent. Thus, the orchestrator component 230 may send the NLU results data 885, including NLU hypotheses paired with skills 290, to the post-NLU ranker 265. In response to ASR output data 410 corresponding to "what should I do for dinner today," the orchestrator component 230 may generates pairs of skills 290 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 265 queries each skill 290, paired with a NLU hypothesis in the NLU output data 885, to provide result data 830 based on the NLU hypothesis with which it is associated. That is, with respect to each skill, the post-NLU ranker 265 colloquially asks the each skill "if given this NLU hypothesis, what would you do with it." According to the above example, the post-NLU ranker 265 may send skills 290 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 265 may query each of the skills 290 in parallel or substantially in parallel.

A skill 290 may provide the post-NLU ranker 265 with various data and indications in response to the post-NLU ranker 265 soliciting the skill 290 for result data 830. A skill 290 may simply provide the post-NLU ranker 265 with an indication of whether or not the skill can execute with respect to the NLU hypothesis it received. A skill 290 may also or alternatively provide the post-NLU ranker 265 with output data generated based on the NLU hypothesis it received. In some situations, a skill 290 may need further information in addition to what is represented in the received NLU hypothesis to provide output data responsive to the user input. In these situations, the skill 290 may provide the post-NLU ranker 265 with result data 830 indicating slots of a framework that the skill 290 further needs filled or entities that the skill 290 further needs resolved prior to the skill 290 being able to provided result data 830 responsive to the user input. The skill 290 may also provide the post-NLU ranker 265 with an instruction and/or computer-generated speech indicating how the skill 290 recommends the system solicit further information needed by the skill 290. The skill 290 may further provide the post-NLU ranker 265 with an indication of whether the skill 290 will have all needed information after the user provides additional information a single time, or whether the skill 290 will need the user to provide various kinds of additional information prior to the skill 290 having all needed information. According to the above example, skills 290 may provide the post-NLU ranker 265 with the following:

Skill 1: indication representing the skill can execute with respect to a NLU hypothesis including the <Help> intent indicator
Skill 2: indication representing the skill needs to the system to obtain further information
Skill 3: indication representing the skill can provide numerous results in response to the third NLU hypothesis including the <DishType> intent indicator Result data 830 includes an indication provided by a skill 290 indicating whether or not the skill 290 can execute with respect to a NLU hypothesis; data generated by a skill 290 based on a NLU hypothesis; as well as an indication provided by a skill 290 indicating the skill 290 needs further information in addition to what is represented in the received NLU hypothesis.

The post-NLU ranker 265 uses the result data 830 provided by the skills 290 to alter the NLU processing confidence scores generated by the reranker 890. That is, the post-NLU ranker 265 uses the result data 830 provided by the queried skills 290 to create larger differences between the NLU processing confidence scores generated by the reranker 890. Without the post-NLU ranker 265, the system may not be confident enough to determine an output in response to a user input, for example when the NLU hypotheses associated with multiple skills are too close for the system to confidently determine a single skill 290 to invoke to respond to the user input. For example, if the system does not implement the post-NLU ranker 265, the system may not be able to determine whether to obtain output data from a general reference information skill or a medical information skill in response to a user input corresponding to "what is acne."

The post-NLU ranker 265 may prefer skills 290 that provide result data 830 responsive to NLU hypotheses over skills 290 that provide result data 830 corresponding to an indication that further information is needed, as well as skills 290 that provide result data 830 indicating they can provide multiple responses to received NLU hypotheses. For example, the post-NLU ranker 265 may generate a first score for a first skill 290*a* that is greater than the first skill's NLU confidence score based on the first skill 290*a* providing result data 830*a* including a response to a NLU hypothesis. For further example, the post-NLU ranker 265 may generate a second score for a second skill 290*b* that is less than the second skill's NLU confidence score based on the second skill 290*b* providing result data 830*b* indicating further information is needed for the second skill 290*b* to provide a response to a NLU hypothesis. Yet further, for example, the post-NLU ranker 265 may generate a third score for a third skill 290*c* that is less than the third skill's NLU confidence score based on the third skill 290*c* providing result data 830*c* indicating the third skill 290*c* can provide multiple responses to a NLU hypothesis.

The post-NLU ranker 265 may consider other data 820 in determining scores. The other data 820 may include rankings associated with the queried skills 290. A ranking may be a system ranking or a user-specific ranking. A ranking may indicate a veracity of a skill from the perspective of one or more users of the system. For example, the post-NLU ranker 265 may generate a first score for a first skill 290*a* that is greater than the first skill's NLU processing confidence score based on the first skill 290*a* being associated with a high ranking. For further example, the post-NLU ranker 265 may generate a second score for a second skill 290*b* that is less than the second skill's NLU processing confidence score based on the second skill 290*b* being associated with a low ranking.

The other data 820 may include information indicating whether or not the user that originated the user input has enabled one or more of the queried skills 290. For example, the post-NLU ranker 265 may generate a first score for a first skill 290*a* that is greater than the first skill's NLU processing confidence score based on the first skill 290*a* being enabled by the user that originated the user input. For further example, the post-NLU ranker 265 may generate a second score for a second skill 290*b* that is less than the second skill's NLU processing confidence score based on the second skill 290*b* not being enabled by the user that originated the user input. When the post-NLU ranker 265 receives the NLU results data 885, the post-NLU ranker 265 may determine whether profile data, associated with the user and/or device that originated the user input, includes indications of enabled skills.

The other data 820 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 265 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 265 may increase the NLU processing confidence score associated with a first skill configured to output visual data and/or decrease the NLU processing confidence score associated with a second skill configured to output audio data.

The other data 820 may include information indicating the veracity of the result data 830 provided by a skill 290. For example, if a user says "tell me a recipe for pasta sauce," a first skill 290*a* may provide the post-NLU ranker 265 with first result data 830*a* corresponding to a first recipe associated with a five star rating and a second skill 290*b* may provide the post-NLU ranker 265 with second result data 830*b* corresponding to a second recipe associated with a one star rating. In this situation, the post-NLU ranker 265 may increase the NLU processing confidence score associated with the first skill 290*a* based on the first skill 290*a* providing the first result data 830*a* associated with the five star rating and/or decrease the NLU processing confidence score associated with the second skill 290*b* based on the second skill 290*b* providing the second result data 830*b* associated with the one star rating.

The other data 820 may include information indicating the type of device that originated the user input. For example, the device may correspond to a "hotel room" type if the device is located in a hotel room. If a user inputs a command corresponding to "order me food" to the device located in the hotel room, the post-NLU ranker 265 may increase the NLU processing confidence score associated with a first skill 290*a* corresponding to a room service skill associated with the hotel and/or decrease the NLU processing confidence score associated with a second skill 290*b* corresponding to a food skill not associated with the hotel.

The other data 820 may include information indicating a location of the device and/or user that originated the user input. The system may be configured with skills 290 that may only operate with respect to certain geographic locations. For example, a user may provide a user input corresponding to "when is the next train to Portland." A first skill 290*a* may operate with respect to trains that arrive at, depart from, and pass through Portland, Oregon. A second skill 290*b* may operate with respect to trains that arrive at, depart from, and pass through Portland, Maine. If the device and/or user that originated the user input is located in Seattle, Washington, the post-NLU ranker 265 may increase the NLU processing confidence score associated with the first skill 290*a* and/or decrease the NLU processing confidence score associated with the second skill 290*b*. Likewise, if the device and/or user that originated the user input is located in Boston, Massachusetts, the post-NLU ranker 265 may increase the NLU processing confidence score associated with the second skill 290*b* and/or decrease the NLU processing confidence score associated with the first skill 290*a*.

The other data 820 may include information indicating a time of day. The system may be configured with skills 290 that operate with respect to certain times of day. For example, a user may provide a user input corresponding to "order me food." A first skill 290a may generate first result data 830a corresponding to breakfast. A second skill 290b may generate second result data 830b corresponding to dinner. If the system component(s) 120 receives the user input in the morning, the post-NLU ranker 265 may increase the NLU processing confidence score associated with the first skill 290a and/or decrease the NLU processing score associated with the second skill 290b. If the system component(s) 120 receives the user input in the afternoon or evening, the post-NLU ranker 265 may increase the NLU processing confidence score associated with the second skill 290b and/or decrease the NLU processing confidence score associated with the first skill 290a.

The other data 820 may include information indicating user preferences. The system may include multiple skills 290 configured to execute in substantially the same manner. For example, a first skill 290a and a second skill 290b may both be configured to order food from respective restaurants. The system may store a user preference (e.g., in the profile storage 270) that is associated with the user that provided the user input to the system component(s) 120 as well as indicates the user prefers the first skill 290a over the second skill 290b. Thus, when the user provides a user input that may be executed by both the first skill 290a and the second skill 290b, the post-NLU ranker 265 may increase the NLU processing confidence score associated with the first skill 290a and/or decrease the NLU processing confidence score associated with the second skill 290b.

The other data 820 may include information indicating system usage history associated with the user that originated the user input. For example, the system usage history may indicate the user originates user inputs that invoke a first skill 290a more often than the user originates user inputs that invoke a second skill 290b. Based on this, if the present user input may be executed by both the first skill 290a and the second skill 290b, the post-NLU ranker 265 may increase the NLU processing confidence score associated with the first skill 290a and/or decrease the NLU processing confidence score associated with the second skill 290b.

The other data 820 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 265 may increase the NLU processing confidence score associated with a first skill 290a that generates audio data. The post-NLU ranker 265 may also or alternatively decrease the NLU processing confidence score associated with a second skill 290b that generates image data or video data.

The other data 820 may include information indicating how long it took a skill 290 to provide result data 830 to the post-NLU ranker 265. When the post-NLU ranker 265 multiple skills 290 for result data 830, the skills 290 may respond to the queries at different speeds. The post-NLU ranker 265 may implement a latency budget. For example, if the post-NLU ranker 265 determines a skill 290 responds to the post-NLU ranker 265 within a threshold amount of time from receiving a query from the post-NLU ranker 265, the post-NLU ranker 265 may increase the NLU processing confidence score associated with the skill 290. Conversely, if the post-NLU ranker 265 determines a skill 290 does not respond to the post-NLU ranker 265 within a threshold amount of time from receiving a query from the post-NLU ranker 265, the post-NLU ranker 265 may decrease the NLU processing confidence score associated with the skill 290.

It has been described that the post-NLU ranker 265 uses the other data 820 to increase and decrease NLU processing confidence scores associated with various skills 290 that the post-NLU ranker 265 has already requested result data from. Alternatively, the post-NLU ranker 265 may use the other data 820 to determine which skills 290 to request result data from. For example, the post-NLU ranker 265 may use the other data 820 to increase and/or decrease NLU processing confidence scores associated with skills 290 associated with the NLU results data 885 output by the NLU component 260. The post-NLU ranker 265 may select n-number of top scoring altered NLU processing confidence scores. The post-NLU ranker 265 may then request result data 830 from only the skills 290 associated with the selected n-number of NLU processing confidence scores.

As described, the post-NLU ranker 265 may request result data 830 from all skills 290 associated with the NLU results data 885 output by the NLU component 260. Alternatively, the system component(s) 120 may prefer result data 830 from skills implemented entirely by the system component(s) 120 rather than skills at least partially implemented by the skill system(s) 125. Therefore, in the first instance, the post-NLU ranker 265 may request result data 830 from only skills associated with the NLU results data 885 and entirely implemented by the system component(s) 120. The post-NLU ranker 265 may only request result data 830 from skills associated with the NLU results data 885, and at least partially implemented by the skill system(s) 125, if none of the skills, wholly implemented by the system component(s) 120, provide the post-NLU ranker 265 with result data 830 indicating either data response to the NLU results data 885, an indication that the skill can execute the user input, or an indication that further information is needed.

As indicated above, the post-NLU ranker 265 may request result data 830 from multiple skills 290. If one of the skills 290 provides result data 830 indicating a response to a NLU hypothesis and the other skills provide result data 830 indicating either they cannot execute or they need further information, the post-NLU ranker 265 may select the result data 830 including the response to the NLU hypothesis as the data to be output to the user. If more than one of the skills 290 provides result data 830 indicating responses to NLU hypotheses, the post-NLU ranker 265 may consider the other data 820 to generate altered NLU processing confidence scores, and select the result data 830 of the skill associated with the greatest score as the data to be output to the user.

A system that does not implement the post-NLU ranker 265 may select the highest scored NLU hypothesis in the NLU results data 885. The system may send the NLU hypothesis to a skill 290 associated therewith along with a request for output data. In some situations, the skill 290 may not be able to provide the system with output data. This results in the system indicating to the user that the user input could not be processed even though another skill associated with lower ranked NLU hypothesis could have provided output data responsive to the user input.

The post-NLU ranker 265 reduces instances of the aforementioned situation. As described, the post-NLU ranker 265 queries multiple skills associated with the NLU results data 885 to provide result data 830 to the post-NLU ranker 265 prior to the post-NLU ranker 265 ultimately determining the skill 290 to be invoked to respond to the user input. Some of the skills 290 may provide result data 830 indicating responses to NLU hypotheses while other skills 290 may providing result data 830 indicating the skills cannot provide responsive data. Whereas a system not implementing the post-NLU ranker 265 may select one of the skills 290 that could not provide a response, the post-NLU ranker 265 only selects a skill 290 that provides the post-NLU ranker 265 with result data corresponding to a response, indicating further information is needed, or indicating multiple responses can be generated.

The post-NLU ranker 265 may select result data 830, associated with the skill 290 associated with the highest score, for output to the user. Alternatively, the post-NLU ranker 265 may output ranked output data 825 indicating skills 290 and their respective post-NLU ranker rankings. Since the post-NLU ranker 265 receives result data 830, potentially corresponding to a response to the user input, from the skills 290 prior to post-NLU ranker 265 selecting one of the skills or outputting the ranked output data 825, little to no latency occurs from the time skills provide result data 830 and the time the system outputs responds to the user.

If the post-NLU ranker 265 selects result audio data to be output to a user and the system determines content should be output audibly, the post-NLU ranker 265 (or another component of the system component(s) 120) may cause the device 110a and/or the device 110b to output audio corresponding to the result audio data. If the post-NLU ranker 265 selects result text data to output to a user and the system determines content should be output visually, the post-NLU ranker 265 (or another component of the system component(s) 120) may cause the device 110b to display text corresponding to the result text data. If the post-NLU ranker 265 selects result audio data to output to a user and the system determines content should be output visually, the post-NLU ranker 265 (or another component of the system component(s) 120) may send the result audio data to the ASR component 250. The ASR component 250 may generate output text data corresponding to the result audio data. The system component(s) 120 may then cause the device 110b to display text corresponding to the output text data. If the post-NLU ranker 265 selects result text data to output to a user and the system determines content should be output audibly, the post-NLU ranker 265 (or another component of the system component(s) 120) may send the result text data to the TTS component 280. The TTS component 280 may generate output audio data (corresponding to computer-generated speech) based on the result text data. The system component(s) 120 may then cause the device 110a and/or the device 110b to output audio corresponding to the output audio data.

As described, a skill 290 may provide result data 830 either indicating a response to the user input, indicating more information is needed for the skill 290 to provide a response to the user input, or indicating the skill 290 cannot provide a response to the user input. If the skill 290 associated with the highest post-NLU ranker score provides the post-NLU ranker 265 with result data 830 indicating a response to the user input, the post-NLU ranker 265 (or another component of the system component(s) 120, such as the orchestrator component 230) may simply cause content corresponding to the result data 830 to be output to the user. For example, the post-NLU ranker 265 may send the result data 830 to the orchestrator component 230. The orchestrator component 230 may cause the result data 830 to be sent to the device (110a/110b), which may output audio and/or display text corresponding to the result data 830. The orchestrator component 230 may send the result data 830 to the ASR component 250 to generate output text data and/or may send the result data 830 to the TTS component 280 to generate output audio data, depending on the situation.

The skill 290 associated with the highest post-NLU ranker score may provide the post-NLU ranker 265 with result data 830 indicating more information is needed as well as instruction data. The instruction data may indicate how the skill 290 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the post-NLU ranker 265 may simply cause the received instruction data be output by the device (110a/110b). Alternatively, the instruction data may be in a format that is not capable of being output by the device (110a/110b). When this occurs, the post-NLU ranker 265 may cause the ASR component 250 or the TTS component 280 to process the instruction data, depending on the situation, to generate instruction data that may be output by the device (110a/110b). Once the user provides the system with all further information needed by the skill 290, the skill 290 may provide the system with result data 830 indicating a response to the user input, which may be output by the system as detailed above.

The system may include "informational" skills 290 that simply provide the system with information, which the system outputs to the user. The system may also include "transactional" skills 290 that require a system instruction to execute the user input. Transactional skills 290 include ride sharing skills, flight booking skills, etc. A transactional skill 290 may simply provide the post-NLU ranker 265 with result data 830 indicating the transactional skill 290 can execute the user input. The post-NLU ranker 265 may then cause the system to solicit the user for an indication that the system is permitted to cause the transactional skill 290 to execute the user input. The user-provided indication may be an audible indication or a tactile indication (e.g., activation of a virtual button or input of text via a virtual keyboard). In response to receiving the user-provided indication, the system may provide the transactional skill 290 with data corresponding to the indication. In response, the transactional skill 290 may execute the command (e.g., book a flight, book a train ticket, etc.). Thus, while the system may not further engage an informational skill 290 after the informational skill 290 provides the post-NLU ranker 265 with result data 830, the system may further engage a transactional skill 290 after the transactional skill 290 provides the post-NLU ranker 265 with result data 830 indicating the transactional skill 290 may execute the user input.

In some instances, the post-NLU ranker 265 may generate respective scores for first and second skills that are too close (e.g., are not different by at least a threshold difference) for the post-NLU ranker 265 to make a confident determination regarding which skill should execute the user input. When this occurs, the system may request the user indicate which skill the user prefers to execute the user input. The system may output TTS-generated speech to the user to solicit which skill the user wants to execute the user input.

Figure 9:
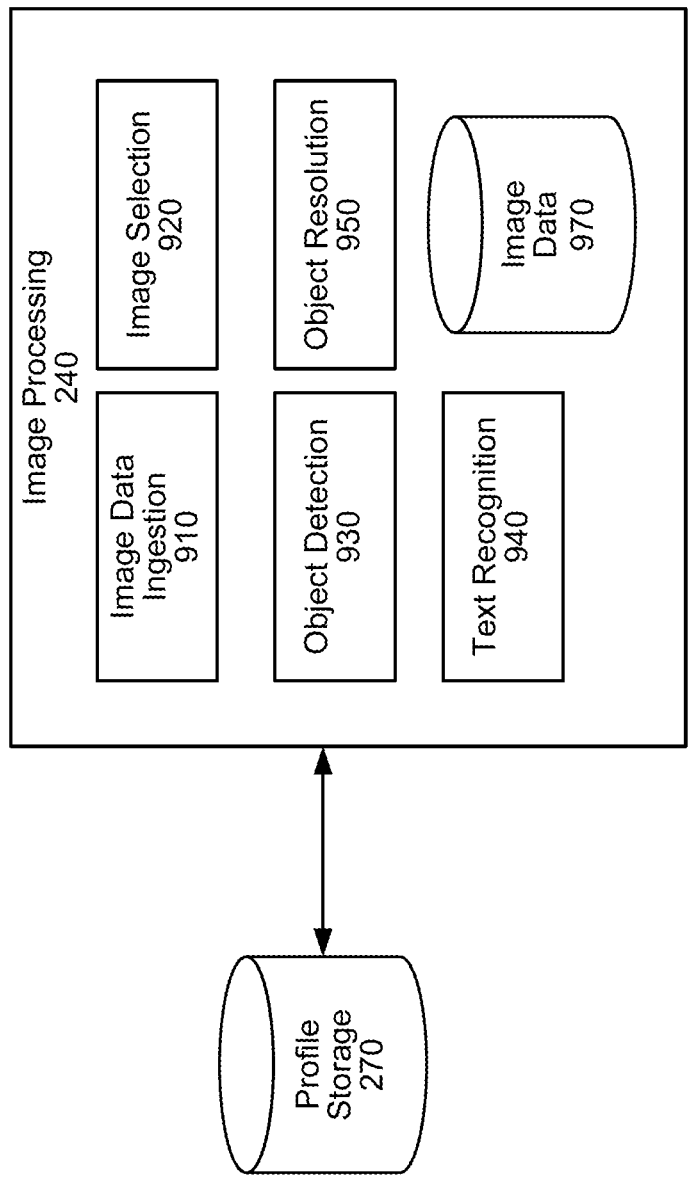
FIG. 9 is a conceptual diagram of components of an image processing component, according to embodiments of the present disclosure.

The system component(s) 120 may include image processing component 240. The image processing component 240 may located across different physical and/or virtual machines. The image processing component 240 may receive and analyze image data (which may include single images or a plurality of images such as in a video feed). The image processing component 240 may work with other components of the system 120 to perform various operations. For example the image processing component 240 may work with user recognition component 295 to assist with user recognition using image data. The image processing component 240 may also include or otherwise be associated with image data storage 970 which may store aspects of image data used by image processing component 240. The image data may be of different formats such as JPEG, GIF, BMP, MPEG, video formats, and the like. Components of the image processing component 240 are shown in FIG. 9.

Image matching algorithms, such as those used by image processing component 240, may take advantage of the fact that an image of an object or scene contains a number of feature points. Feature points are specific points in an image which are robust to changes in image rotation, scale, viewpoint or lighting conditions. This means that these feature points will often be present in both the images to be compared, even if the two images differ. These feature points may also be known as "points of interest." Therefore, a first stage of the image matching algorithm may include finding these feature points in the image. An image pyramid may be constructed to determine the feature points of an image. An image pyramid is a scale-space representation of the image, e.g., it contains various pyramid images, each of which is a representation of the image at a particular scale. The scale-space representation enables the image matching algorithm to match images that differ in overall scale (such as images taken at different distances from an object). Pyramid images may be smoothed and downsampled versions of an original image.

To build a database of object images, with multiple objects per image, a number of different images of an object may be taken from different viewpoints. From those images, feature points may be extracted and pyramid images constructed. Multiple images from different points of view of each particular object may be taken and linked within the database (for example within a tree structure described below). The multiple images may correspond to different viewpoints of the object sufficient to identify the object from any later angle that may be included in a user's query image. For example, a shoe may look very different from a bottom view than from a top view than from a side view. For certain objects, this number of different image angles may be 6 (top, bottom, left side, right side, front, back), for other objects this may be more or less depending on various factors, including how many images should be taken to ensure the object may be recognized in an incoming query image. With different images of the object available, it is more likely that an incoming image from a user may be recognized by the system and the object identified, even if the user's incoming image is taken at a slightly different angle.

This process may be repeated for multiple objects. For large databases, such as an online shopping database where a user may submit an image of an object to be identified, this process may be repeated thousands, if not millions of times to construct a database of images and data for image matching. The database also may continually be updated and/or refined to account for a changing catalog of objects to be recognized.

When configuring the database, pyramid images, feature point data, and/or other information from the images or objects may be used to cluster features and build a tree of objects and images, where each node of the tree will keep lists of objects and corresponding features. The tree may be configured to group visually significant subsets of images/features to ease matching of submitted images for object detection. Data about objects to be recognized may be stored by the system in image data 970, profile storage 270, or other storage component.

Image selection component 920 may select desired images from input image data to use for image processing at runtime. For example, input image data may come from a series of sequential images, such as a video stream where each image is a frame of the video stream. These incoming images need to be sorted to determine which images will be selected for further object recognition processing as performing image processing on low quality images may result in an undesired user experience. To avoid such an undesirable user experience, the time to perform the complete recognition process, from first starting the video feed to delivering results to the user, should be as short as possible. As images in a video feed may come in rapid succession, the image processing component 240 may be configured to select or discard an image quickly so that the system can, in turn, quickly process the selected image and deliver results to a user. The image selection component 920 may select an image for object recognition by computing a metric/feature for each frame in the video feed and selecting an image for processing if the metric exceeds a certain threshold. While FIG. 9 illustrates image selection component 920 as part of system component(s) 120, it may also be located on device 110 so that the device may select only desired image(s) to send to system component(s) 120, thus avoiding sending too much image data to system component(s) 120 (thus expending unnecessary computing/communication resources). Thus the device may select only the best quality images for purposes of image analysis.

The metrics used to select an image may be general image quality metrics (focus, sharpness, motion, etc.) or may be customized image quality metrics. The metrics may be computed by software components or hardware components. For example, the metrics may be derived from output of device sensors such as a gyroscope, accelerometer, field sensors, inertial sensors, camera metadata, or other components. The metrics may thus be image based (such as a statistic derived from an image or taken from camera metadata like focal length or the like) or may be non-image based (for example, motion data derived from a gyroscope, accelerometer, GPS sensor, etc.). As images from the video feed are obtained by the system, the system, such as a device, may determine metric values for the image. One or more metrics may be determined for each image. To account for temporal fluctuation, the individual metrics for each respective image may be compared to the metric values for previous images in the image feed and thus a historical metric value for the image and the metric may be calculated. This historical metric may also be referred to as a historical metric value. The historical metric values may include representations of certain metric values for the image compared to the values for that metric for a group of different images in the same video feed. The historical metric(s) may be processed using a trained classifier model to select which images are suitable for later processing.

For example, if a particular image is to be measured using a focus metric, which is a numerical representation of the focus of the image, the focus metric may also be computed for the previous N frames to the particular image. N is a configurable number and may vary depending on system constraints such as latency, accuracy, etc. For example, N may be 30 image frames, representing, for example, one second of video at a video feed of 30 frames-per-second. A mean of the focus metrics for the previous N images may be computed, along with a standard deviation for the focus metric. For example, for an image number X+1 in a video feed sequence, the previous N images, may have various metric values associated with each of them. Various metrics such as focus, motion, and contrast are discussed, but others are possible. A value for each metric for each of the N images may be calculated, and then from those individual values, a mean value and standard deviation value may be calculated. The mean and standard deviation (STD) may then be used to calculate a normalized historical metric value, for example STD (metric)/MEAN (metric). Thus, the value of a historical focus metric at a particular image may be the STD divided by the mean for the focus metric for the previous N frames. For example, historical metrics (HIST) for focus, motion, and contrast may be expressed as:

$$HIST_{Focus} = \frac{STD_{Focus}}{MEAN_{Focus}}$$

$$HIST_{Motion} = \frac{STD_{Motion}}{MEAN_{Motion}}$$

$$HIST_{Contrast} = \frac{STD_{Contrast}}{MEAN_{Contrast}}$$

In one embodiment the historical metric may be further normalized by dividing the above historical metrics by the number of frames N, particularly in situations where there are small number of frames under consideration for the particular time window. The historical metrics may be recalculated with each new image frame that is received as part of the video feed. Thus each frame of an incoming video feed may have a different historical metric from the frame before. The metrics for a particular image of a video feed may be compared historical metrics to select a desirable image on which to perform image processing.

Image selection component 920 may perform various operations to identify potential locations in an image that may contain recognizable text. This process may be referred to as glyph region detection. A glyph is a text character that has yet to be recognized. If a glyph region is detected, various metrics may be calculated to assist the eventual optical character recognition (OCR) process. For example, the same metrics used for overall image selection may be re-used or recalculated for the specific glyph region. Thus, while the entire image may be of sufficiently high quality, the quality of the specific glyph region (i.e. focus, contrast, intensity, etc.) may be measured. If the glyph region is of poor quality, the image may be rejected for purposes of text recognition.

Image selection component 920 may generate a bounding box that bounds a line of text. The bounding box may bound the glyph region. Value(s) for image/region suitability metric(s) may be calculated for the portion of the image in the bounding box. Value(s) for the same metric(s) may also be calculated for the portion of the image outside the bounding box. The value(s) for inside the bounding box may then be compared to the value(s) outside the bounding box to make another determination on the suitability of the image. This determination may also use a classifier.

Additional features may be calculated for determining whether an image includes a text region of sufficient quality for further processing. The values of these features may also be processed using a classifier to determine whether the image contains true text character/glyphs or is otherwise suitable for recognition processing. To locally classify each candidate character location as a true text character/glyph location, a set of features that capture salient characteristics of the candidate location is extracted from the local pixel pattern. Such features may include aspect ratio (bounding box width/bounding box height), compactness ($4*\pi*$candidate glyph area/(perimeter)$^2$), solidity (candidate glyph area/bounding box area), stroke-width to width ratio (maximum stroke width/bounding box width), stroke-width to height ratio (maximum stroke width/bounding box height), convexity (convex hull perimeter/perimeter), raw compactness ($4*\pi*$(candidate glyph number of pixels)/(perimeter)$^2$), number of holes in candidate glyph, or other features. Other candidate region identification techniques may be used. For example, the system may use techniques involving maximally stable extremal regions (MSERs). Instead of MSERs (or in conjunction with MSERs), the candidate locations may be identified using histogram of oriented gradients (HoG) and Gabor features.

If an image is sufficiently high quality it may be selected by image selection 920 for sending to another component (e.g., from device to system component(s) 120) and/or for further processing, such as text recognition, object detection/resolution, etc.

The feature data calculated by image selection component 920 may be sent to other components such as text recognition component 940, objection detection component 930, object resolution component 950, etc. so that those components may use the feature data in their operations. Other preprocessing operations such as masking, binarization, etc. may be performed on image data prior to recognition/resolution operations. Those preprocessing operations may be performed by the device prior to sending image data or by system component(s) 120.

Object detection component 930 may be configured to analyze image data to identify one or more objects represented in the image data. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

The object detection component 930 may process at least a portion of the image data to determine feature data. The feature data is indicative of one or more features that are depicted in the image data. For example, the features may be face data, or other objects, for example as represented by stored data in profile storage 270. Other examples of features may include shapes of body parts or other such features that identify the presence of a human. Other examples of features may include edges of doors, shadows on the wall, texture on the walls, portions of artwork in the environment, and so forth to identify a space. The object detection component 930 may compare detected features to stored data (e.g., in profile storage 270, image data 970, or other storage) indicating how detected features may relate to known objects for purposes of object detection.

Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

One statistical algorithm that may be used for geometric matching of images is the Random Sample Consensus (RANSAC) algorithm, although other variants of RANSAC-like algorithms or other statistical algorithms may also be used. In RANSAC, a small set of putative correspondences is randomly sampled. Thereafter, a geometric transformation is generated using these sampled feature points. After generating the transformation, the putative correspondences that fit the model are determined. The putative correspondences that fit the model and are geometrically consistent and called "inliers." The inliers are pairs of feature points, one from each image, that may correspond to each other, where the pair fits the model within a certain comparison threshold for the visual (and other) contents of the feature points, and are geometrically consistent (as explained below relative to motion estimation). A total number of inliers may be determined. The above mentioned steps may be repeated until the number of repetitions/trials is greater than a predefined threshold or the number of inliers for the image is sufficiently high to determine an image as a match (for example the number of inliers exceeds a threshold). The RANSAC algorithm returns the model with the highest number of inliers corresponding to the model.

To further test pairs of putative corresponding feature points between images, after the putative correspondences are determined, a topological equivalence test may be performed on a subset of putative correspondences to avoid forming a physically invalid transformation. After the transformation is determined, an orientation consistency test may be performed. An offset point may be determined for the feature points in the subset of putative correspondences in one of the images. Each offset point is displaced from its corresponding feature point in the direction of the orientation of that feature point. The transformation is discarded based on orientation of the feature points obtained from the feature points in the subset of putative correspondences if any one of the images being matched and its offset point differs from an estimated orientation by a predefined limit. Subsequently, motion estimation may be performed using the subset of putative correspondences which satisfy the topological equivalence test.

Motion estimation (also called geometric verification) may determine the relative differences in position between corresponding pairs of putative corresponding feature points. A geometric relationship between putative corresponding feature points may determine where in one image (e.g., the image input to be matched) a particular point is found relative to that potentially same point in the putatively matching image (i.e., a database image). The geometric relationship between many putatively corresponding feature point pairs may also be determined, thus creating a potential map between putatively corresponding feature points across images. Then the geometric relationship of these points may be compared to determine if a sufficient number of points correspond (that is, if the geometric relationship between point pairs is within a certain threshold score for the geometric relationship), thus indicating that one image may represent the same real-world physical object, albeit from a different point of view. Thus, the motion estimation may determine that the object in one image is the same as the object in another image, only rotated by a certain angle or viewed from a different distance, etc.

The above processes of image comparing feature points and performing motion estimation across putative matching images may be performed multiple times for a particular query image to compare the query image to multiple potential matches among the stored database images. Dozens of comparisons may be performed before one (or more) satisfactory matches that exceed the relevant thresholds (for both matching feature points and motion estimation) may be found. The thresholds may also include a confidence threshold, which compares each potential matching image with a confidence score that may be based on the above processing. If the confidence score exceeds a certain high threshold, the system may stop processing additional candidate matches and simply select the high confidence match as the final match. Or if, the confidence score of an image is within a certain range, the system may keep the candidate image as a potential match while continuing to search other database images for potential matches. In certain situations, multiple database images may exceed the various matching/confidence thresholds and may be determined to be candidate matches. In this situation, a comparison of a weight or confidence score may be used to select the final match, or some combination of candidate matches may be used to return results. The system may continue attempting to match an image until a certain number of potential matches are identified, a certain confidence score is reached (either individually with a single potential match or among multiple matches), or some other search stop indicator is triggered. For example, a weight may be given to each object of a potential matching database image. That weight may incrementally increase if multiple query images (for example, multiple frames from the same image stream) are found to be matches with database images of a same object. If that weight exceeds a threshold, a search stop indicator may be triggered and the corresponding object selected as the match.

Once an object is detected by object detection component 930 the system may determine which object is actually seen using object resolution component 950. Thus one component, such as object detection component 930, may detect if an object is represented in an image while another component, object resolution component 950 may determine which object is actually represented. Although illustrated as separate components, the system may also be configured so that a single component may perform both object detection and object resolution.

For example, when a database image is selected as a match to the query image, the object in the query image may be determined to be the object in the matching database image. An object identifier associated with the database image (such as a product ID or other identifier) may be used to return results to a user, along the lines of "I see you holding object X" along with other information, such giving the user information about the object. If multiple potential matches are returned (such as when the system can't determine exactly what object is found or if multiple objects appear in the query image) the system may indicate to the user that multiple potential matching objects are found and may return information/options related to the multiple objects.

In another example, object detection component 930 may determine that a type of object is represented in image data and object resolution component 950 may then determine which specific object is represented. The object resolution component 950 may also make available specific data about a recognized object to further components so that further operations may be performed with regard to the resolved object.

Object detection component 930 may be configured to process image data to detect a representation of an approximately two-dimensional (2D) object (such as a piece of paper) or a three-dimensional (3D) object (such as a face). Such recognition may be based on available stored data (e.g., 270, 970, etc.) which in turn may have been provided through an image data ingestion process managed by image data ingestion component 910. Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

As part of an enhanced privacy mode, a host device 110 may certain image processing on image data from a capture device 115 prior to data relating to the image being sent out of an environment associated with the enhanced privacy mode. For example, image data captured by a doorbell camera 115b may be processed by a host device 110 (e.g., motile device 110k shown below in FIG. 19) to remove/obfuscate data prior to being sent for further processing, for example to system component(s) 120. For example, a host device 110 may receive image data from a capture device 115 and may process the image data to determine feature vector data, blurred image data, edge data, or the like (e.g., interim image data), which may remove data that is to be private but may leave data that is needed for the downstream image processing to be performed by the system component(s) 120. The processing on the image data to determine such interim image data may depend on both the privacy settings (which may indicate what data is to be removed/obfuscated) and/or the downstream image processing to be performed (which may indicate what data is to be preserved to allow for sufficient processing).

Figure 10:
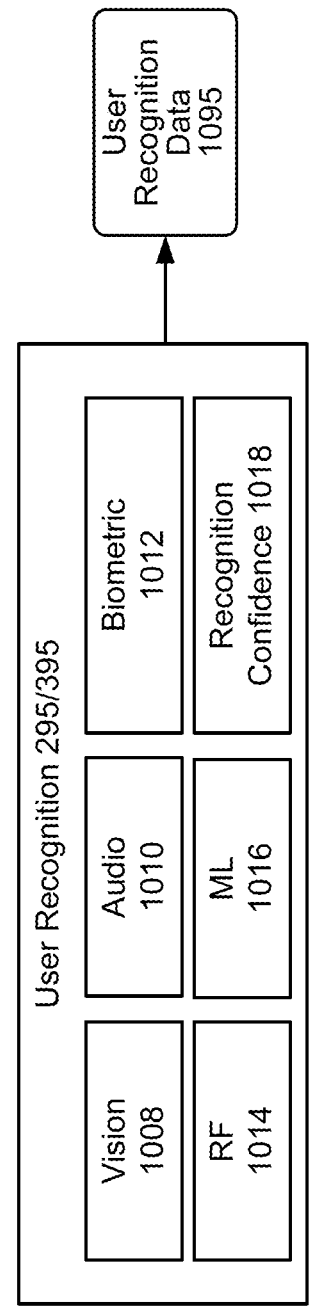
FIG. 10 is a schematic diagram of an illustrative architecture in which sensor data is combined to recognize one or more users according to embodiments of the present disclosure.

The device 110 and/or the system component(s) 120 may include a user recognition component 295 that recognizes one or more users using a variety of data. As illustrated in FIG. 10, the user recognition component 295 may include one or more subcomponents including a vision component 1008, an audio component 1010, a biometric component 1012, a radio frequency (RF) component 1014, a machine learning (ML) component 1016, and a recognition confidence component 1018. In some instances, the user recognition component 295 may monitor data and determinations from one or more subcomponents to determine an identity of one or more users associated with data input to the device 110 and/or the system component(s) 120. The user recognition component 295 may output user recognition data 1095, which may include a user identifier associated with a user the user recognition component 295 determines originated data input to the device 110 and/or the system component(s) 120. The user recognition data 1095 may be used to inform processes performed by various components of the device 110 and/or the system component(s) 120.

The vision component 1008 may receive data from one or more sensors capable of providing images (e.g., cameras) or sensors indicating motion (e.g., motion sensors). The vision component 1008 can perform facial recognition or image analysis to determine an identity of a user and to associate that identity with a user profile associated with the user. In some instances, when a user is facing a camera, the vision component 1008 may perform facial recognition and identify the user with a high degree of confidence. In other instances, the vision component 1008 may have a low degree of confidence of an identity of a user, and the user recognition component 295 may utilize determinations from additional components to determine an identity of a user. The vision component 1008 can be used in conjunction with other components to determine an identity of a user. For example, the user recognition component 295 may use data from the vision component 1008 with data from the audio component 1010 to identify what user's face appears to be speaking at the same time audio is captured by a device 110 the user is facing for purposes of identifying a user who spoke an input to the device 110 and/or the system component(s) 120.

The overall system of the present disclosure may include biometric sensors that transmit data to the biometric component 1012. For example, the biometric component 1012 may receive data corresponding to fingerprints, iris or retina scans, thermal scans, weights of users, a size of a user, pressure (e.g., within floor sensors), etc., and may determine a biometric profile corresponding to a user. The biometric component 1012 may distinguish between a user and sound from a television, for example. Thus, the biometric component 1012 may incorporate biometric information into a confidence level for determining an identity of a user. Biometric information output by the biometric component 1012 can be associated with specific user profile data such that the biometric information uniquely identifies a user profile of a user.

The radio frequency (RF) component 1014 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 1014 the strength of the signal (e.g., as a received signal strength indication (RSSI)). The RF component 1014 may use the RSSI to determine an identity of a user (with an associated confidence level). In some instances, the RF component 1014 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 1016 may track the behavior of various users as a factor in determining a confidence level of the identity of the user. By way of example, a user may adhere to a regular schedule such that the user is at a first location during the day (e.g., at work or at school). In this example, the ML component 1016 would factor in past behavior and/or trends in determining the identity of the user that provided input to the device 110 and/or the system component(s) 120. Thus, the ML component 1016 may use historical data and/or usage patterns over time to increase or decrease a confidence level of an identity of a user.

In at least some instances, the recognition confidence component 1018 receives determinations from the various components 1008, 1010, 1012, 1014, and 1016, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 1095.

The audio component 1010 may receive data from one or more sensors capable of providing an audio signal (e.g., one or more microphones) to facilitate recognition of a user. The audio component 1010 may perform audio recognition on an audio signal to determine an identity of the user and associated user identifier. In some instances, aspects of device 110 and/or the system component(s) 120 may be configured at a computing device (e.g., a server in user's home). Thus, in some instances, the audio component 1010 operating on a computing device may analyze all sound to facilitate recognition of a user. In some instances, the audio component 1010 may perform voice recognition to determine an identity of a user.

The audio component 1010 may also perform user identification based on audio data 111 input into the device 110 and/or the system component(s) 120 for speech processing. The audio component 1010 may determine scores indicating whether speech in the audio data 111 originated from particular users. For example, a first score may indicate a likelihood that speech in the audio data 111 originated from a first user associated with a first user identifier, a second score may indicate a likelihood that speech in the audio data 111 originated from a second user associated with a second user identifier, etc. The audio component 1010 may perform user recognition by comparing speech characteristics represented in the audio data 111 to stored speech characteristics of users (e.g., stored voice profiles associated with the device 110 that captured the spoken user input).

Figure 11:
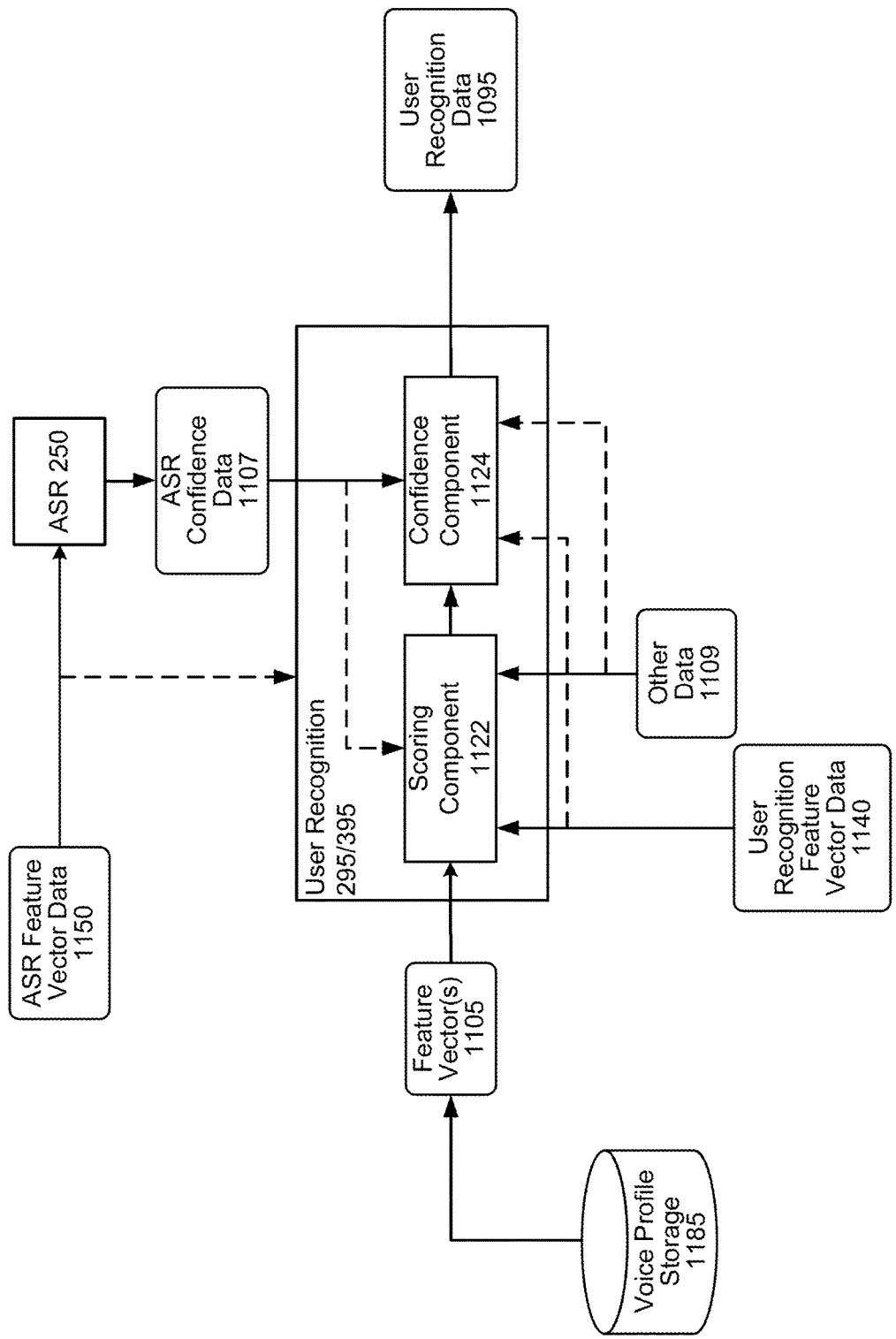
FIG. 11 is a system flow diagram illustrating user recognition according to embodiments of the present disclosure.

FIG. 11 illustrates user recognition processing as may be performed by the user recognition component 295. The ASR component 250 performs ASR processing on ASR feature vector data 1150. ASR confidence data 1107 may be passed to the user recognition component 295.

The user recognition component 295 performs user recognition using various data including the user recognition feature vector data 1140, feature vectors 1105 representing voice profiles of users of the system 100, the ASR confidence data 1107, and other data 1109. The user recognition component 295 may output the user recognition data 1095, which reflects a certain confidence that the user input was spoken by one or more particular users. The user recognition data 1095 may include one or more user identifiers (e.g., corresponding to one or more voice profiles). Each user identifier in the user recognition data 1095 may be associated with a respective confidence value, representing a likelihood that the user input corresponds to the user identifier. A confidence value may be a numeric or binned value.

The feature vector(s) 1105 input to the user recognition component 295 may correspond to one or more voice profiles. The user recognition component 295 may use the feature vector(s) 1105 to compare against the user recognition feature vector 1140, representing the present user input, to determine whether the user recognition feature vector 1140 corresponds to one or more of the feature vectors 1105 of the voice profiles. Each feature vector 1105 may be the same size as the user recognition feature vector 1140.

To perform user recognition, the user recognition component 295 may determine the device 110 from which the audio data 111 originated. For example, the audio data 111 may be associated with metadata including a device identifier representing the device 110. Either the device 110 or the system component(s) 120 may generate the metadata. The system 100 may determine a group profile identifier associated with the device identifier, may determine user identifiers associated with the group profile identifier, and may include the group profile identifier and/or the user identifiers in the metadata. The system 100 may associate the metadata with the user recognition feature vector 1140 produced from the audio data 111. The user recognition component 295 may send a signal to voice profile storage 1185, with the signal requesting only audio data and/or feature vectors 1105 (depending on whether audio data and/or corresponding feature vectors are stored) associated with the device identifier, the group profile identifier, and/or the user identifiers represented in the metadata. This limits the universe of possible feature vectors 1105 the user recognition component 295 considers at runtime and thus decreases the amount of time to perform user recognition processing by decreasing the amount of feature vectors 1105 needed to be processed. Alternatively, the user recognition component 295 may access all (or some other subset of) the audio data and/or feature vectors 1105 available to the user recognition component 295. However, accessing all audio data and/or feature vectors 1105 will likely increase the amount of time needed to perform user recognition processing based on the magnitude of audio data and/or feature vectors 1105 to be processed.

If the user recognition component 295 receives audio data from the voice profile storage 1185, the user recognition component 295 may generate one or more feature vectors 1105 corresponding to the received audio data.

The user recognition component 295 may attempt to identify the user that spoke the speech represented in the audio data 111 by comparing the user recognition feature vector 1140 to the feature vector(s) 1105. The user recognition component 295 may include a scoring component 1122 that determines respective scores indicating whether the user input (represented by the user recognition feature vector 1140) was spoken by one or more particular users (represented by the feature vector(s) 1105). The user recognition component 295 may also include a confidence component 1124 that determines an overall accuracy of user recognition processing (such as those of the scoring component 1122) and/or an individual confidence value with respect to each user potentially identified by the scoring component 1122. The output from the scoring component 1122 may include a different confidence value for each received feature vector 1105. For example, the output may include a first confidence value for a first feature vector 1105a (representing a first voice profile), a second confidence value for a second feature vector 1105b (representing a second voice profile), etc. Although illustrated as two separate components, the scoring component 1122 and the confidence component 1124 may be combined into a single component or may be separated into more than two components.

The scoring component 1122 and the confidence component 1124 may implement one or more trained machine learning models (such as neural networks, classifiers, etc.) as known in the art. For example, the scoring component 1122 may use probabilistic linear discriminant analysis (PLDA) techniques. PLDA scoring determines how likely it is that the user recognition feature vector 1140 corresponds to a particular feature vector 1105. The PLDA scoring may generate a confidence value for each feature vector 1105 considered and may output a list of confidence values associated with respective user identifiers. The scoring component 1122 may also use other techniques, such as GMMs, generative Bayesian models, or the like, to determine confidence values.

The confidence component 1124 may input various data including information about the ASR confidence 1107, speech length (e.g., number of frames or other measured length of the user input), audio condition/quality data (such as signal-to-interference data or other metric data), fingerprint data, image data, or other factors to consider how confident the user recognition component 295 is with regard to the confidence values linking users to the user input. The confidence component 1124 may also consider the confidence values and associated identifiers output by the scoring component 1122. For example, the confidence component 1124 may determine that a lower ASR confidence 1107, or poor audio quality, or other factors, may result in a lower confidence of the user recognition component 295. Whereas a higher ASR confidence 1107, or better audio quality, or other factors, may result in a higher confidence of the user recognition component 295. Precise determination of the confidence may depend on configuration and training of the confidence component 1124 and the model(s) implemented thereby. The confidence component 1124 may operate using a number of different machine learning models/techniques such as GMM, neural networks, etc. For example, the confidence component 1124 may be a classifier configured to map a score output by the scoring component 1122 to a confidence value.

The user recognition component 295 may output user recognition data 1095 specific to a one or more user identifiers. For example, the user recognition component 295 may output user recognition data 1095 with respect to each received feature vector 1105. The user recognition data 1095 may include numeric confidence values (e.g., 0.0-1.0, 0-1000, or whatever scale the system is configured to operate). Thus, the user recognition data 1095 may output an n-best list of potential users with numeric confidence values (e.g., user identifier 123—0.2, user identifier 234—0.8). Alternatively or in addition, the user recognition data 1095 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 295 may output an n-best list of user identifiers with binned confidence values (e.g., user identifier 123—low, user identifier 234—high). Combined binned and numeric confidence value outputs are also possible. Rather than a list of identifiers and their respective confidence values, the user recognition data 1095 may only include information related to the top scoring identifier as determined by the user recognition component 295. The user recognition component 295 may also output an overall confidence value that the individual confidence values are correct, where the overall confidence value indicates how confident the user recognition component 295 is in the output results. The confidence component 1124 may determine the overall confidence value.

The confidence component 1124 may determine differences between individual confidence values when determining the user recognition data 1095. For example, if a difference between a first confidence value and a second confidence value is large, and the first confidence value is above a threshold confidence value, then the user recognition component 295 is able to recognize a first user (associated with the feature vector 1105 associated with the first confidence value) as the user that spoke the user input with a higher confidence than if the difference between the confidence values were smaller.

The user recognition component 295 may perform thresholding to avoid incorrect user recognition data 1095 being output. For example, the user recognition component 295 may compare a confidence value output by the confidence component 1124 to a threshold confidence value. If the confidence value does not satisfy (e.g., does not meet or exceed) the threshold confidence value, the user recognition component 295 may not output user recognition data 1095, or may only include in that data 1095 an indicator that a user that spoke the user input could not be recognized. Further, the user recognition component 295 may not output user recognition data 1095 until enough user recognition feature vector data 1140 is accumulated and processed to verify a user above a threshold confidence value. Thus, the user recognition component 295 may wait until a sufficient threshold quantity of audio data of the user input has been processed before outputting user recognition data 1095. The quantity of received audio data may also be considered by the confidence component 1124.

The user recognition component 295 may be defaulted to output binned (e.g., low, medium, high) user recognition confidence values. However, such may be problematic in certain situations. For example, if the user recognition component 295 computes a single binned confidence value for multiple feature vectors 1105, the system may not be able to determine which particular user originated the user input. In this situation, the user recognition component 295 may override its default setting and output numeric confidence values. This enables the system to determine a user, associated with the highest numeric confidence value, originated the user input.

The user recognition component 295 may use other data 1109 to inform user recognition processing. A trained model(s) or other component of the user recognition component 295 may be trained to take other data 1109 as an input feature when performing user recognition processing. Other data 1109 may include a variety of data types depending on system configuration and may be made available from other sensors, devices, or storage. The other data 1109 may include a time of day at which the audio data 111 was generated by the device 110 or received from the device 110, a day of a week in which the audio data audio data 111 was generated by the device 110 or received from the device 110, etc.

The other data 1109 may include image data or video data. For example, facial recognition may be performed on image data or video data received from the device 110 from which the audio data 111 was received (or another device). Facial recognition may be performed by the user recognition component 295. The output of facial recognition processing may be used by the user recognition component 295. That is, facial recognition output data may be used in conjunction with the comparison of the user recognition feature vector 1140 and one or more feature vectors 1105 to perform more accurate user recognition processing.

The other data 1109 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 1109 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 111 was received is a smart watch or vehicle belonging to a user A, the fact that the device 110 belongs to user A may increase a user recognition confidence value associated with user A and/or decrease a user recognition confidence value associated with user B.

The other data 1109 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 111. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 1109 may include data representing activity of a particular user that may be useful in performing user recognition processing. For example, a user may have recently entered a code to disable a home security alarm. A device 110, represented in a group profile associated with the home, may have generated the audio data 111. The other data 1109 may reflect signals from the home security alarm about the disabling user, time of disabling, etc. If a mobile device (such as a smart phone, Tile, dongle, or other device) known to be associated with a particular user is detected proximate to (for example physically close to, connected to the same Wi-Fi network as, or otherwise nearby) the device 110, this may be reflected in the other data 1109 and considered by the user recognition component 295.

Depending on system configuration, the other data 1109 may be configured to be included in the user recognition feature vector data 1140 so that all the data relating to the user input to be processed by the scoring component 1122 may be included in a single feature vector. Alternatively, the other data 1109 may be reflected in one or more different data structures to be processed by the scoring component 1122.

Figure 12:
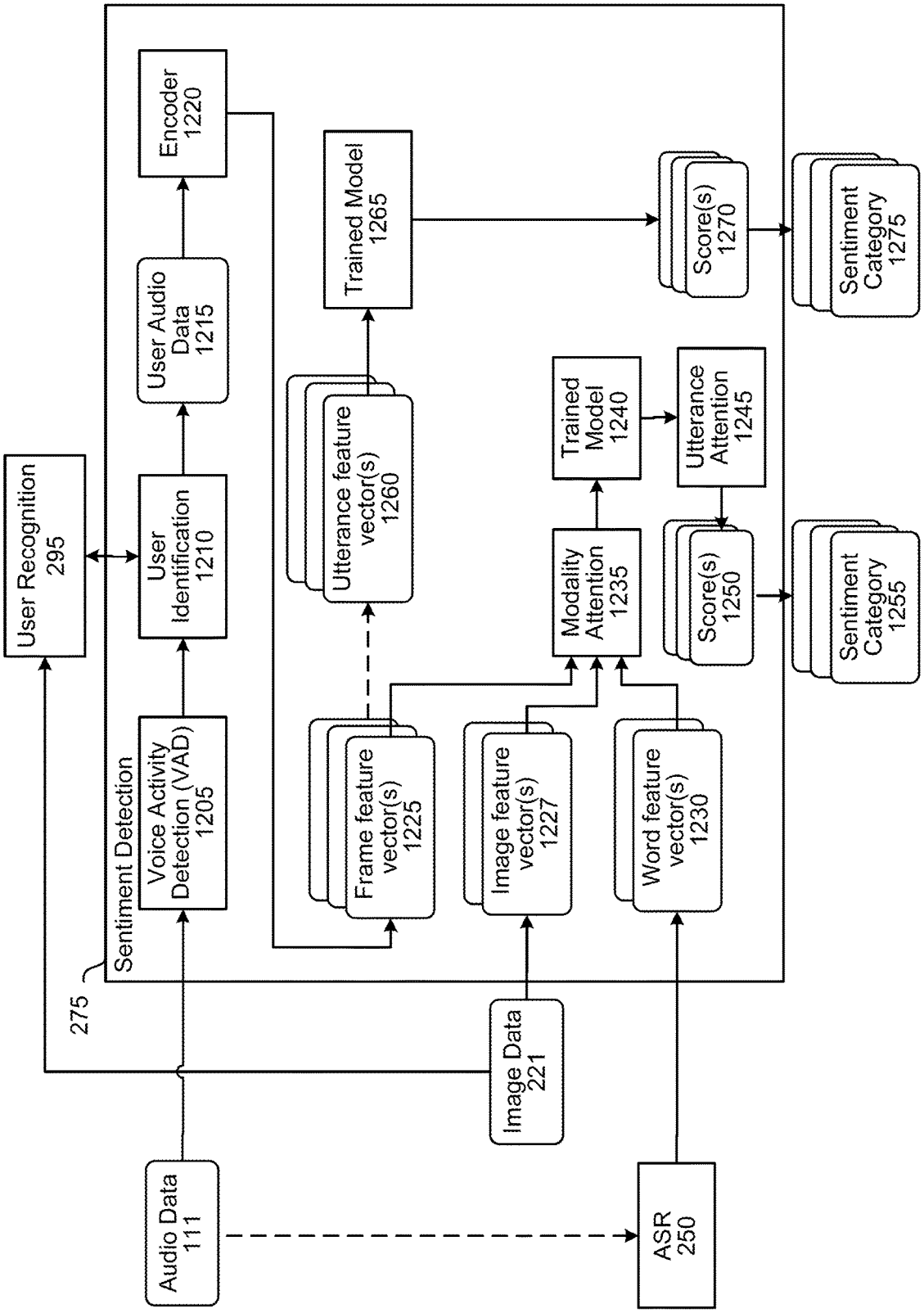
FIG. 12 is a conceptual diagram illustrating a sentiment detection component according to embodiments of the present disclosure.

FIG. 12 is a conceptual diagram illustrating sentiment detection component 275 according to embodiments of the present disclosure. The sentiment detection component 275 may determine a user sentiment based on audio data 111, image data 111, and other data. Although certain configurations/operations of the sentiment detection component 275 are illustrated in FIG. 12 and described herein, other techniques/configurations of sentiment detection may be used depending on system configuration.

The sentiment detection component 275 may include a voice activity detection (VAD) component 1205, a user identification component 1210, an encoder component 1220, a modality attention layer 1235, a trained model component 1240, an utterance attention layer 1245, and a trained model component 1265. The audio data 111 captured by a device 110 may be inputted into the VAD component 1205. The VAD component 1205 may determine if the audio data 111 includes speech spoken by a human or voice activity by a human, and may determine a portion of the audio data 111 that includes speech or voice activity. The VAD component 1205 may send the portion of the audio data 111 including speech or voice activity to the user identification component 1210. The VAD component 1205 may employ voice activity detection techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the VAD component 1205 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The user identification component 1210 may communicate with the user recognition component 295 to determine user audio data 1215 that corresponds to a particular user profile. The user recognition component 295 may recognize one or more users as described in connection with FIGS. 10 and 11. The user audio data 1215 may be a portion of the audio data 111 that includes speech or one or more utterances from a particular user associated with the user profile. In other words, audio data representing a particular user's speech may be isolated and stored as the user audio data 1215 for further analysis. In an example embodiment, the user may be associated with or using the device 110, and may have provided permission to the system 100 to record and analyze his or her voice/conversations to determine a sentiment category corresponding to the conversation.

The user audio data 1215 may be input into the encoder component 1220 to determine frame feature vector(s) 1225. The encoder component 1220 may be a bidirectional LSTM. The frame feature vector(s) 1225 may represent audio frame level features extracted from the user audio data 1215. One frame feature vector 1225 may represent audio frame level features for an audio frame of 20 ms of the user audio data 1215. The frame feature vector(s) 1225 may be derived by spectral analysis of the user audio data 1215. The sentiment detection component 275 may determine the portions of user audio data 1215 that correspond to individual words and may extract acoustic features from the respective portions of audio using the encoder component 1220.

In some embodiments, the frame feature vector(s) 1225 may be used to determine utterance feature vector(s) 1260 representing utterance-level features of one or more utterances represented in the user audio data 1215. The utterance feature vector(s) 1260 may be determined by performing statistics calculations, delta calculation and other processing on the frame feature vector(s) 1225 for the audio frames corresponding to an utterance of interest. As such, the utterance feature vector(s) 1260 may be a feature matrix whose dimensions are based on the number of audio frames corresponding to the utterance of interest and the dimension of the corresponding frame feature vector 1225. The utterance feature vector(s) 1260 may be a high-level function or other mathematical functions representing the utterance-level features.

The ASR component 250, as described above, may generate ASR output data, for example including text data representative of one or more utterances represented in the audio data 111. In some examples, the system sends audio data 111 to the ASR component 250 for processing. In other examples, the system sends user audio data 1215 to the ASR component 250 for processing. The ASR output may be represented as word feature vector(s) 1230, where each word feature vector 1230 may correspond to a word in the text data determined by the ASR component 250 and may represent lexical information of the utterance. The word feature vector 1230 may be a word embedding.

In an example embodiment, the sentiment detection component 275 determines that the user audio data 1215 includes an entire utterance. That is, the sentiment detection component 275 may determine that a beginpoint of the user audio data 1215 corresponds to a beginpoint of an utterance, and an endpoint of the user audio data 1215 corresponds to an endpoint of the utterance. In this case, the frame feature vector(s) 1225 and the word feature vector(s) 1230 may represent all the words in one utterance.

The sentiment detection component 275 may also input image data 111 which may come from still images, an image feed of video data, or the like for example from one or more cameras of device 110 or otherwise. The image data 111 may include a representation of a user which the system may analyze to determine the user's sentiment. Image data 111 may be processed by an encoder (not illustrated) to determine image feature vector(s) 1227. Such an encoder may be included as part of sentiment detection component 275 or may be located separately, in which case image feature vector(s) 1227 may be input into sentiment detection component 275 in addition to or instead of image data 111. The image data/feature vectors may be analyzed separately by sentiment detection component 275 if audio data/ASR data is unavailable. The image data/feature vectors may also be analyzed in conjunction with the audio data/ASR output data.

The sentiment detection component 275 may align a frame feature vector 1225 with a corresponding word feature vector 1230 such that the pair represents acoustic information and lexical information, respectively, for an individual word in the utterance represented in user audio data 1215. The sentiment detection component 275 may similarly align one or more image feature vector(s) 1227 with one or more frame feature vector(s) 1225 and/or corresponding word feature vector(s) 1230 so the appropriate image(s) are matched with the frames/ASR output data thus allowing the system to consider the audio, content and image of the user talking when performing sentiment analysis. The frame feature vectors 1225, image feature vector(s) 1227, and the word feature vectors 1230 may be processed by the trained model 1240 simultaneously.

The trained model 1240 may process the frame feature vector(s) 1225 and corresponding word feature vector(s) 1230 using a machine learning model. In some embodiments, the sentiment detection component 275 includes a modality attention component 1235 configured to determine how much acoustic information versus how much lexical information versus how much image information from the respective feature vectors 1225/1227/1230 should be used by the trained model 1240. In some cases the acoustic information corresponding to certain words may indicate a certain sentiment based on how the words were spoken by the user. In other cases the lexical information corresponding to certain words may indicate a certain sentiment based on the meaning or semantic of the word. For example, words "hey you" spoken with a certain level of anger, as indicated by the corresponding acoustic information, may indicate a sentiment category of anger, while the same words "hey you" spoken with no level of anger or excitement, as indicated by the corresponding acoustic information, may indicate a sentiment category of neutral. As a lexical example, the words "I am angry" may indicate a sentiment category of anger based on the corresponding lexical information. The modality attention component 1235 may assign a weight or percentage to the data represented by the acoustic feature vectors, the data represented by the image feature vectors, and the data represented by the lexical feature vectors to indicate the importance of each to the trained model 1240.

The trained model 1240 may be a neural network, for example a bi-directional LSTM. The output of the trained model 1240 may be fed into an utterance attention component 1245. The utterance attention component 1245 may employ a neural network, for example a recurrent neural network, although the disclosure is not limited thereto. The utterance attention component 1245 may be configured to emphasize relevant portions of an input utterance. The utterance attention component 1245 may be configured to take in output data from the trained model 1240 and produce an output for every time step (e.g., a 10 ms audio frame). The utterance attention component 1245 may be configured to aggregate information from different time intervals/audio frames of the input audio data to determine how certain parts of the utterance affects determining of the sentiment. For example, an acoustic representation of a first word in the utterance may indicate a high arousal implying anger, in which case the utterance attention component 1245 is configured to realize that the first word corresponds to an anger sentiment and that that should affect the processing of the other words in the utterance to ultimately determine a sentiment category corresponding to the utterance.

The utterance attention component 1245 may output score(s) 1250 indicating a sentiment category 1255 for the user audio data 1215. The sentiment detection component 275 may predict from multiple sentiment categories, including but not limited to, happiness, sadness, anger and neutral. In an example embodiment, the sentiment category 1255 may be determined after score(s) 1250 have been determined for a particular period of time of input audio data. In an example embodiment, the sentiment categories may be broad such as positive, neutral, and negative or may be more precise such as angry, happy, distressed, surprised, disgust, or the like.

In some embodiments, the sentiment detection component 275 is configured to determine a sentiment category 1275 at an utterance-level. The sentiment detection component 275 may use contextual information from the entire utterance to determine an overall sentiment of the speaker when speaking the utterance. The sentiment detection component 275 may also use information conveyed by individual words in the utterance to determine the sentiment of the speaker when speaking the utterance. For example, particular words may represent a particular sentiment or emotion because of its meaning (lexical information), while some words may represent a particular sentiment or emotion because of the way it is spoken by the user (acoustic information). In other embodiments, the sentiment detection component 275 may be configured to determine a sentiment category on a word level (that is for each word within an utterance).

As illustrated in FIG. 12, the trained model component 1265 may process the utterance feature vector(s) 1260 using a fully-connected neural network trained using techniques known to one of skill in the art. The trained model component 1265 may output score(s) 1270 indicating a sentiment category 1275 for the user audio data 1215.

The sentiment detection component 275 may predict one of three sentiment categories 1255/1275. In some examples, the sentiment categories 1255/1275 may be positive, neutral, and negative. However, the disclosure is not limited thereto, and in other examples the sentiment categories 1255/1275 may be angry, neutral (e.g., neutral/sad), and happy without departing from the disclosure. Additionally or alternatively, the sentiment detection component 275 may predict any number of sentiment categories 1255/1275 without departing from the disclosure. For example, the sentiment detection component 275 may predict one of four sentiment categories 1255/1275, such as angry, sad, neutral, and happy, although the disclosure is not limited thereto.

The machine learning model for the trained model component 1240/1265 may take many forms, including a neural network. The trained model component 1240/1265 may employ a convolutional neural network and/or may employ a fully-connected neural network. In some examples, a neural network may include a number of layers, from input layer 1 through output layer N. Each layer is configured to output a particular type of data and output another type of data. Thus, a neural network may be configured to input data of type data A (which is the input to layer 1) and output data of type data Z (which is the output from the last layer N). The output from one layer is then taken as the input to the next layer. For example, the output data (data B) from layer 1 is the input data for layer 2 and so forth such that the input to layer N is data Y output from a penultimate layer.

While values for the input data/output data of a particular layer are not known until a neural network is actually operating during runtime, the data describing the neural network describes the structure and operations of the layers of the neural network.

In some examples, a neural network may be structured with an input layer, middle layer(s), and an output layer. The middle layer(s) may also be known as the hidden layer(s). Each node of the hidden layer is connected to each node in the input layer and each node in the output layer. In some examples, a neural network may include a single hidden layer, although the disclosure is not limited thereto and the neural network may include multiple middle layers without departing from the disclosure. In this case, each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

In one aspect, the neural network may be constructed with recurrent connections such that the output of the hidden layer of the network feeds back into the hidden layer again for the next set of inputs. For example, each node of the input layer may connect to each node of the hidden layer, and each node of the hidden layer may connect to each node of the output layer. In addition, the output of the hidden layer may be fed back into the hidden layer for processing of the next set of inputs. A neural network incorporating recurrent connections may be referred to as a recurrent neural network (RNN).

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

Figure 13:
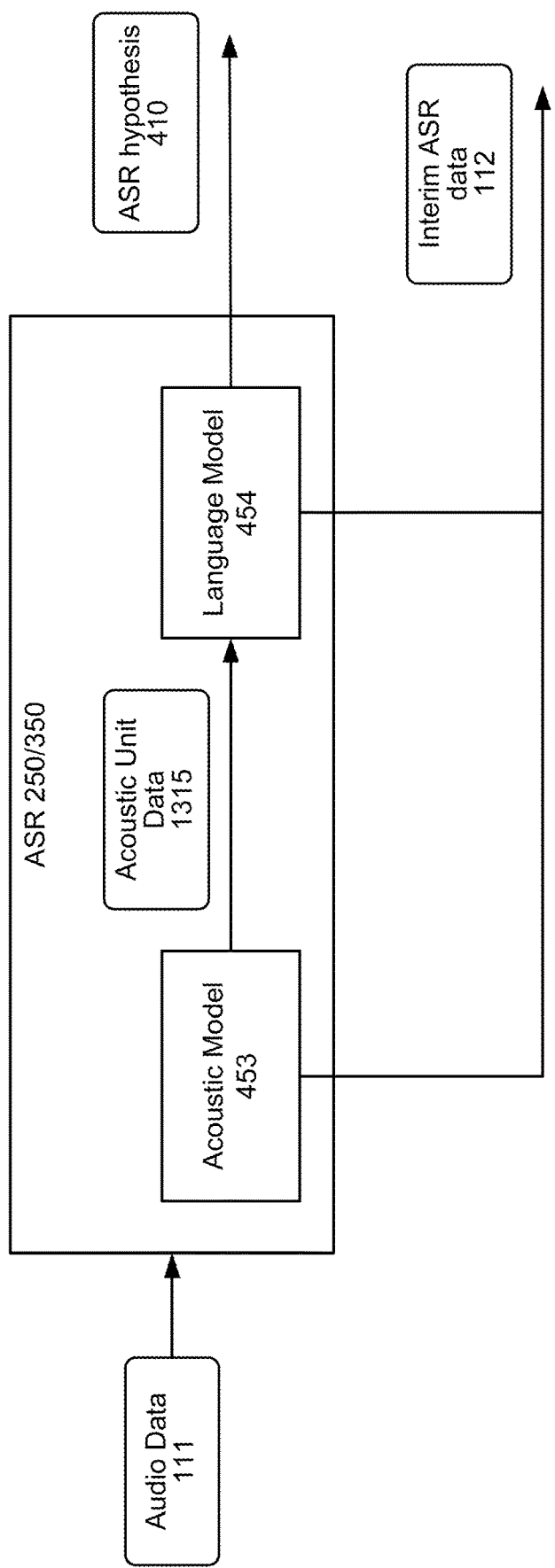
FIG. 13 is a conceptual diagram showing ASR processing in an ASR component, according to embodiments of the present disclosure.

As discussed above in reference to FIG. 1, there may be certain system configurations in which an ASR component (e.g., 350/350) may be configured to output interim (e.g., incomplete) ASR data. FIG. 13 is a conceptual diagram showing ASR processing in an ASR component 250/350, according to embodiments of the present disclosure. Such an ASR component 250/350 may operate as described above, but may also output interim ASR data 112. In one example, the interim ASR data 112 may include acoustic unit data 1315 which may represent acoustic units (and/or corresponding scores) determined by the acoustic model 453, for example acoustic units of the path 502 discussed above. The acoustic unit data 1315 output by the ASR 250 may be output after processing using the acoustic model 453 or may be output after processing by the language model 454, particularly as operations using the language model 454 may involve certain pruning/re-ranking/other operations that may result in a more useful set of acoustic unit data 1315 for downstream purposes (such as entity resolution as noted herein).

The interim ASR data 112 may also include data representing partial ASR processing. For example, the interim ASR data 112 may include a representation of a lattice (e.g., lattice 506 discussed above) where the lattice has a plurality of paths from a start node of the lattice to a terminal node of the lattice. The interim ASR data 112 may also include one or more scores corresponding to the lattice. For example, the interim ASR data 112 may include one or more scores corresponding to a first path 510, one or more scores corresponding to a second path 512, one or more scores corresponding to a third path 514, etc. The scores may corresponding to an entire path and/or to path segments which may correspond to words, sub-word acoustic units, or the like. The interim ASR data 112 may be in the form of a feature vector or other data structure which may be processed by a machine learning component (such as a neural network) to complete the ASR processing. For example, the interim ASR data 112 may include a feature vector or other partial data determine as a result of operating an ASR model(s) 450. Such feature vector or other partial data may be sent to a downstream component (e.g., system component(s) 120) for completion of ASR processing. The interim ASR data 112 may also represent a word result network (such as that discussed above in reference to FIG. 6), an FST (such as table data discussed above), and/or other interim ASR data 112. Such interim ASR data 112 may be used to assist speech processing in voice privacy mode as discussed herein.

Figure 14A:
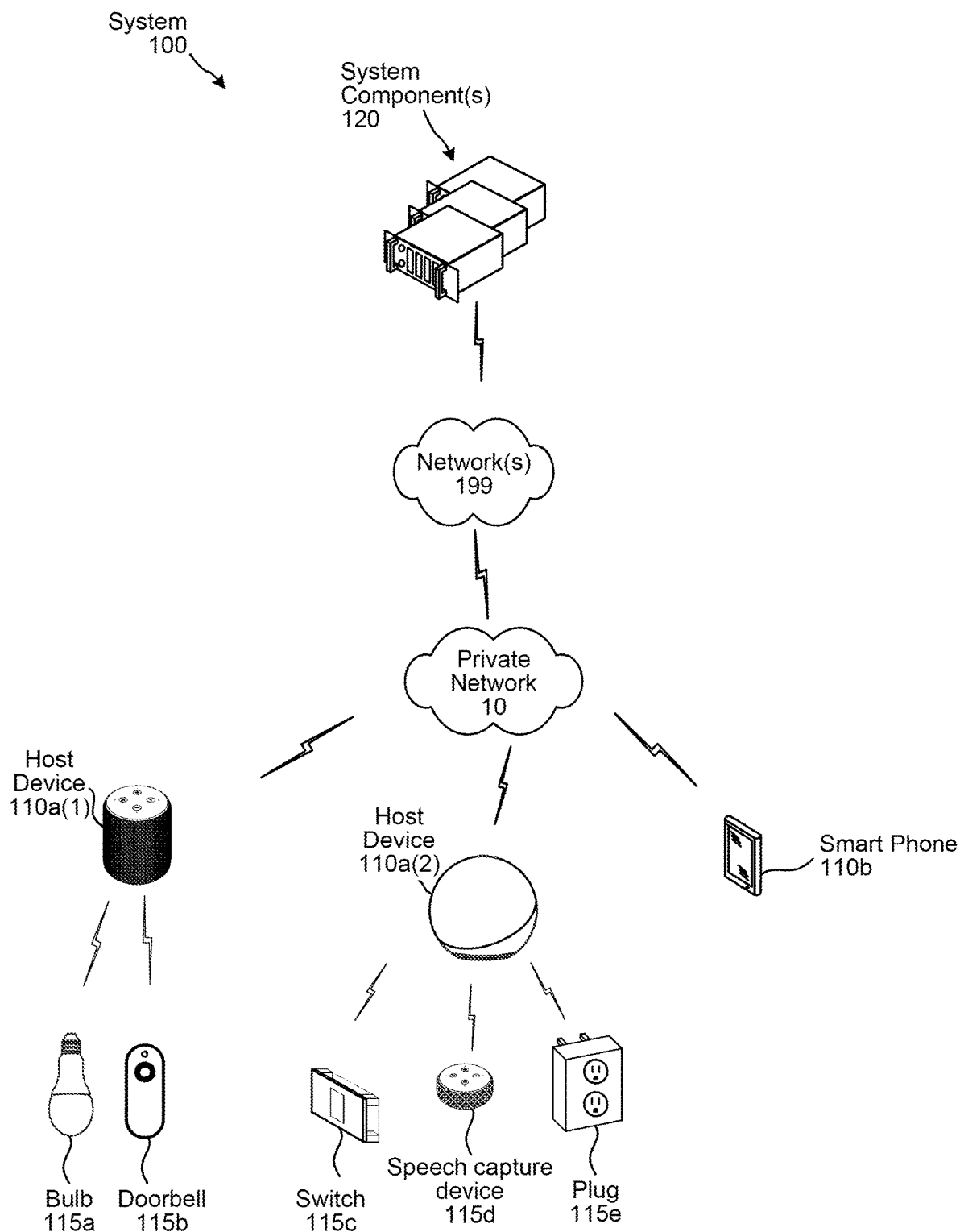
FIGS. 14A-14B illustrate different hub and device network configurations according to aspects of the present disclosure.
Figure 14B:
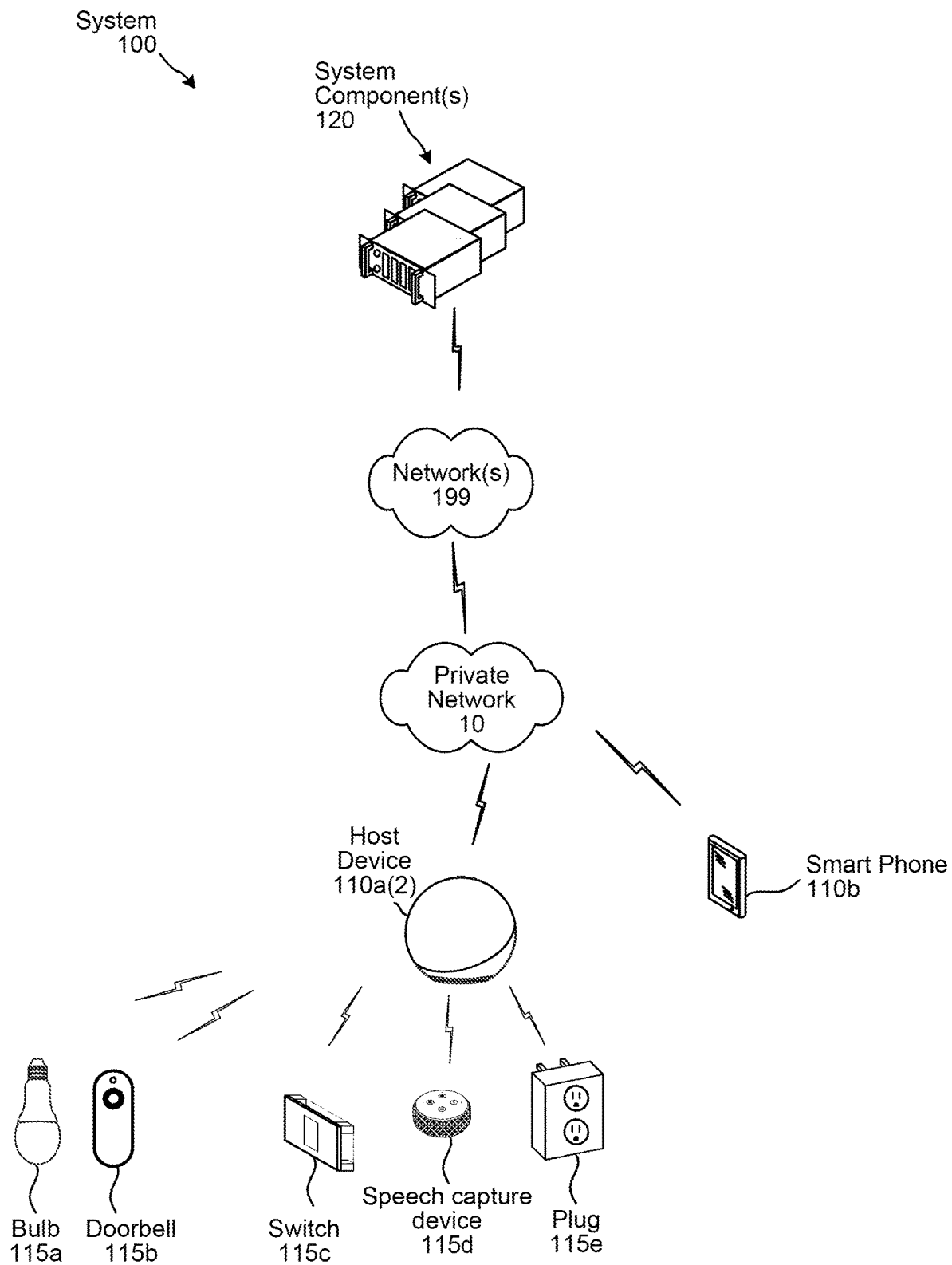

As discussed herein, a host device 110 may be used to assist in speech processing for an utterance captured by a capture device 115. Such host device 110 may be used to determine interim ASR data 112 based on audio captured by a capture device 115. Multiple host device(s) 110 in an environment may be used to assist multiple capture device(s) 115. For example, FIGS. 14A-14B illustrate different hub and device network configurations according to aspects of the present disclosure. As shown in FIG. 14A, multiple host devices 110a(1) and 110a(2) may be present in an environment. The host devices may be connected to a private network 10. The environment may also include a number of capture device(s) 115, such as bulb 115a, doorbell with camera 115b, switch 115c, speech capture device 115d, and plug 115e. A smart phone 110b, also connected to the private network 10, may be used as a companion device to control device(s) 110/115 such as configuring them for operation, changing their settings, or the like. For example, an Amazon Alexa application operating on a mobile phone may be used to control Alexa-enabled devices such as device(s) 110/115.

Different capture device(s) 115 may connect to different host device(s) 110 depending on device location, desired function, or the like. (Although not illustrated in FIG. 14A, the capture device(s) 115 may connect directly to the private network 10 in addition to connecting to the respective host device(s) 110a.) For example, in the example of FIG. 14A, host device 110a(1) may be collocated with bulb 115a and doorbell 115b while host device 110a(2) may be collocated with switch 115c, speech capture device 115d and plug 115e. In this scenario, resource limited capture devices 115a-115b may connect with host device 110a(1), while resource limited capture devices 115c-115e may connect with host device 110a(2). The devices 115a-115e may be capture devices. For example, doorbell 115b and/or switch 115c may have a camera and/or microphone to capture audio and/or image data while bulb 115a, speech capture device 115d and plug 115e may include a microphone to capture audio data.

If a host device 110 becomes unavailable (for example due to device failure, powering down of the host, or other condition) a capture device 115 that previously connected to the previous host device may attempt to connect with a different host device. For example, a device 115 may communicate with smart phone 110b and/or system component(s) 120 to identify another host device connected to the same private network 10 and/or associated with the same user profile as the device 115. Alternatively, or in addition, the device 115 may query other devices reachable using the private network 10 to see if any of those devices are capable of functioning as a host device. If so, the device 115 may connect to that host device. For example, as shown in FIG. 14B, if host device 110a(1) becomes unavailable, bulbs 115a-115b may connect to host device 110a(2) for hosting functionality. While a smart phone 110b may have sufficient capability to act as a host device if needed, given the mobile nature of the device 110b, capture device(s) 115 may default to using stationary host device(s) before attempting to use a smart phone 110b as a host device.

In one configuration, a first host device may provide certain functionality while a second host device provides different functionality. Thus a particular limited device 115 may connect to the first host device for the first functionality but connect to the second host device for the second functionality. For example, one host device 110 may provide speech processing functionality for a first language (or other first speech processing setting) while a different host device 110 may provide speech processing functionality for a second language (or other second speech processing setting). Thus, requests in the first language may be routed through one host device while requests in the second language may be routed through the different host device.

As noted above, a capture device 115 may not be able to operate in voice privacy mode for speech processing without the availability of a functioning host device 110. This is because a capture device 115 may not be able to, on its own, perform the processing needed to mask voice data or sufficiently process audio data to enable further speech processing without voice identifying data leaving a home environment. Thus, to avoid an undesirable user experience a system 100 may not allow voice privacy mode to be enabled for a capture device 115 without a functioning host device 110.

For a capture device 115 to be aware of and make use of the host device, the system 100 may coordinate operations such as those illustrated in FIGS. 15A-15B. As shown in FIG. 15A, when a host device 110a comes on line, for example is powered on and connected to the system component(s) 120 (for example through private network 10, network 199, through a companion device 110b, or the like), it may indicate (1502) to the system component(s) 120 that it is capable of acting as a host device. This may be through an explicit communication from the host device 110a to the system component(s) 120 or may be in another form, for example the host device 110a providing the system component(s) 120 with the device ID of the host device 110a and the system component(s) 120 using the device ID to look up the capabilities of device 110a. The system component(s) 120 may then store data indicating the host capabilities of 110a. For example, the system component(s) 120 may determine data indicating the capabilities of the device 110a along with a profile ID associated with the device 110a (for example, the user profile associated with the host device 110a) and potentially other information such as an identifier of the private network 10 to which host device 110a is connected, other device(s) connected to the private network 10 and/or the host device 110a, and/or other data. Thus the system component(s) 120 may be informed of the availability of device 110a to perform speech processing operations (e.g., the ability to process audio data and generate at least interim ASR data) on behalf of other devices. If at some point the device 110a becomes unable to render host operations, it may similarly inform the system component(s) 120 which may update its data accordingly.

A first resource limited device 115, when it is powered on/activated may also communicate with a companion device 110b (for example through an application operating on the companion device 110b) to configure (1504) the first resource limited device 115. This may involve connecting the first device 115 to the companion device 110b, to the private network 10, associating the first device 115 with the user profile (as indicated in profile storage 270/370), etc. The first device 115 may also attempt to directly connect to any host-capable devices accessible via the private network 10. The first device 115 and/or the companion device 110b may indicate (1506) the operation of the first device 115 to the system component(s) 120. This may involve registration of the first device 115 with the system component(s) 120, the system component(s) 120 storing information associating the first device 115 with the user profile, with the private network 10, and/or other data. The system component(s) 120 may determine that the first device 115 is one that can make use of host functionality offered by device 110a and may determine (1508) that both the first device 115 and host device 110a are connected to the same local area network (e.g., private network 10) and/or are both associated with the same profile (e.g., associated with the same user profile). As a result of the relationship of the host device 110a and the first device 115, the system component(s) 120 may determine that the first device 115 is capable of operating in voice privacy mode using device 110a as the host to perform certain voice masking/ASR operations.

The system component(s) 120 may then indicate (1510) the availability of voice privacy mode for the first device. Such an indication may be sent directly to the first device 115 and/or to the companion device 110b. The companion device 110b may then output (1512) a user interface indicating availability of the voice privacy mode for the first device 115. This may include showing a display screen indicating to a user that the first device 115 may operate in voice privacy mod and allowing the user to select voice privacy mode, for example using a virtual toggle button, voice control, or other interface element. A user may then turn on voice privacy mode for the first device 115, thus resulting in the companion device 110b detecting (1514) an input activating voice privacy mode for the first device. The companion device 110b may then indicate (1516) activation of the voice privacy mode to the first device 115 and/or the system component(s) 120. The system component(s) 120 may also indicate (1518) activation of the host mode to the host device 110a. Alternatively, the first device 115 may communicate directly with the host device 110a to initiate the connection between the devices and activation of voice privacy mode for the first device 115 and host mode for the host device 110a. In such a situation, one or more of the device(s) 110/115 may separately advise system component(s) 120 of the activation of the respective mode(s).

Although FIG. 15A illustrates the first device 115 and the host device 110 coordinating their operation through the system component(s) 120, the first device 115 and the host device 110 may establish a host relationship without involvement of the system component(s) 120. When the first device 115 and the host device 110 become connected to the same network (e.g., private network 10) they may engage in a handshake or other exchange of messages that allow an exchange of data sufficient for the host device 110 to activate in host mode with respect to the first device 115.

Operation of the first device 115 in voice privacy mode, and the host device 110 in host mode, is shown in FIG. 15B. As shown, a first device (e.g., a resource limited device) 115 may detect (130) audio representing an utterance. The first device 115 may determine audio data representing the audio and process that audio data (for example using wakeword detection component 220) to determine that the audio includes a representation of a wakeword (or otherwise determine the utterance is system-directed). The first device 115 may also determine (132) that enhanced privacy mode is active. The first device 115 may determine (1520) that there is a connected and available device that can function as a host for the voice privacy mode. For example, the first device 115 may confirm that it is connected to host device 110 over the private network 10. The first device 115 may then send (136) the audio data 111 to the host device 110. The first device 115 may also send metadata to the host device 110. Such metadata may include, for example, an utterance ID, timing information (e.g., start time/end time) about the capture of the utterance audio), a device ID, or the like. The host device 110 may then determine (1522) one or more settings to be used to process the audio data 111 sufficiently to remove data that may be used to identify the user's voice. For example, setting data may indicate that the host device 110 should perform a certain amount of ASR processing up to a certain point, which will be sufficient so that any data output by the host device 110 may not be used to reconstruct the voice of the original speaking user. (The setting data may also apply to other enhanced privacy mode operations, such as sufficient removing/obfuscating data in image data for an enhanced privacy mode dealing with image data. As can be appreciated, such setting data may be configurable to satisfy various enhanced privacy mode operations.) The host device 110 may then use the setting to perform processing using the audio data 111, for example by performing (138) preliminary ASR processing using the audio data. In certain instances this may include completing the ASR processing and outputting ASR results data that may be considered a complete transcript (or estimated transcript) of the utterance. In such a situation the host device 110 may output ASR data 410 or the like. In other instances the ASR processing may not complete and the host device 110 may output interim ASR data 112.

The system may then cause the ASR data output (e.g., the ASR data 410 and/or the interim ASR data 112) by the host device 110 to be sent to the system component(s) 120 for further processing. This may involve the host device 110 sending its output to system component(s) 120. Alternatively (or in addition) this may involve the host device 110 sending its output to the first device 115, which may then send it (and/or additional metadata, such as metadata received by the first device 115 and/or other metadata) to the system component(s) 120 for further processing. For example, the host device 110 may send (140) the interim ASR data 112 to the first device 115 which may then send (142) the interim ASR data 112 to the system component(s) 120. By sending the utterance related data from the first device 115 to the system component(s) 120, it allows the system 100 to limit the utterance related communications that leave the private network 10 to communications between the first device 115 and the system component(s) 120 without necessarily involving the host device 110 in those particular communications.

The system component(s) 120 may then receive the output data of the host device 110 (e.g., the ASR data 410 and/or the interim ASR data 112) and may complete (144) the speech processing to determine output data responsive to the utterance. For example, the system component(s) 120 may receive the interim ASR data 112 and complete ASR processing to determine ASR data 410 (or may simply receive the ASR data 410) and may then perform NLU, and other downstream processing to determine output data responsive to the utterance. The output data may include output indicators of a response to the utterance (e.g., synthesized speech, instructions to activate a visual display or indicator, etc.) as well as directive(s)/instruction(s) for a downstream device (such as first device 115, host device 110, or some other device) to perform an action responsive to the utterance. The output data/directive data may be sent (146) to the first device 115, host device 110, and/or other device to complete the response to the utterance.

Although the examples herein discuss the host device 110 only performing some portion of ASR processing on the audio data received by the first device 115, depending on system configuration and individual device capabilities, it may be possible for the host device 110 to do further processing such as partial or complete NLU processing, skill assignment/interactions, or the like, in order to respond to the utterance. Whatever processing the host device 110 may not be able to perform, it may assign to the system component(s) 120. Thus the host device 110 may send (either directly or through first device 115) various forms of interim speech processing data (e.g., partial or complete NLU data, data to be used by a skill component 290, data processable by an orchestrator 230, or the like) which may be received by the system component(s) 120 to coordinate completion of the processing and determination of output data responsive to the utterance.

Although the discussions herein have focused on the enhanced privacy mode resulting it the host device 110 determining interim ASR data 112 in the case of a voice privacy mode, other interim data may be determined by a host device 110 and sent to another device (e.g., system component(s) 120, perhaps through capture device 115), depending on the data to be preserved and the downstream processing required. For example, if an enhanced privacy mode corresponds to certain audio/image data not leaving a particular computing environment, but downstream processing may rely on the identity of a user (for example to customize operation of a command), a host device 110 may process audio data/image data using a user recognition component 395 and may send user recognition data 1095 (e.g., a user ID) to the system component(s) 120. In another example, if an enhanced privacy mode corresponds to audio data of background noise not leaving a particular computing environment, but downstream processing may rely on audio representing the environment to perform media matching (e.g., determine what song or video is playing), the host device 110 may process the audio data to determine an audio fingerprint (which may represent sound of the background audio without actually representing the entire background audio) and may send audio fingerprint data to the system component(s) 120. In another example, if an enhanced privacy mode corresponds to certain audio not leaving a particular computing environment, but downstream processing may rely on such audio to determine whether more than one device detected the same audio and/or when (for purposes of arbitrating between device to, for example, determine which device should output audio data) then the host device 110 may process the audio data (from multiple devices) to determine acoustic feature data capable of being compared (to determine if multiple devices detected the same audio) and/or metadata corresponding to the time of detection or the like, such that the background audio is not reproducible using the acoustic feature data, but arbitration may be sufficiently performed. The host device 110 may then send the acoustic feature data to the system component(s) 120. Similarly the host device 110 may produce acoustic feature data for other purposes (e.g., whisper detection) or the like. Such data that represents raw captured data but still removes/obfuscates sensitive information may be considered interim data like the interim ASR data 112. Such data may be sent together as part of intermediate/interim data to be sent from the host device 110 to the system component(s) 120 (which may, as discussed, be routed through a capture device 115). Such data may include, but is not limited to, interim ASR data 112, user recognition data 1095, sentiment data 1255/1275, acoustic feature data, audio fingerprint data, image feature data, or the like.

In a normal mode, the system 100 may be configured such that a device 110/115 may send certain data (for example to system component(s) 120) at one time for purposes of doing runtime processing (e.g., to respond to a user command or do other near real-time processing). Later, the device 110/115 may also send the certain data (e.g., captured audio data, captured image data, etc.) either alone or as a compilation (for example to system component(s) 120) for purposes other than performing time sensitive processing (like responding to a user command). Such non-time sensitive processing may include evaluating the performance of system component(s) 120, retraining of models or other components, historical data analysis, or the like. In an enhanced privacy mode, the system 100 may be configured so that such captured data (and/or other data indicated not to be shared in the privacy mode) is not sent at the later time.

The voice privacy mode (or other enhanced privacy mode) may operate along with a hybrid mode in which the host device 110 and the system component(s) 120 attempt to simultaneously respond to the utterance as described herein, for example with respect to FIG. 3. In such a situation the audio data 111 of the utterance captured by the first device 115 may be sent to the host device 110 for processing while the interim ASR data 112 (and/or other utterance related data that does not identify the voice of the user) may be sent to the system component(s) 120 for processing. Whichever processing path results in the fastest/correct answer, the output data of that path may be used to respond to the utterance.

As can be appreciated, given the certain resource limitations of first device 115, without a host device, the first device 115 may be unable to operate in voice privacy mode. Accordingly, the first device 115 may be configured to switch to another host if it is in voice privacy mode and a default (or other attempted) host is unavailable. FIG. 16 illustrates steps that the system 100 may take to ensure proper operation of the first device 115. As shown the first device may detect (1602) an utterance. The device may then check (1604) if voice privacy mode is active. If not (1604: No) it may send (1606) the audio data to the system component(s) 120 for processing as a normal utterance to be processed as described herein. If voice privacy mode is active (1604: Yes) the first device 115 may check (1608) if the current host is available on the private network 10. If the current host is available (1608: Yes) the first device 115 may send (1610) the audio data to the current host for processing as a voice privacy mode request to be processed as described herein. If the current host is not available (1608: No) (for example the host device lost power, was removed from the private network 10, or the like) the device may check (1612) to determine if another host is accessible. If another host is accessible (1612: Yes) the first device 115 may connect (1614) to the alternate host device (e.g., 110a(2)) (e.g., using the private network 10). The first device 115 may then send (1616) the audio data to the current host for processing as a voice privacy mode request to be processed as described herein. If another host is not accessible (1612: No) the system may return (1618) an error message and/or a request to determine if the user wishes to exit the voice privacy mode.

The error message/request may be returned by the first device 115 (for example by a blinking red light to indicate an error). Additionally, or in the alternative, due to resource limitations of the first device 115, it may send a message of error to a companion device (e.g., smart phone 110b) which may receive the message and output a user interface indicating the error and/or displaying a request to determine if the user wishes to exit the voice privacy mode. The user may use the companion device (for example through the companion application running on the companion device) to determine information about the error, attempt to correct the error, turn off voice privacy mode, or the like. If the user corrects the error and activates an available host, the first device 115 may connect to the host for purposes of processing the utterance (whose audio data may be stored by the first device 115, smart phone 110b, or other device within the private network 10). If the user turns off voice privacy mode, the audio data of the utterance may be sent to the system component(s) 120 for processing as a normal utterance to be processed as described herein.

In other situations, changing operational settings of a first device 115 and/or host device 110 may result in an inability for the device 110 to act as a host for the first device 115. For example, devices may be linked by location settings, user profiles associated with the respective device(s), being connected to the same private network 10, or the like. If any of these settings change, it may impact the ability for the first device 115 to operate in voice privacy mode. Thus, if the system receives an input to change one of these settings (for example through the companion application running on the companion device), the system (e.g., through smart phone 110b or device 110 with an audio output or screen display) may output an indication that changing the setting may impact the ability for the first device 115 to operate in voice privacy mode. This may allow a user to determine not to change the setting in order to preserve the ability for the first device 115 to operate in voice privacy mode. Other situations, such as a host device 110 going offline, malfunctioning, etc. may also cause the system to output an indication regarding the ability for the first device 115 to operate in voice privacy mode, thus allowing a user to rectify the situation.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 17:
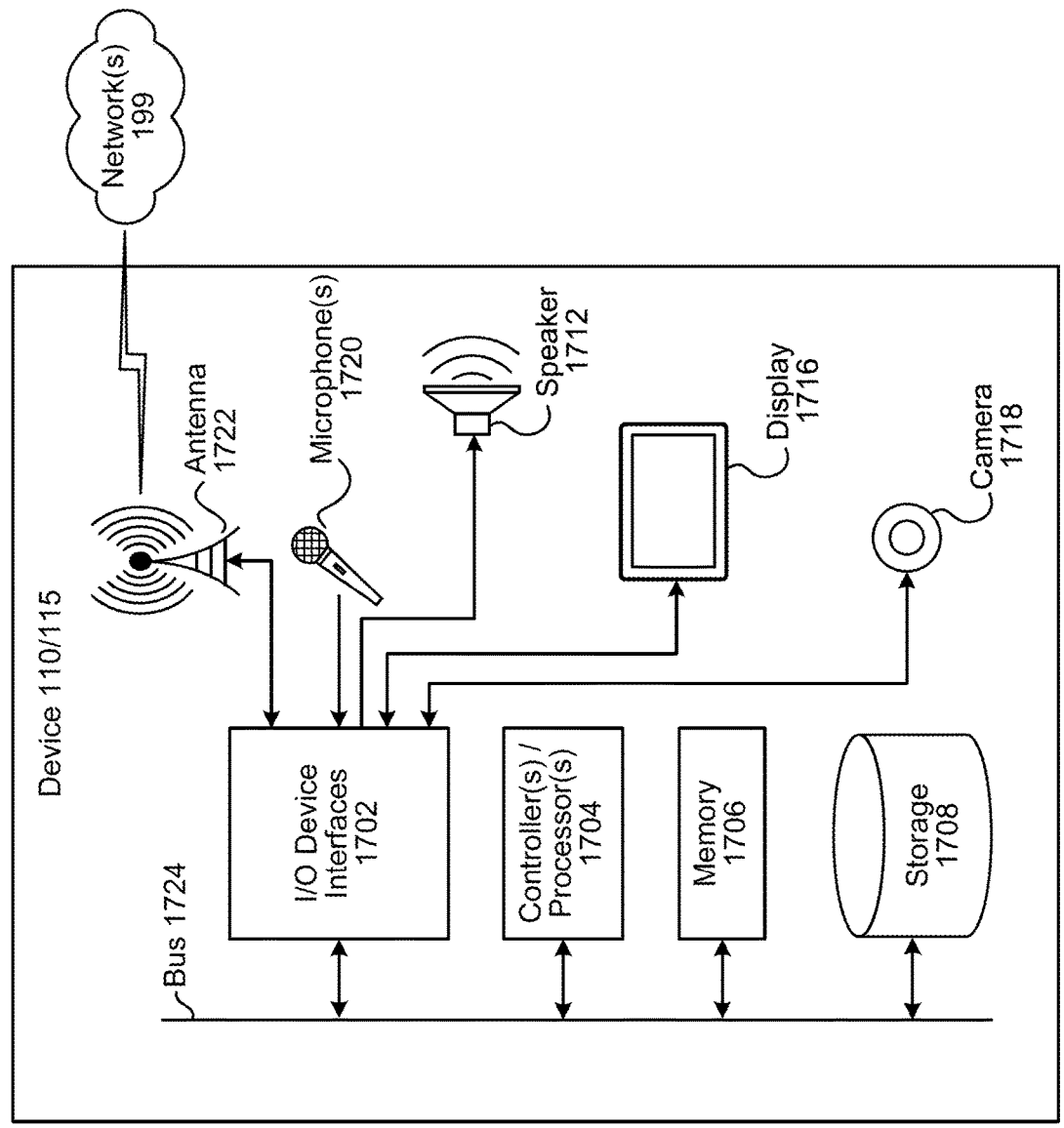
FIG. 17 is a block diagram conceptually illustrating example components of a device, according to embodiments of the present disclosure.
Figure 18:
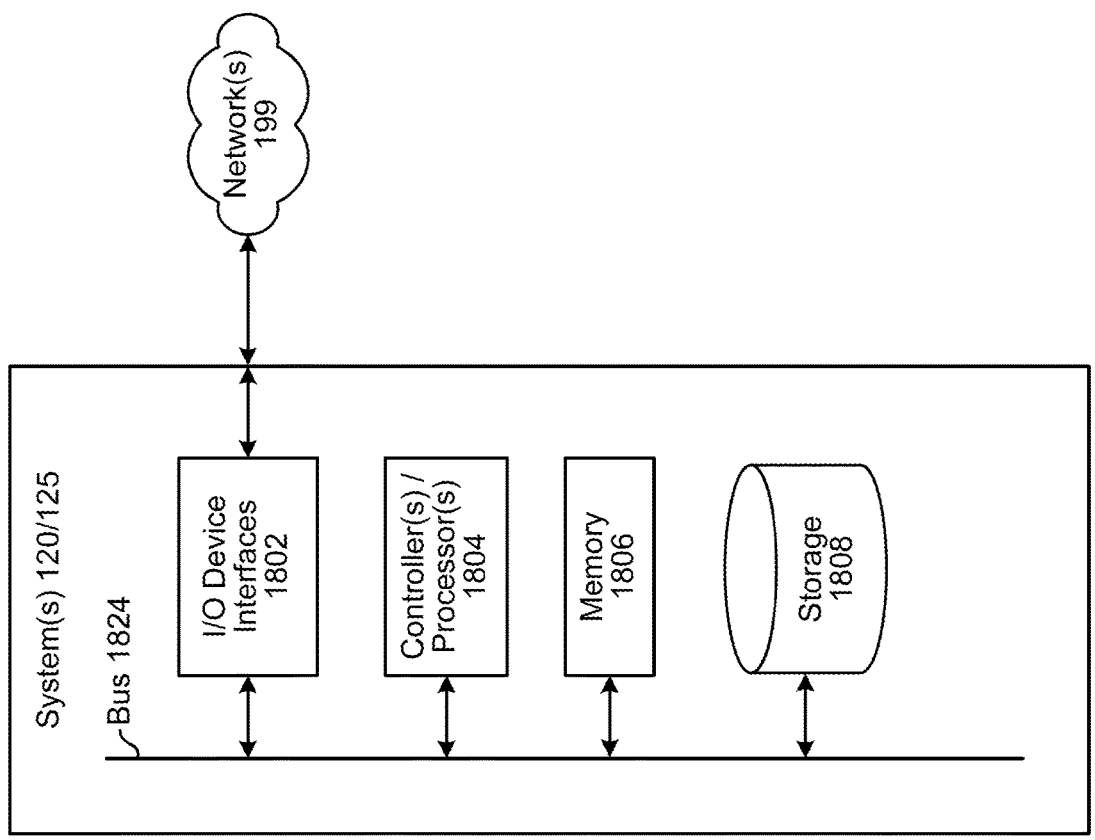
FIG. 18 is a block diagram conceptually illustrating example components of a system, according to embodiments of the present disclosure.

FIG. 17 is a block diagram conceptually illustrating a device 110/115 that may be used with the system. FIG. 18 is a block diagram conceptually illustrating example components of a remote device, such as the natural language command processing system component(s) 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110/115 may operate locally to a user (e.g., within a same environment so the device may receive inputs and playback outputs for the user) the server/system component(s) 120 may be located remotely from the device 110/115 as its operations may not require proximity to the user. The server/system component(s) 120 may be located in an entirely different location from the device 110/115 (for example, as part of a cloud computing system or the like) or may be located in a same environment as the device 110/115 but physically separated therefrom (for example a home server or similar device that resides in a user's home or business but perhaps in a closet, basement, attic, or the like). The system component(s) 120 may also be a version of a user device 110/115 that includes different (e.g., more) processing capabilities than other user device(s) 110/115 in a home/office. One benefit to the server/system 120 being in a user's home/business is that data used to process a command/return a response may be kept within the user's home, thus reducing potential privacy concerns.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/115/120/125) may include one or more controllers/processors (1704/1804), which may each include a central processing unit (CPU) for processing data and computer-readable instructions, and a memory (1706/1806) for storing data and instructions of the respective device. The memories (1706/1806) may individually include volatile random access memory (RAM), non-volatile read only memory (ROM), non-volatile magnetoresistive memory (MRAM), and/or other types of memory. Each device (110/115/120/125) may also include a data storage component (1708/1808) for storing data and controller/processor-executable instructions. Each data storage component (1708/1808) may individually include one or more non-volatile storage types such as magnetic storage, optical storage, solid-state storage, etc. Each device (110/115/120/125) may also be connected to removable or external non-volatile memory and/or storage (such as a removable memory card, memory key drive, networked storage, etc.) through respective input/output device interfaces (1702/1802).

Computer instructions for operating each device (110/115/120/125) and its various components may be executed by the respective device's controller(s)/processor(s) (1704/1804), using the memory (1706/1806) as temporary "working" storage at runtime. A device's computer instructions may be stored in a non-transitory manner in non-volatile memory (1706/1806), storage (1708/1808), or an external device(s). Alternatively, some or all of the executable instructions may be embedded in hardware or firmware on the respective device in addition to or instead of software.

Each device (110/115/120/125) includes input/output device interfaces (1702/1802). A variety of components may be connected through the input/output device interfaces (1702/1802), as will be discussed further below. Additionally, each device (110/115/120/125) may include an address/data bus (1724/1824) for conveying data among components of the respective device. Each component within a device (110/115/120/125) may also be directly connected to other components in addition to (or instead of) being connected to other components across the bus (1724/1824).

Referring to FIG. 17, the device 110/115 may include input/output device interfaces 1702 that connect to a variety of components such as an audio output component such as a speaker 1712, a wired headset or a wireless headset (not illustrated), or other component capable of outputting audio. The device 110/115 may also include an audio capture component. The audio capture component may be, for example, a microphone 1720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110/115 may additionally include a display 1716 for displaying content. The device 110/115 may further include a camera 1718. Note, however, that a resource limited device such as 115 may have fewer components than a potential host device 110.

Via antenna(s) 1722, the input/output device interfaces 1702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1702/1802) may also include communication components that allow data to be exchanged between devices such as different physical servers in a collection of servers or other components.

The components of the device(s) 110/115, the natural language command processing system 120, or a skill system 125 may include their own dedicated processors, memory, and/or storage. Alternatively, one or more of the components of the device(s) 110, the natural language command processing system 120, or a skill system 125 may utilize the I/O interfaces (1702/1802), processor(s) (1704/1804), memory (1706/1806), and/or storage (1708/1808) of the device(s) 110/115, natural language command processing system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110/115, the natural language command processing system 120, and a skill system 125, as described herein, are illustrative, and may be located as a stand-alone device or may be included, in whole or in part, as a component of a larger device or system. As can be appreciated, a number of components may exist either on a system 120 and/or on device 110. For example, language processing 292/392 (which may include ASR 250/350), language output 293/393 (which may include NLG 279/379 and TTS 280/380), etc., for example as illustrated in FIGS. 2 and 3. Unless expressly noted otherwise, the system version of such components may operate similarly to the device version of such components and thus the description of one version (e.g., the system version or the local version) applies to the description of the other version (e.g., the local version or system version) and vice-versa.

As illustrated in FIG. 19, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, potential host speech-detection devices 110a (which may include certain speech processing components such as those discussed above in reference to FIG. 3), a smart phone 110b, a smart watch 110c, a tablet computer 110d, a vehicle 110e, a display/smart television 110g, a washer/dryer 110h, a refrigerator 110i, a microwave 110j, autonomously motile device 110k (e.g., a robot), etc., resource limited speech device(s) 115 (which may include more limited computing resources than devices 110a), may be connected to the network(s) 199 through a wireless service provider, over a Wi-Fi or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language command processing system 120.

In certain system configurations, various devices of FIG. 19 may take different roles. For example, in one configuration, a vehicle 110e may act as a host device for a device such as a wearable 110c/110m/110n or a smart phone 110b (which may act in the role of the capture device 115) as described above for purposes of the privacy mode. In another configuration, the vehicle 110e may act in the role of the capture device 115 while a different device, such as a smart phone 110b, may act in the role of the host device as described above for purposes of the privacy mode. The actual implantation may depend on system/device configuration (e.g., computing resources of the device), individual device/system settings and/or preferences, user preferences/settings, or the like.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
capturing, by a first device, audio comprising an utterance;
determining, by the first device, audio data representing the utterance;
determining the first device is configured to operate in a first mode with respect to the utterance, the first mode corresponding to preventing audio recordings of a user's voice from leaving devices associated with a physical environment;
determining the first device is connected using a local area network protocol to a second device, the second device configured to perform computing functionality corresponding to the first mode, wherein the computing functionality is not configured for the first device;
sending, from the first device to the second device using the local area network protocol, the audio data;
performing automatic speech recognition (ASR) processing on the audio data by the second device to determine interim ASR results data;
sending, from the second device to the first device using the local area network protocol, the interim ASR results data; and sending, from the first device to a third device over a wide area network, the interim ASR results data for further speech processing.

2. The computer-implemented method of claim 1, further comprising, prior to capturing the audio by the first device:
using the local area network protocol to establish a connection between the first device and the second device;
determining the first device and the second device are associated with a first user profile;
in response to the first device and the second device being connected using the local area network protocol and being associated with the first user profile, presenting a user interface corresponding to the first device operating in the first mode; and
receiving a user input corresponding to operating the first device in the first mode.

3. The computer-implemented method of claim 1, further comprising, by the second device:
determining first setting data corresponding to the first mode, the first setting data corresponding to preventing reconstruction of the user's voice using data output from ASR processing,
wherein performing the ASR processing is based at least in part on the first setting data.

4. The computer-implemented method of claim 1, further comprising:
determining the first device is disconnected from the second device;
capturing, by the first device, second audio comprising a second utterance;
determining setting data indicating the first device is to operate in the first mode; and
in response to the setting data indicating the first device is to operate in the first mode and the first device being disconnected from the second device, causing output of an indication corresponding to at least one of an error or a request for the first device to be connected to the second device to resume operating in the first mode.

5. A computer-implemented method comprising:
capturing, by a first device, input data;
determining that the first device is configured to operate in a first mode corresponding to distribution of a first type of data;
determining that a second device is in a first environment including the first device, the second device configured to perform computing functionality for removing user-identifiable data from the first type of data;
in response to determining that the first device is configured to operate in the first mode and the second device being in the first environment and configured to perform the computing functionality, sending, from the first device to the second device, the input data for further processing;
causing the second device to generate results data using the computing functionality based on the input data;
causing the results data to be sent to a third device outside the first environment for further processing to generate a response to the input data; and
receiving, by the first device and from the third device, the response to the input data.

6. The computer-implemented method of claim 5, wherein the input data comprises audio data and wherein causing the second device to generate results data comprises:
causing the second device to perform partial automatic speech results (ASR) processing using the audio data, wherein the results data comprises interim ASR results data.

7. The computer-implemented method of claim 6, wherein the interim ASR results data comprises:
first data representing a lattice of partial ASR results, the lattice representing a plurality of paths from a start node of the lattice to a terminal node of the lattice; and
second data representing a plurality of scores.

8. The computer-implemented method of claim 5, wherein causing the results data to be sent to the third device comprises:
receiving, by the first device from the second device over a local area network, the results data; and
sending, from the first device to the third device over a wide area network, the results data.

9. The computer-implemented method of claim 5, wherein causing the results data to be sent to the third device comprises:
causing the results data to be sent from the second device to the third device over a wide area network.

10. The computer-implemented method of claim 5, further comprising, prior to capturing the input data by the first device:
determining the first device is connected to a local area network;
determining the second device is connected to the local area network;
determining the first device and the second device are associated with a first user profile;
in response to the first device and the second device being connected to the local area network and being associated with the first user profile, presenting a user interface corresponding to the first device operating in the first mode; and
receiving a user input corresponding to operating the first device in the first mode.

11. The computer-implemented method of claim 5, further comprising, by the second device:
determining first setting data corresponding to the first mode, the first setting data representing automatic speech recognition (ASR) processing sufficient to prevent reconstruction of voice data based on data output from ASR processing,
wherein using the computing functionality by the second device comprises performing, by the second device, ASR processing pursuant to the first setting data to determine the results data.

12. The computer-implemented method of claim 5, further comprising:
capturing, by the first device, second input data;
determining the first device is configured to operate in the first mode with regard to the second input data;
determining the first device is not connected to the second device; and
in response to the first device being configured to operate in the first mode with regard to the second input data and not being connected to the second device, causing output of an indication corresponding to at least one of an error or a request for the first device to discontinue operating in the first mode.

13. A system, comprising:
at least one processor; and
at least one memory comprising instructions that, when executed by the at least one processor, cause the system to:

capture, by a first device, input data;
determine that the first device is configured to operate in a first mode corresponding to distribution of a first type of data;
determine that a second device is in a first environment including the first device, the second device configured to perform computing functionality for removing user-identifiable data from the first type of data;
in response to determining that the first device is configured to operate in the first mode and the second device being in the first environment and configured to perform the computing functionality, send, from the first device to the second device, the input data for further processing;
cause the second device to generate results data using the computing functionality based on the input data;
cause the results data to be sent to a third device outside the first environment for further processing to generate a response to the input data; and
receive, by the first device and from the third device, the response to the input data.

14. The system of claim 13, wherein the input data comprises audio data and wherein the instructions that cause the system to cause the second device to generate results data comprise instructions that, when executed by the at least one processor, cause the system to:
cause the second device to perform partial automatic speech results (ASR) processing using the audio data, wherein the results data comprises interim ASR results data.

15. The system of claim 14, wherein the interim ASR results data comprises:
first data representing a lattice of partial ASR results, the lattice representing a plurality of paths from a start node of the lattice to a terminal node of the lattice; and
second data representing a plurality of scores.

16. The system of claim 13, wherein the instructions that cause the system to cause the results data to be sent to the third device comprise instructions that, when executed by the at least one processor, cause the system to:
receive, by the first device from the second device over a local area network, the results data; and
send, from the first device to the third device over a wide area network, the results data.

17. The system of claim 13, wherein the instructions that cause the system to cause causing the results data to be sent to the third device comprise instructions that, when executed by the at least one processor, cause the system to:
cause the results data to be sent from the second device to the third device over a wide area network.

18. The system of claim 13, wherein the at least one memory further includes instructions that, when executed by the at least one processor, further cause the system to, prior to capturing the input data by the first device:
determine the first device is connected to a local area network;
determine the second device is connected to the local area network;
determine the first device and the second device are associated with a first user profile;
in response to the first device and the second device being connected to the local area network and being associated with the first user profile, present a user interface corresponding to the first device operating in the first mode; and
receive a user input corresponding to operating the first device in the first mode.

19. The system of claim 13, wherein the at least one memory further includes instructions that, when executed by the at least one processor, further cause the system to, by the second device:
determine first setting data corresponding to the first mode, the first setting data representing automatic speech recognition (ASR) processing sufficient to prevent reconstruction of voice data based on data output from ASR processing,
wherein the instructions that cause the system to use the computing functionality by the second device comprise instructions that, when executed by the at least one processor, cause the system to perform, by the second device, ASR processing pursuant to the first setting data to determine the results data.

20. The system of claim 13, wherein the at least one memory further includes instructions that, when executed by the at least one processor, further cause the system to:
capture, by the first device, second input data;
determine the first device is configured to operate in the first mode with regard to the second input data;
determine the first device is not connected to the second device; and
in response to the first device being configured to operate in the first mode with regard to the second input data and not being connected to the second device, cause output of an indication corresponding to at least one of an error or a request for the first device to discontinue operating in the first mode.

* * * * *